US009863848B1

(12) United States Patent
Thompson et al.

(10) Patent No.: US 9,863,848 B1
(45) Date of Patent: *Jan. 9, 2018

(54) VEHICLE DIAGNOSTIC TOOL—MULTIPLE TEST II

(71) Applicant: Automotive Test Solutions, Inc., Albuquerque, NM (US)

(72) Inventors: Bernie C. Thompson, Tijeras, NM (US); Neal R. Pederson, Los Alamos, NM (US)

(73) Assignee: Automotive Test Solutions, Inc., Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/105,574

(22) Filed: Dec. 13, 2013

Related U.S. Application Data

(60) Continuation of application No. 13/447,492, filed on Apr. 16, 2012, now Pat. No. 8,612,091, which is a continuation of application No. 12/624,124, filed on Nov. 23, 2009, now Pat. No. 8,160,767, which is a division of application No. 11/811,634, filed on Jun. 8, 2007, now Pat. No. 7,953,530.

(60) Provisional application No. 60/812,525, filed on Jun. 8, 2006.

(51) Int. Cl.
*G01M 17/00* (2006.01)
*G01M 15/05* (2006.01)
*G07C 5/08* (2006.01)

(52) U.S. Cl.
CPC .......... *G01M 15/05* (2013.01); *G07C 5/0808* (2013.01)

(58) Field of Classification Search
USPC ....................................................... 701/32.9
See application file for complete search history.

(56) References Cited

U.S. PATENT DOCUMENTS

| | | | |
|---|---|---|---|
| 6,708,092 B1 * | 3/2004 | Starks .................... | G07C 5/008 340/438 |
| 7,103,460 B1 * | 9/2006 | Breed ................. | B60C 23/0408 701/29.1 |
| 7,707,821 B1 * | 5/2010 | Legare .................... | F01N 3/101 60/274 |
| 7,886,523 B1 * | 2/2011 | Legare .................. | F02D 41/008 60/274 |
| 7,953,530 B1 * | 5/2011 | Pederson .............. | G01M 15/04 324/713 |

(Continued)

*Primary Examiner* — Tyler Paige

(57) ABSTRACT

An analysis tool which extracts all the available parameter identifications (i.e. PIDS) from a vehicle's power train control module for diagnostic decisions. This is done by checking these PIDS and other information (e.g., calculated PIDS, Break Points, charts and algorithms) in three states; key on engine off, key on engine cranking, key on engine running. In all three modes the tool is comparing the live data from PIDS and voltage to the other information (e.g., Break Points). If any of this data are outside the programmed values a flag is assigned to the failure or control problem. The relationship between a particular PID and its associated preprogrammed value(s) may be indicated by a light. The depth of the problem (if any) is conveyed by the color of the light. Also included are tests/charts for fuel trim, engine volumetric efficiency, simulated injector, power, catalyst efficiency, and engine coolant range.

16 Claims, 48 Drawing Sheets
(38 of 48 Drawing Sheet(s) Filed in Color)

(56) References Cited

U.S. PATENT DOCUMENTS

| | | | | |
|---|---|---|---|---|
| 8,239,093 | B1* | 8/2012 | Thompson | G07C 5/0808 701/30.9 |
| 8,863,497 | B1* | 10/2014 | Legare | F02D 41/008 60/274 |
| 2005/0027403 | A1* | 2/2005 | Nagai | G01D 3/032 701/1 |
| 2007/0088465 | A1* | 4/2007 | Heffington | G07C 5/085 701/1 |
| 2007/0288134 | A1* | 12/2007 | Rollinger | F02D 41/0235 701/32.8 |
| 2010/0076644 | A1* | 3/2010 | Cahill | G07C 5/0808 701/31.4 |

* cited by examiner

ESCAN AUTO DIAGNOSE
ENTRY MODE

| | | |
|---|---|---|
| Select Make | ☐ | Unknown |
| | | Acura |
| | | Audi |
| | | BMW |
| | | Chrysler/Jeep |
| | | Ford |
| | | GM |
| | | Honda |
| | | Hyundai |
| | | Infinity |
| | | Isuzu |
| | | Kia |
| | | Mazda |
| | | Mitsubishi |
| | | Nissan |
| | | Subaru |
| | | Toyota |
| | | Volkswagen |
| | | Volvo |
| Model Year | ☐ | 1996 |
| | | 1997 |
| | | 1998 |
| | | 1999 |
| | | 2000 |
| | | 2001 |
| | | 2002 |
| | | 2003 |
| | | 2004 |
| | | 2005 |
| | | 2006 |
| | | 2007 |
| Engine Size Liters | ☐ | 1 Liter – 8 Liter |
| Baro Elevation | ☐ | Sea Level – 10,000 Ft. |
| Engine Temperature | ☐ | -40°F To 300°F |

(Use Infrared Thermometer)

Fig. 39 A

VEHICLE DIAGNOSTIC TOOL—MULTIPLE TEST II

CLAIM OF PRIORITY

This application is a continuation of and claims the priority of application Ser. No. 13/447,492 filed 16 Apr. 2011 which, in turn, is a continuation of and claims the priority of application Ser. No. 12/624,124 filed 23 Nov. 2009 which, in turn, is a divisional of and claims the priority of application Ser. No. 11/811,634, filed 8 Jun. 2007, which claimed the priority of provisional application Ser. No. 60/812,525, filed 8 Jun. 2006.

FIELD OF THE INVENTION

This invention relates to automotive diagnostic tools, particularly an analysis tool that will interface with the power train control module and alert the automotive technician to problems with the engine control system and/or the associated engine and/or other power plant systems, to permit such technician to zero in on such problems.

BACKGROUND OF THE INVENTION

With increasing government demands on emission control systems and fuel mileage concerns, the power plant of a vehicle has become a high tech engineering marvel. This, in turn, means that the automotive technician is faced with increasing difficulties of diagnosing and repairing complicated systems. Repairs must be completed in a timely manner which has become a problem for many automotive repair shops.

The modern vehicle (1996 and later models) has a number of microprocessors including one programmed to control the running parameters of the power plant (i.e., the powertrain control module). The data from this microprocessor provides the skilled technician with information that is needed in order to make diagnostic decisions about the power plant. However, as the power plant systems become more complicated, more data and a better understanding of such data is needed in order to make accurate diagnostic decisions, thus making it more difficult for technicians to see a problem when it occurs. Even if available data is saved, a technician may overlook important information and can misdiagnose the system.

Definitions

Unless otherwise indicated (e.g., Volumetric efficiency tests which would work on diesel engines) Power Plant includes:
- a gasoline engine (including engines which also run on alternate fuels, such as ethanol, either alone or mixed with gasoline);
- powertrain control module (sometimes referred to by the acronym PCM or ECM (for engine control module));
- engine control system (sensors, such as an O2 sensor, that feed data to the PCM and activators that carry out PCM commands, such as fuel injectors, exhaust gas recirculator, and purge control);
- starting system, including starter motor and "key";
- charging system;
- air induction system (e.g., air filter, MAS (mass airflow sensor; sometimes referred to by the acronym MAF);
- fuel delivery system (e.g., fuel pump, fuel filter, fuel pressure regulator, fuel pressure sensor, fuel damper, injectors);
- cooling system (e.g., radiator, water pump, thermostat); and
- exhaust system.

The foregoing are intended to be illustrative. As those skilled in the art will appreciate the above are not necessarily mutually exclusive or exhaustive categories. For instance, the air induction system includes the intake manifold which is generally considered part of the engine. Similarly, the fluid passages on the engine are part of the cooling system. Further, engines, depending on size, year of manufacture and manufacturer, have different control systems (e.g., different numbers and locations of O2 sensors). While all fuel delivery systems include a pump, fuel filter and injectors, not all include a fuel pressure sensor or a fuel damper. The term key, as used herein, includes any type of starting device, whether a traditional key and tumbler system, or a laser based or a frequency based device. Finally, unless otherwise indicated, the term vehicle is intended to cover gasoline engine powered vehicles, such as automobiles and light trucks. Other definitions (e.g., PID/PIDS; Paragraph [0011]) are set forth elsewhere in the specification.

OBJECTS OF THE INVENTION

What was needed is a way in which the automotive technician can easily connect to the automobile's power train control module with a device that could help diagnose the power plant systems quickly and accurately.

It is an object of the present invention to provide an analysis tool that will interface with the power train control module and alert the technician to problems with, for instance, the engine control system as they occur, to permit the technician to zero in on such problems as they occur.

It is a further object of the present invention to provide an analysis tool with alert lights, whereby failures are brought to the attention of the technician as they occur.

Furthermore, it is an object of the present invention to provide an automated analysis tool to help a technician that does not have the technical skill level needed to make correct diagnostic decisions.

SUMMARY OF THE INVENTION

The analysis tool of the present invention interfaces with the vehicle's data link connector (DLC) and communicates with the vehicle's power train control module (PCM). The tool extracts all the available parameter identifications (i.e. PIDS). These PIDS, which contain information from the inputs and outputs of the powertrain control module, are utilized to make diagnostic decisions to help the technician. This can be done by checking these PIDS and other information (e.g., calculated PIDS, Break Points, charts) in three states; key on engine off (KOEO), key on engine cranking (KOEC), key on engine running (KOER). While this is the preferred order, other orders would provide the same result.

The PIDS transmitted from the power train control module are monitored. In one aspect of the invention some monitored PIDS are compared to one or more preprogrammed values. The relationship between a particular PID and its associated preprogrammed value(s) (also referred to as Break Point(s)) (whether within range, less that or greater than the associated Break Point) will be indicated to the technician by turning on an alert light. The depth of the problem (if any) is conveyed to the technician by the color of the alert light. A green alert light indicates no current problems. A yellow alert light indicates that one or more of the parameters have been crossed but that the problem is small (e.g., no drivability problem; there is a high probability that the power plant functions according to the manufacturer's specifications). An orange alert light indicates that system has a failure (e.g., it is more probable that not that the power plant is not functioning according to the manufacturers' specifications; it is more probable than not that there is a drivability problem). A red alert light indicates that the system failure needs immediate attention (e.g., there is a high probability that there is a drivability problem). The rich (yellow) and lean (blue) indication alert lights are exceptions to the foregoing. The alert lights are activated as the technician is viewing data displayed both digitally and in graph formats depending on the information format selected.

In the KOEO (the first state in the automatic mode discussed below) the onboard microprocessor (PCM) has power but the engine is not in rotation. In this condition the open circuit battery voltage (calculated PID or CPID) is checked, barometric pressure (PID) is check, throttle position sensor (PID) is checked, engine coolant temperature (PID) is checked, intake air temperature (PID) is checked, O2 bias voltage (PID) is checked (if applicable), diagnostic trouble codes (DTC's) are checked, pending codes are checked and Mode 6 data is checked and analyzed. A pending code is a DTC indicating that a component or system has failed one or more times, but (in accordance with a specification programmed into the PCM by the vehicle manufacturer) has not failed enough times to be a matured DTC. Some DTCs are displayed on the vehicle's dash board as an amber light or icon.

In the KOEC (the second state in the automatic mode) the onboard microprocessor has power and the starter is engaged loading the electrical system. As the engine is rotated the piston movement creates a light pressure differential in the intake manifold. In this condition the battery voltage (CPID) is checked, cranking vacuum (CPID) is checked, cranking RPM (PID) is checked.

In the KOER (the third state in the automatic mode) the microprocessor has power and the engine is running. The microprocessor (PCM) is controlling the running parameters of the power plant. In this condition the battery charging voltage (taken off the DLC or data link connector) is checked, engine running vacuum is checked, volumetric efficiency of the engine is checked (CPID), catalyst efficiency (CPID) is checked, fuel control (CPID) is checked, fuel trim (a correction factor set by the vehicle manufacturer) (PID) is checked, time to engine temperature (CPID) is checked, engine coolant sensor (PID) and cooling system (an Algorithm) are checked, intake air temperature (PID) is checked, mass air flow sensor (PID) is checked if present on vehicle, oxygen sensors (PIDS) are checked, throttle position sensor (PID) is checked, ignition timing advance is checked (PID), pending codes (PID) are checked, and Mode 6 data (i.e., PCM or powertrain control module testing sequence) is checked and analyzed.

In all three modes of operation (whether manual or the automated version) the analysis tool is comparing the live data from the PIDS and voltage from the DLC to parameters (e.g., Break Points, calculated PIDS, charts and algorithms) that have been programmed into the system. If any of this data are outside the programmed parameters a flag is assigned to the failure or control problem.

In the alternative, a technician can choose to run the foregoing tests in an automated sequence. In this scenario the technician will be asked several basic questions (e.g., make and model of the vehicle). (See FIG. 39.) Once these questions are answered the system will proceed with a testing sequence, in the order identified above, that will identify failing parameters and chart this information. In the automated mode, once the testing sequence is completed and all data has been collected the analysis tool evaluates this flagged data and rationality data (e.g., the EGR (exhaust gas recirculation) being stuck on) and projects a probable solution so that the technician can then correct the power plant failure(s).

BRIEF DESCRIPTION OF THE DRAWINGS

The application file contains at least one drawing executed in color. Copies of this patent or patent application publication with color drawing(s) will be provided by the Office upon request and payment of the necessary fee.

FIG. 4 is a color screen display of the tool of the present invention showing the DTC codes pulled for a 2000 Toyota 4Runner;

FIG. 5 is a color screen display showing the Mode 6 data for the 2000 Toyota 4Runner;

FIG. 8 is a color screen display showing the PIDS for the 2000 Toyota 4Runner;

FIG. 18 is a color screen display with the DTCs tab open for a 1999 Dodge truck with a check engine light on;

DESCRIPTION OF THE PREFERRED EMBODIMENTS

Figure 1:
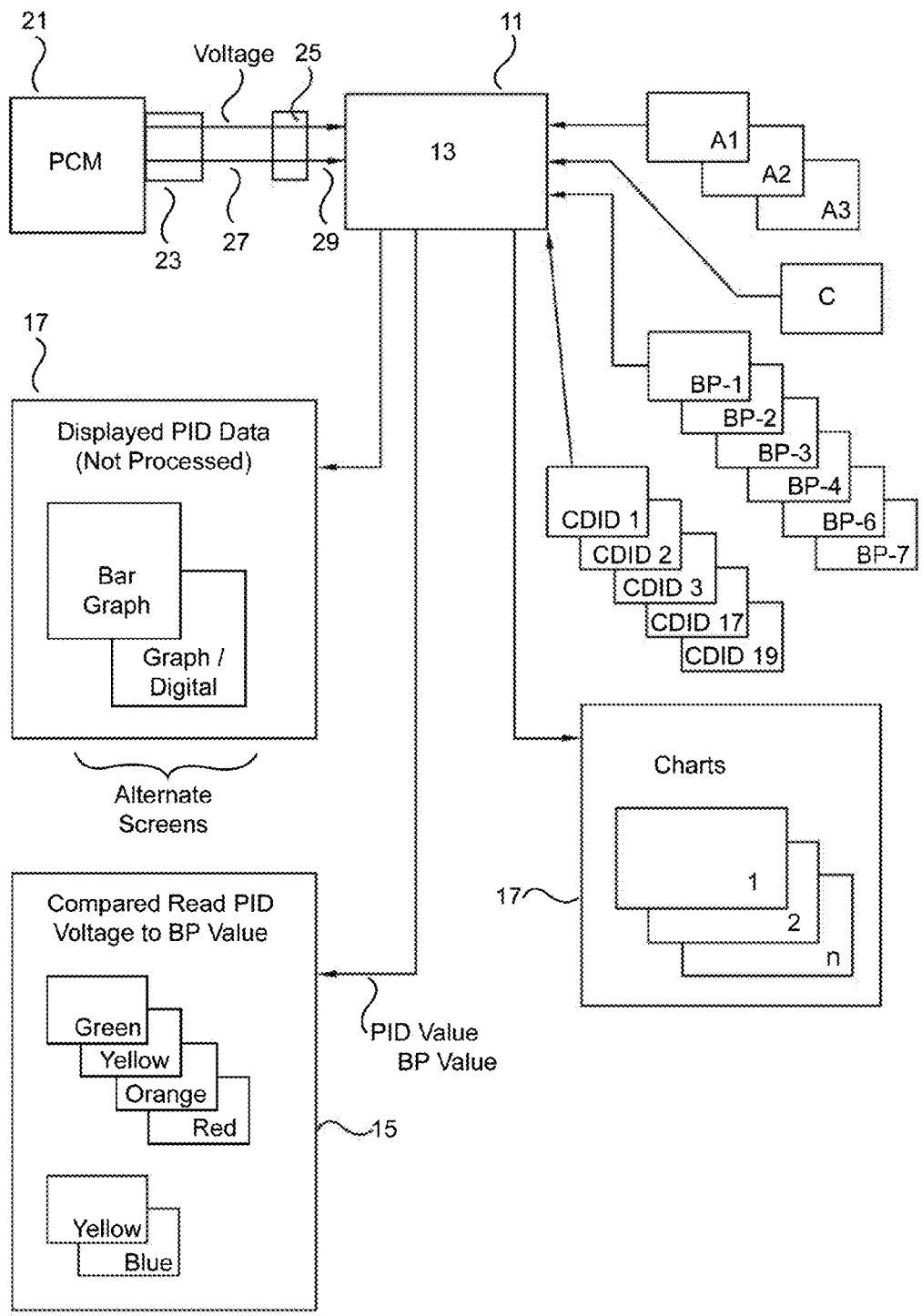
FIG. 1 is a schematic illustrating the inputs and outputs to the analysis tool of the present invention.
Figure 2:
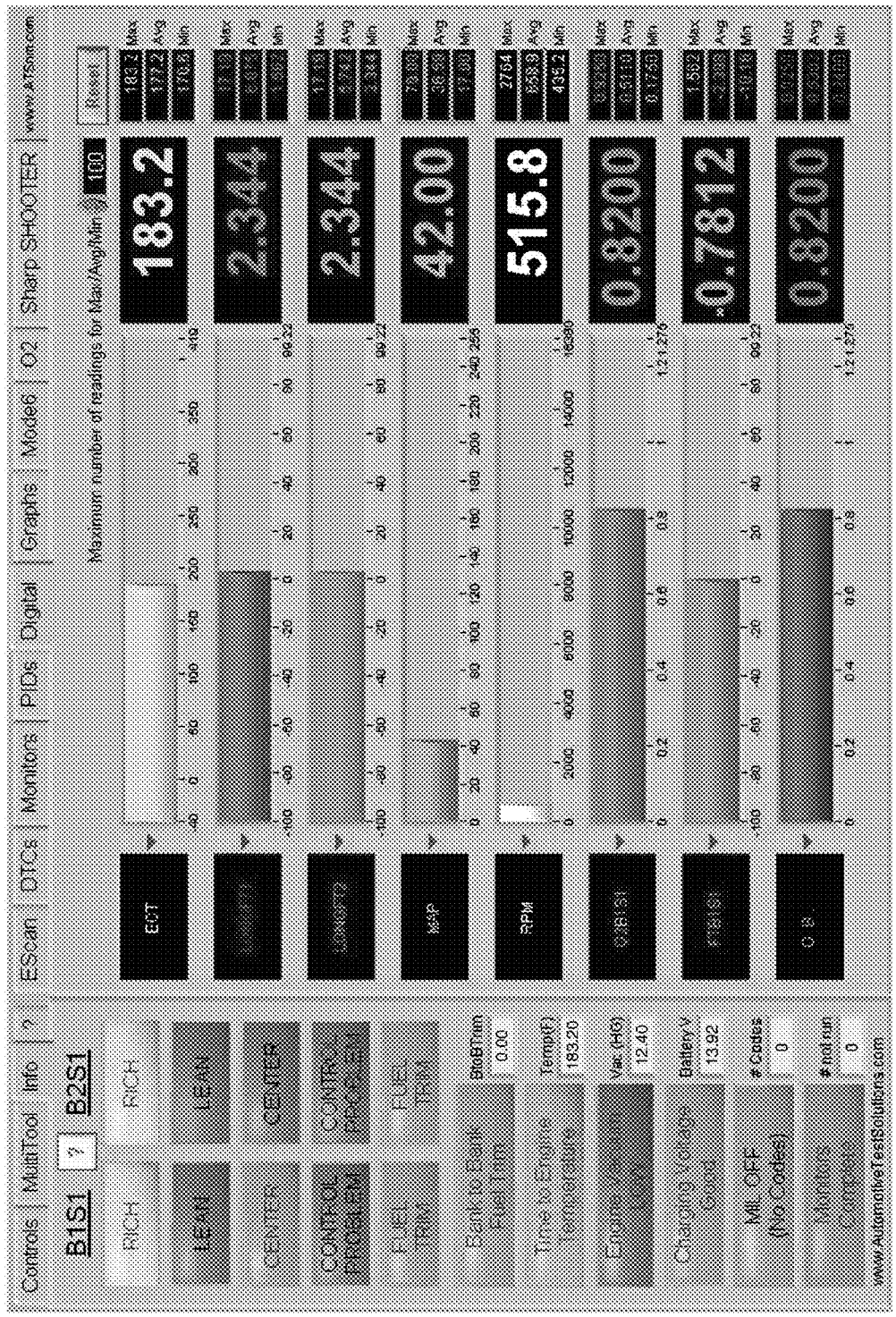
FIG. 2 is a sample color screen display of the analysis tool of the present invention showing slide bars with a digital display and certain alert lights activated.
Figure 9:
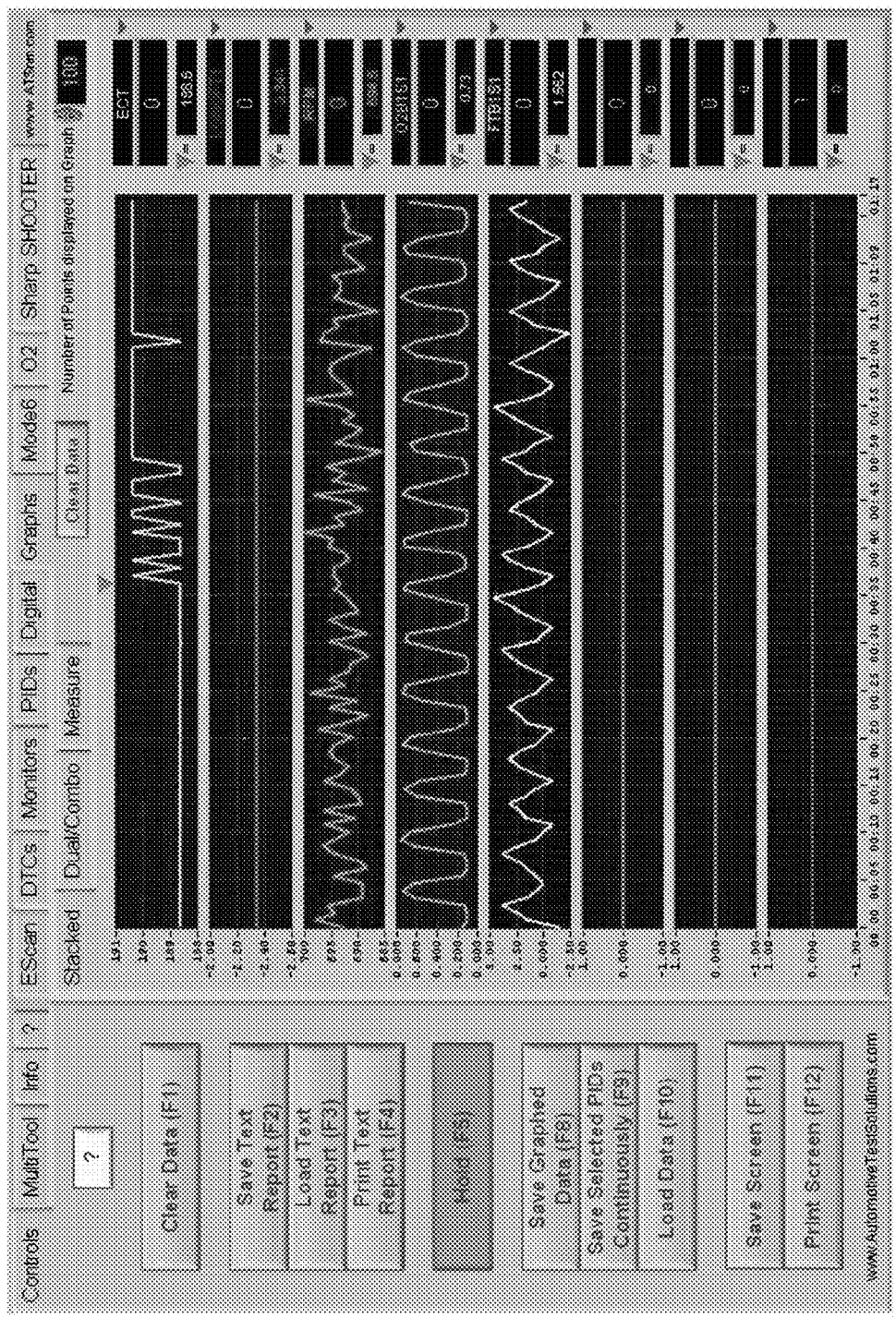
FIG. 9 is a color screen display in which the Graphs and Stacked tabs are open to display the PIDS for the 2000 Toyota 4Runner in graph form and the Control tab is open instead of the Info tab.
Figure 10:
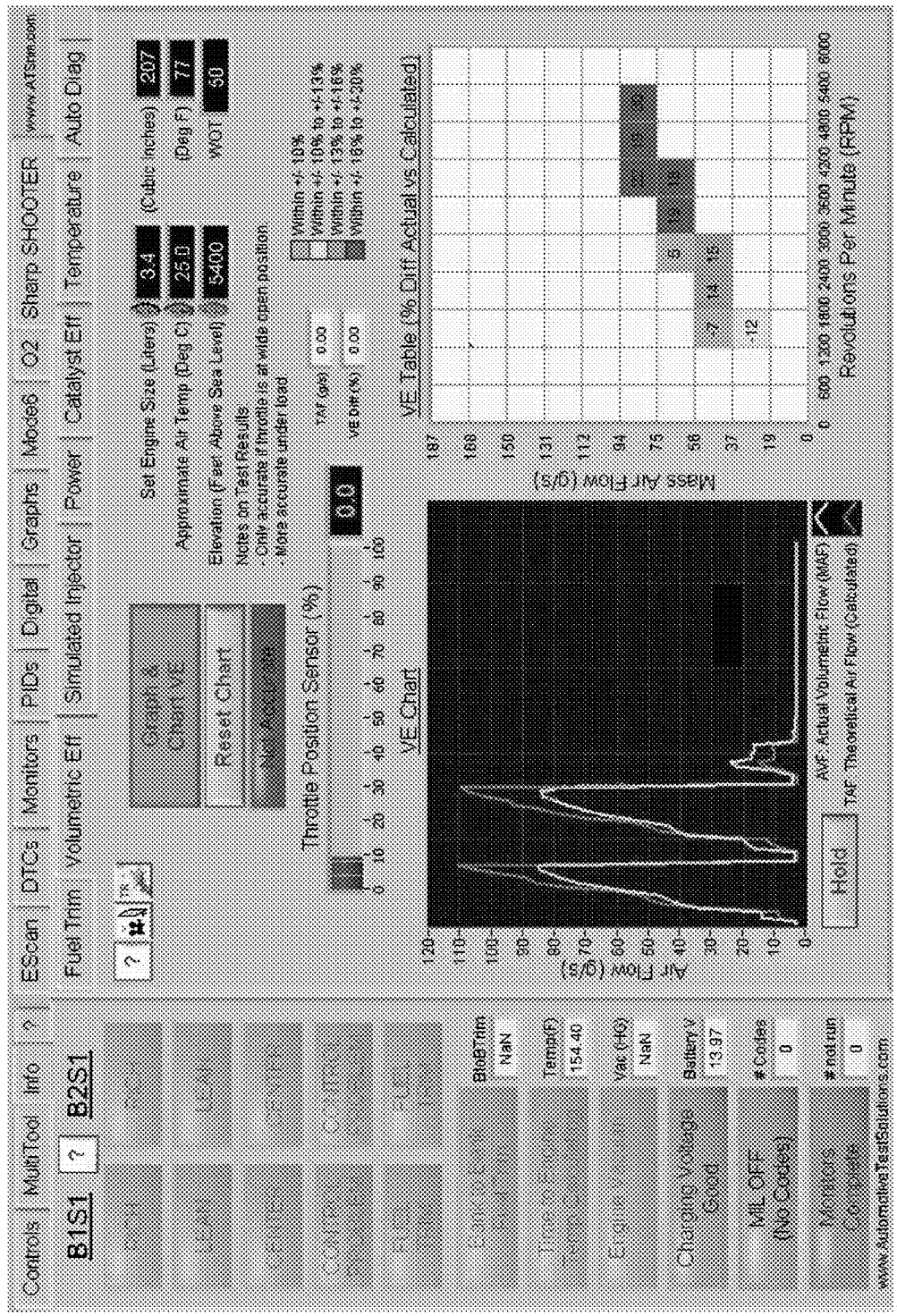
FIG. 10 is a color screen display showing the Sharp SHOOTER and Volumetric Efficiency tabs open to display volumetric efficiency test data for the 2000 Toyota 4Runner, including the VE Chart and the VE Table of the present invention.

With reference to FIGS. 1 and 2, analysis tool 11, hardware wise a microprocessor such as a laptop computer, includes a screen 13 which is divided into an alert light indicator display 15 and a data display 17. Display 15 includes tabs "Controls", "MultiTool", "Info" and "?". Display 17 has top level tabs "EScan", "DTCs", "Monitors", "PIDs", "Digital", "Graphs", "Mode 6", "O2" and "Sharp Shooter". Each of the tabs is associated with a particular screen display (e.g., FIG. 2) or a set of second level tabs and associated screens (e.g., FIG. 10), which is activated by the mouse (not shown) of the laptop. In FIG. 2, the Info and Digital tabs have been clicked on to open the associated screens. With reference to FIG. 9, clicking on the Graphs tab gives the user the choice of three types of displays "Stacked", "Dual/Combo" (not shown), and "Measure" (also not shown). The Dual/Combo screen allows the technician to chart up to 4 sensors (B1S1, B2S1, LTFTB1S1 and LTFTB2S1). (As is evident from paragraphs such as [0051], [0052], and [0065], B1 stands for Bank 1, S1 stands for Sensor 1, LTFT stands for long term fuel trim, etc.) These charts will be auto scaled, with the scaling being displayed on the left side of the screen. The Measure screen allows the technician to plot saved or live data and to apply zoom features and measurements to the data being displayed. Further, as is evident from, for instance, FIG. 13, clicking on the Sharp Shooter tab gives the user the choice of six different screens, "Fuel Trim", "Volumetric Eff" (for volumetric efficiency), "Simulated Injector", "Power", "Catalyst Eff" (for catalyst efficiency), "Temperature", and "Auto Diag" (for automatic diagnosis).

Display 15, Info includes "Rich" lights, "Lean" lights, "Center" lights, "Control Problem" lights, and "Fuel Trim" lights. One set of the foregoing is provided for B1S1 (bank 1, sensor 1), the other for B2S1. B1S1 is the sensor O2 in front of the catalytic converter and is also referred to herein as O2B1S1. B2S1 is for the second O2 sensor in front of the vehicle's catalytic converter and is also referred to as O2B2S1. However, not all vehicles have such a second front sensor. The term bank refers to a bank of cylinders in an engine (e.g., 4, 5 or 6 inline cylinders are usually designated a bank; each side of a V8 or V6 is a bank). In FIG. 2, the Info screen also includes "Bank to Bank Fuel Trim", "Time to Engine Temperature", "Engine Vacuum", "Charging Voltage", "MIL OFF" and "Monitors Complete". In addition to the lights, each of the foregoing is associated with a window showing the actual value (e.g., "Temp(F) 183.20"). MIL stands for malfunction indicator light. In FIG. 2, the MIL OFF light is green indicating that there are no DTCs, which is also confirmed with the 0 in the "#Codes" box. The Controls screen (see FIG. 9) provides controls (activated by clicking the mouse incorporated into the laptop) for clearing data, saving data, loading data, saving screen, and printing screen. The key strokes (e.g., F1) refer to standard keyboard keys. The MultiTool screen (FIG. 40) provides links to other tools such as a gas analyzer. The ? tab, as well as the ? buttons on the Info screen and the various data display screens open help screens in display 15. The ? button on the Info screen is linked to information related to the Info screen. The ? button on each data screen is linked to information specific to the associated data screen. The ? tab opens the immediately previously opened help screen.

With reference to FIG. 1, analysis tool 11 is connected to power train control module (PCM) 21 via data link connector 23, interface 25 and cables 27 and 29. As is well known, interface 25 converts the protocol of tool 11 to the particular ID protocol used by the PCM. Once connected, tool 11 requests (via conventional software) and is provided with the ID protocol of module 21 which will be one of the following: GM J1850 VPW; Ford J1853 PWM; CAN 150 15765; KWP ISO 14230; and ISO 9141-2. VPW stands for variable pulse width; PWM for pulse width modulated; CAN for controller area network; and KWP for key word protocol.

Once the protocol is identified, tool 11 pulls all the PIDS available from module 21. As those skilled in the art will appreciate, the number of PIDS varies with vehicle make, model and year. The basic (i.e., minimum) PIDS are set forth in Table I, below.

TABLE I

ETC (engine coolant temperature)
LTFTB1 (long term fuel trim, bank 1)
Engine RPM
MAP (manifold absolute pressure)
or MAS (mass air flow)
or both
O2B1S1 (oxygen sensor, bank 1, sensor 1)
O2B1S2 (oxygen sensor, bank 1, sensor 2)
STFTB1 (short term fuel trim, bank 1)
Calculated Load
Vehicle Speed Sensor
Ignition Timing Advance for #1 Cylinder
Intake Air Temperature
Absolute Throttle Position Tool 11 also acquires the voltage, either from power train control module 21 or from DLC 23, or both, depending on the make, model and year of the vehicle.

Table II sets forth all the generic (e.g., OBDII generic) PIDS currently potentially available.

TABLE II

Supported PIDS 0x01-0x20 (Status Query)
Monitor Status Since DTCs Cleared
DTC that Caused Required Freeze Frame
Fuel System 1 & 2 Status
Engine Coolant Temperature
Short Term Fuel Trim Bank 1
Long Term Fuel Trim Bank 1
Short Term Fuel Trim Bank 2
Long Term fuel Trim Bank 2
Fuel Rail Pressure (Gauge)
Intake Manifold Absolute Pressure
Engine RPM
Air Flow Rate from Mass Air Flow Sensor
Commanded Secondary Air Status
Location of Oxygen Sensors (2 Banks, 4 Sensors Each)
O2 Bank 1 Sensor 1
O2 Bank 1 Sensor 2
O2 Bank 1 Sensor 3
O2 Bank 1 Sensor 4
O2 Bank 2 Sensor 1
O2 Bank 2 Sensor 2
O2 Bank 2 Sensor 3
O2 Bank 2 Sensor 4
OBD Requirements to Which Vehicle is Designed
Location of Oxygen Sensors (4 Banks, 2 Sensors Each)
Auxiliary Input Status
Time Since Engine Start
Supported PIDS 0x21-0x40 (Second Status Query)
Distance Traveled While MIL is Activated
Fuel Rail Pressure Relative to Manifold Vacuum
Fuel Rail Pressure
Bank 1 Sensor 1 (Wide Range O2S) (V)
Bank 1 Sensor 2 (Wide Range O2S) (V)
Bank 1 Sensor 3 (Wide Range O2S) (V)
Bank 1 Sensor 4 (Wide Range O2S) (V)
Bank 2 Sensor 1 (Wide Range O2S) (V)
Bank 2 Sensor 2 (Wide Range O2S) (V)
Bank 2 Sensor 3 (Wide Range O2S) (V)
Bank 1 Sensor 4 (Wide Range O2S) (V)
Commanded EGR
EGR Error
Commanded Evaporative Purge
Fuel Level Input
Number of Warm-ups Since DTCs Cleared
Distance Since Diagnostic Trouble Codes Cleared
Evap System Vapor Pressure
Barometric Pressure
Bank 1 Sensor 1 (Wide Range O2S) (mA)
Bank 1 Sensor 2 (Wide Range O2S) (mA)
Bank 1 Sensor 3 (Wide Range O2S) (mA)
Bank 1 Sensor 4 (Wide Range O2S) (mA)
Bank 2 Sensor 1 (Wide Range O2S) (mA)
Bank 2 Sensor 2 (Wide Range O2S) (mA)
Bank 1 Sensor 3 (Wide Range O2S) (mA)

TABLE II-continued

Bank 1 Sensor 4 (Wide Range O2S) (mA)
Catalyst Temperature Bank 1, Sensor 1
Catalyst Temperature Bank 2, Sensor 1
Catalyst Temperature Bank 1, Sensor 2
Catalyst Temperature Bank 2, Sensor 2
Supported PIDS 0x41-0x60 (Third Status Query)
Monitor Status this Driving Cycle
Control Module Voltage
Absolute Load Value
Commanded Equivalence Ratio
Relative Throttle Position
Ambient Air Temperature
Absolute Throttle Position B
Absolute Throttle Position C
Accelerator Pedal Position D
Accelerator Pedal Position E
Accelerator Pedal Position F
Commanded Throttle Actuator control
Minutes run by the Engine while MIL Activated The number of PIDS available from Table II depends on the make, model and year of the vehicle. In operation tool 11 queries the vehicles PCM to determine which of the first 20 PIDS are, in fact, supported. Those which are available are pulled. Thereafter, tool 11 queries the PCM to determine which of PIDS 21-40 are supported. Again, those which are available are pulled. Finally, tool 11 queries the PCM to determine which of PIDS 41-60 are available and pulls those that are supported. The PID values are actually hexadecimal as indicated by "0x" (e.g., 0x21-0x40).

While the PIDS in the foregoing tables are both generic (e.g., OBDII generic), there are enhanced PIDS and codes (e.g., OBDII enhanced) which are also available on vehicles that could be used with the present invention.

Figure 3:
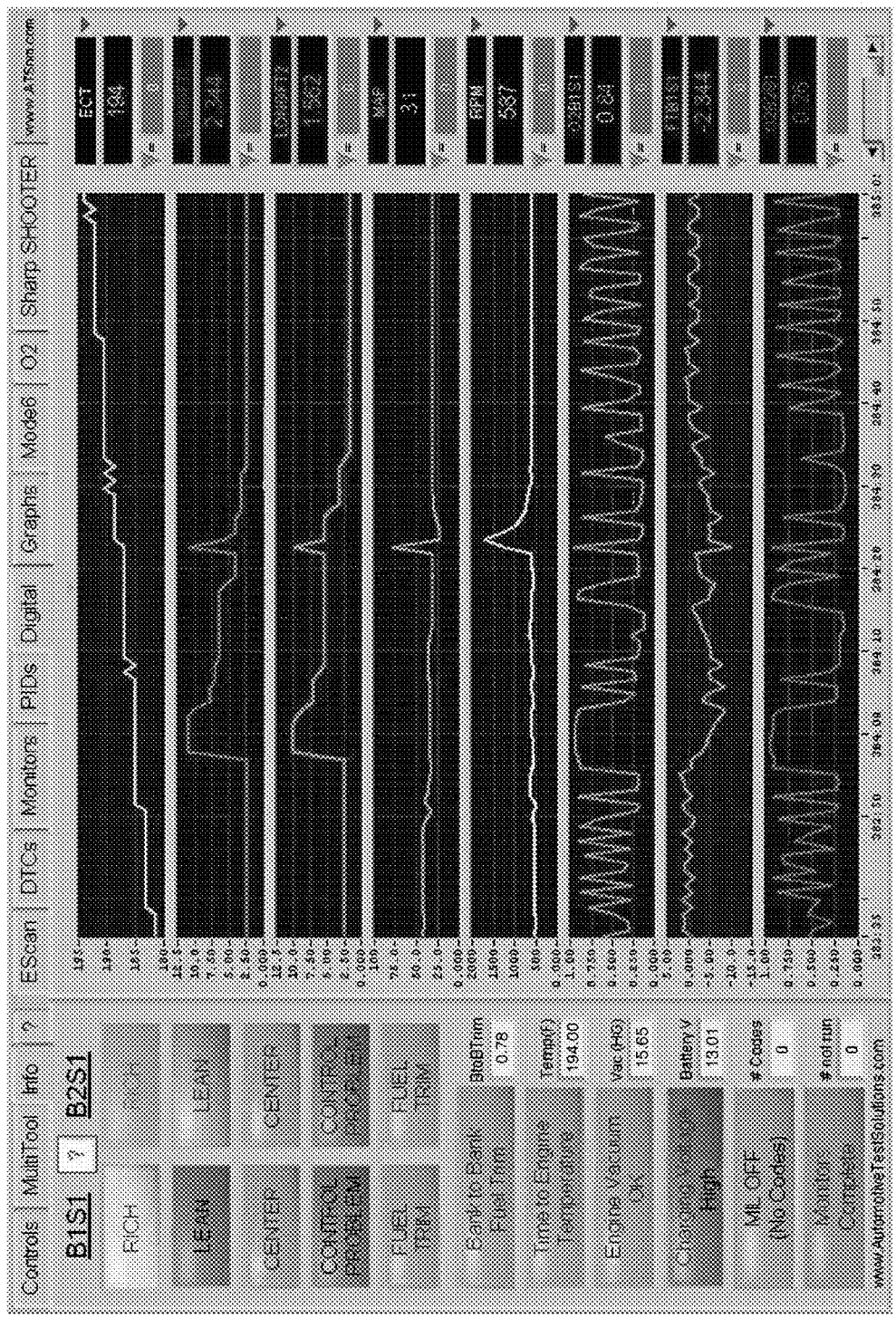
FIG. 3 is a sample color screen display showing the incoming data in graph form, with a digital readout, and certain alert lights activated.

As is evident from FIG. 1, unprocessed PID data can be displayed on screen 17 as slide bars (as illustrated in FIG. 2) or as a graph with a digital readout (as illustrated in FIG. 3). In FIG. 3, for instance: "ECT" stands for engine coolant temperature; "LONGFTB1", for long term fuel trim, bank 1; "LONGFTB2", for long term fuel trim, bank 2; "MAP" for manifold absolute pressure; "RPM" for engine revolutions per minute; "O2B1S1", O2 sensor, bank 1, sensor 1; "FTB1S1" for short term fuel trim, bank 1; and "O2B2S1", for O2 sensor, bank 2, sensor 1.

From the generic PIDS (Tables I & II), tool 11 calculates and displays 18 Calculated PIDS. Tables III and IV set forth these PIDS and the associated methods for their determination.

TABLE III

CALCULATED PIDS METHOD

| | |
|---|---|
| Bank 1 Total Trim | Select LTFTB1. Select O2B1S1 sensor. Add LTFTB1 to STFTB1. |
| Bank 2 Total Trim | Select LTFTB2. Select O2B2S1 sensor. Add LTFTB2 to STFTB2. Query PCM to see if B2S1 PID is enabled. Must have B2S1 to calculate this PID. |
| Cross Counts B1S1 | Program counts how many times per second (Hz) the O2B1S1 voltage crosses 0.45 volts. The result will be greater or less than zero depending on what the cross count rate is. Select O2B1S1 sensor. Each time O2 voltage crosses 0.45 v add 1 count. Add counts together for a period of 1 sec. |
| Cross Counts B2S1 | Program counts how many times per second (Hz) the O2B2S1 voltage crosses 0.45 volts. The result will be greater or less than zero depending on what the cross count rate is. Select O2B2S1 sensor. Each time O2 voltage |

TABLE III-continued

CALCULATED PIDS METHOD

| | |
|---|---|
| | crosses 0.45 v add 1 count. Add counts together for a period of 1 sec. Query PCM to see if this PID is enabled. Must have B2S1 PID to calculate this PID. |
| Cross Counts B1S2 | Program counts how many times per second (Hz) the O2B1S2 voltage crosses 0.45 volts. The result will be greater or less than zero depending on what the cross count rate is. Select O2B1S2 sensor. Each time O2 voltage crosses 0.45 v add 1 count. Add counts together for a period of 1 sec. |
| Cross Counts B2S2 | Program counts how many times per second (Hz) the O2B2S2 voltage crosses 0.45 volts. The result will be greater or less than zero depending on what the cross count rate is. Select O2B2S2 sensor. Each time O2 voltage crosses 0.45 v add 1 count. Add counts together for a period of 1 sec. Query PCM to see if this PID is enabled. Must have B2S2 PID to calculate this PID. |
| Engine Vacuum | Select MAP sensor. Select Barometric Pressure. Subtract Barometric Pressure from Absolute Manifold Pressure. |
| Engine Running Time | Select RPM. Monitor RPM count higher than 0 RPM against a timer. |
| B1 Fuel Control Monitor | Select O2B1S1 Sensor. Time O2 Voltage above 0.45 v (rich). Time O2 voltage below 0.45 v (lean). Read out % rich, % lean. |
| B2 Fuel Control Monitor | Select O2B2S1 Sensor. Time O2 Voltage above 0.45 v (rich). Time O2 voltage below 0.45 v (lean). Read out % rich, % lean. Query PCM to see if this PID is. Must have B2S1 PID to calculate this PID. |
| Bank 1 to Bank 2 Fuel Trim | Add LTFTB1 to LTFTB2. Query PCM to see if B2S1 PID is enabled. Must have B2S1 PID to calculate this PID. |
| Catalyst Efficiency | Use catalyst efficiency algorithm as set forth below. Bank 1. |
| Catalyst Efficiency | Use catalyst efficiency algorithm as set forth below. Bank 2. Query PCM to see if this PID is enabled. Must have B2S1 PID to calculate this PID |
| Voltage at DLC | Monitor voltage at DLC. |
| Closed O2 Loop Status 1 | Get O2 status from PID. |
| Closed O2 Loop Status 2 | Get O2 status from PID. |
| Theoretical Air Flow | Select RPM, MAS (grams/sec.) and ATP. |
| Volumetric Efficiency Percent | Select RPM, MAS (grams/sec.) and ATP. |

In the above table, the O2B1S1 PID includes STFTB1.

TABLE IV

Calculated PIDS

| Name | Abbrev | Units | Actual PIDS Needed | Computation |
|---|---|---|---|---|
| Bank 1 Total Trim | Total Trim B1 | % | STFT1, LTFT1 | [STTF + LTFT] |
| Bank 2 Total Trim | Total Trim B2 | % | STFT2, LTFT2 | [STFT + 'LTFT] |
| Cross Counts e O2B1S1 | O2Cross11 | Hz | O2B1S1 | O2 voltage crosses 0.45 v, Hysteresus 0.05 V |
| Cross Counts e O2B2S1 | 02Cross21 | Hz | O2B1S2 | O2 voltage crosses 0.45 v, Hysteresus 0.05 V |
| Cross Counts O2B1S2 | O2Cross12 | Hz | O2B2S1 | O2 voltage crosses 0.45 v, Hysteresus 0.05 V |
| Cross Counts O2B2S2 | 02Cross22 | Hz | O2B2S2 | O2 voltage crosses 0.45 v, Hysteresus 0.05 V |
| Engine Vacuum | Vacuum | HG | MAP, RPM, BARO | BARO - MAP |
| Engine Running Time | RunTime | S | RPM | Time RPM > O |
| Fuel Control Monitor Bank1 | FCtrlMonB1 | % | O2B1S1 | Rich if > 0.45 V [(Time Rich – Time Lean)/Tot Time)] * 100 = [2 * Trich – Ttime)/Ttime)] * 100 |
| Fuel Control Monitor Bank2 | FCtrlMonB2 | % | O2B2S1 | Rich if > 0.45 V [(Time Rich – Time Lean)/Total Time)] * 100 = [2 * Trich – Ttime)/Ttime)] * 100 |
| Bank 1 to Bank 2 Fuel Trim | BtoBFT | % | LTFTB1, LTFTB2 | LTFTB1 + LTBTB2 = Bank to Bank Fuel Trim |
| Catalyst Efficiency Bank1 | CatEffB1 | % | O2B1S1, O2B1S2, RPM | See CAT EFF (Catalytic Efficiency) Paragraph [0086] |
| Catalyst Efficiency Bank2 | CatEffB2 | % | O2B2S1, O2B2S2, RPM | See CAT EFF (Catalytic Efficiency) |
| Battery Voltage at DLC | BatteryV | V | | Voltage at DLC |
| Closed O2 Loop 1 Status 1 | ClosedLp1 | On Off | FUELSYS1 | Fuel System 1 & 2 Status |
| Closed O2 Loop 2 Status 2 | ClosedLp2 | On Off | FUELSYS2 | Fuels System 1 & 2 Status |
| Theoretical Air Flow | TAF | g/s | MAS, RPM, ATP | TAF = (RPM/120) * AirDen (air density) * AltCorn (altitude correction) |
| Volumetric Efficiency Percent | VE % | % | MAS, RPM, ATP | AVF (actual volumetric efficiency)/TAF * 100% |

BARO stands for barometric pressure. In most vehicles this information comes from the MAP sensor. Some vehicles (e.g., Cadillac) have a separate barometric pressure sensor. Theoretical Air Flow (TAF) is how much air an engine could pump at 100% efficiency. Voltage at DLC, Closed O2 Loop Status 1 and Closed O2 Loop Status 2 are included in the foregoing two tables even though they are not calculated PIDS as the information which they provide needs to be considered with the calculated PIDS. The foregoing calculated PIDS (Battery Voltage at DLC and Closed O2 Loops 1 & 2 being treated as such) are illustrated schematically in FIG. 1 as CPID 1-18.

In operation, once connected to DCL 23 via interface 25, tool 11 automatically selects from the available PIDS those which will activate the lights on display 15 and automatically enables the Info tab. If the particular vehicle being diagnosed does not have a bank 2 sensor 1 O2 sensor, the B2S1 lights will not be activated and will remain grey as is evident from the drawings (e.g., FIG. 4). The other lights are automatically lit depending on the value of read PIDS vs. Break Point (BP) values or an Algorithm (A), as set forth in Table V. The language in quotes corresponds to the nomenclature illustrated in display 15 in the various screen displays (e.g., FIG. 2).

TABLE V

| Light | Break Point ("BP") or Algorithm ("A") | Description |
| --- | --- | --- |
| The "Rich" Indication Alert Light | BP | If the oxygen sensor voltage is greater than 0.45 v, the light will be activated yellow. This indicates the air/fuel ratio is less that 14.7 to 1 or rich. |
| The "Lean" Indication Alert Light | BP | If the oxygen sensor voltage is less than 0.45 v, the light will be activated blue. This indicates the air/fuel ratio is greater than 14.7 to 1 or lean. |
| The "Center" Indication Alert Light | A | If the oxygen sensor's voltage is both greater than 0.55 v and less than 0.35 v and is cycling at the proper frequency evenly between rich and lean air/fuel mixtures, then the light will be activated green. This is an indication that the fuel control system has good control over fuel delivery and it is maintaining a 14.7 to 1 air/fuel ratio. If the rich and lean lights are active but the center light is not turned on then the fuel control system does not have good delivery. |
| The Fuel "Control Problem" Indication Alert Light | A | If the fuel delivery system has failed to control the proper air/fuel ratio, the light will be activated red. If the fuel delivery system has failed for longer than 15 seconds, then the red fuel control problem light will begin flashing. |
| The "Fuel Trim" Indication Alert Light | BP | If the long term fuel trim is less than +/−10%, the light will be activated green. If the long term fuel trim is between +/−10% and +/−13%, the light will be activated yellow. If the long term fuel trim is between +/−13% and +/−20%, the light will be activated orange and the light will be activated red when the long term fuel trim is greater than +/−20%. |
| The "Bank To Bank Fuel Trim" Indication Alert Light | BP | If the long term fuel trim from bank one and bank two is +/−5%, the light will be activated green. If the long term fuel trim from bank one and bank two is between +/−5% and +/−8%, the light will be activated yellow. The light will be activated orange when the long term fuel trim is between +/−8% and +/−10%. The light will be activated red if it is greater than +/−10%. |

TABLE V-continued

| Light | Break Point ("BP") or Algorithm ("A") | Description |
| --- | --- | --- |
| "Time To Engine Temperature" Alert Light | A | If during engine warm up the temperature is slow (DegF/sec < 0.05) to increase, the light will be activated yellow. If during warm up the operating temperature of the engine is not achieved in a predetermined time, the light will turn red, indicating the time to engine temperature has failed. If the engine overheats, the light will turn red and flash indicating that the engine is overheated. When the coolant has reached the point when the thermostat opens the display will change and alert the technician that the thermostat has been opened. If the thermostat fails to open or there is a flow problem the light will turn color. Existing cooling system problems may be indicated by further watching the temperature. Engine Coolant Range/Overall calculation for Info tab: StartDeg = Temperature that engine starts at (Deg F.) StartSec = Time that engine starts (sec) DegF/sec = Present Temperature(F)/Time Since Engine Started (sec) Before reaching 190 F. (not warmed up yet): Yellow if warming too slow (<0.05 DegF/Sec) Blue if OK or if during $1^{st}$ 40 seconds of warmup Orange if warming too fast (>0.40 DegF/Sec Red if overheated (T > 240 F.) After reaching 190 F.: Red if overheated, or if time to 190 F. < 0.05 DegF/Sec, or >0.40 DegF/Sec Green if OK (T between 190 F. and 240 F. and warmup time OK) |
| "Engine Vacuum" Alert Light | BP | This will only be active if the engine is equipped with a MAP sensor. With the key on and the engine off, the light will indicate the barometric pressure. If the barometric pressure sensor misreads, the light is turns red with the message "Baro Misreading". If the barometric pressure is correct, the light will be green with the message "Baro Good". The cranking vacuum is checked when the engine is turned over for 3 seconds. If it is greater than 1" HG, the light turns green with the message "Cranking Vacuum Good". If the reading is less than 1" HG, the light is turned red with the message "Cranking Vacuum Bad". Once the engine is running, a calculation is done that compares the engine vacuum to the barometric pressure. If the engine has good vacuum, the alert light is turned green with the message "Engine Vacuum Good". If the engine vacuum is slightly low, the alert light is turned yellow with the message "Engine Vacuum Low". If the engine vacuum is low, the alert light is turned red with the message "Engine Vacuum Low". If there is no MAP sensor this light is not illuminated. See, for instance, FIG. 4. |
| Battery "Charging Voltage" Alert Light | BP | If the battery open circuit voltage is low, the light is turned red with the message "Battery Voltage Low". If the battery open circuit voltage is good, the light is turned green with the message "Battery Voltage Good". If the battery open circuit voltage is high, the light is turned red with the message "Battery Voltage High". During cranking, the cranking voltage is checked. If the cranking voltage is low, the battery voltage alert light is turned red with the message "Cranking |

TABLE V-continued

| Light | Break Point ("BP") or Algorithm ("A") | Description |
|---|---|---|
| | | Voltage Low". If the cranking voltage is good, the battery voltage alert light is turned green with the message "Cranking Voltage Good". Once the engine is running, the battery voltage alert light monitors the charging system. If the charging system has low voltage, the battery voltage alert light is turned red with the message "Charging System Voltage Low". See, for instance, FIG. 6 . If the charging system has good voltage, the battery voltage alert light is turned green with the message "Charging System Voltage Good". See, for instance, FIG. 4 . If the charging system has high voltage, the battery voltage alert light is turned red with the message "Charging System Voltage High". |
| Malfunction Indicator Light ("MIL") Alert Light | Counter | If no diagnostic trouble codes are present, the light is turned green, the message "MIL OFF" (No DTCs) displayed, with the number '0' displayed. If there are diagnostic trouble codes, the light is turned red with the number of diagnostic trouble codes (DTC) present displayed. For example, if there is 1 DTC present the light is turned red and the number 1 displayed. See FIG. 18. If there are codes present but the PCM did not request for the MIL to be lit the light will be yellow. If the PCM requests for the MIL to be turn on the light will be red. |
| "Monitor" Light | BP | If all monitors have run the monitor light is Green #0. If monitors have not run the monitor light is red with number of monitors not run listed. |

The various Break Points, algorithms and the counter identified above are schematically illustrated in FIG. 1 as: boxes BP1-BP7; boxes A1-A3; and box C.

In order for the technician or the automated diagnostic system to correctly diagnose the car, several additional, novel tests and charts have been developed. These consist of fuel trim, engine volumetric efficiency, simulated injector, power, catalyst efficiency, and engine coolant range. In the drawings (e.g., FIG. 11) the screen tabs are designated, respectively: "Fuel Trim", "Volumetric Eff", "Simulated Injector", "Power", "Catalyst Eff", and "Temperature". The last second level tab on the right, "Auto Diag", is discussed below.

Fuel Trim Charts

When an engine is originally programmed, a linear equation from idle to wide open throttle is written by the manufacturer. However, since no engine has a linear air flow curve, fuel delivery based on such a linear model is adjusted by the manufacturer by what is known as a fuel mapping table, which is programmed into the PCM. In the operation of a vehicle, if all the PCM's calculations (based on sensor inputs) are correct, the injector on time based on the mapping table will not need to be changed. Thus, what is known as fuel trim will remain at or close to '0'. If the PCM calculations are off the injector on time will automatically be adjusted to add or subtract fuel so that the air/fuel ratio will remain at 14.7 air to 1 fuel for all engine speeds. This shift that is created by the feedback system is given to the technician as fuel trim (e.g., the LTFT PID, the STFT PID). If the long term trim (LTFT) exceeds +/−10%, it is recommended that the vehicle's fuel control system be repaired.

Figure 11:
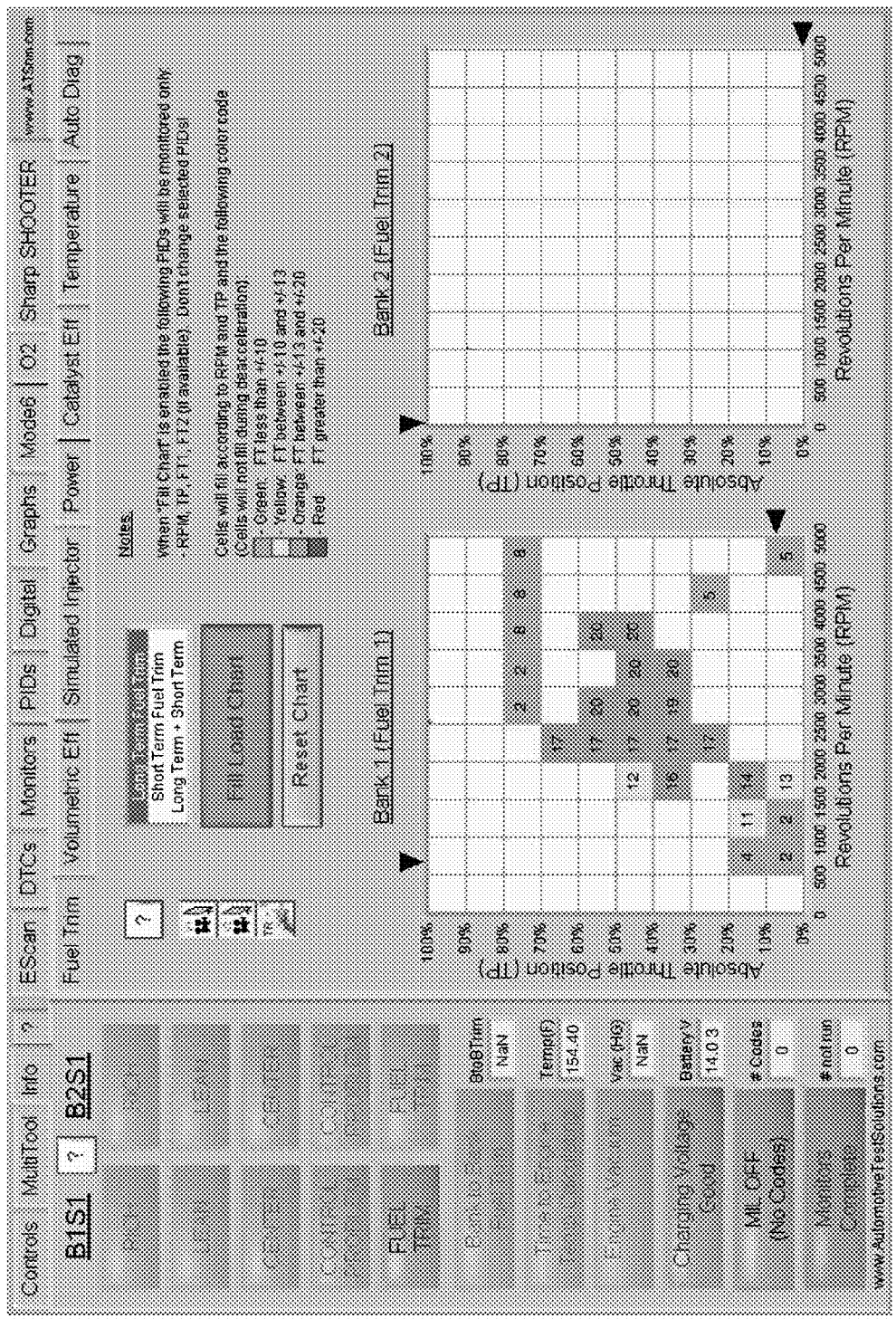
FIG. 11 is another color screen display in which the Sharp SHOOTER and Fuel Trim tabs are open to show the fuel trim readings at absolute throttle position v. engine RPM for the 2000 Toyota 4Runner (data is only displayed in the "Bank 1 (Fuel Trim 1)" chart as a Toyota 4Runner only has one front O2 sensor)
Figure 12:
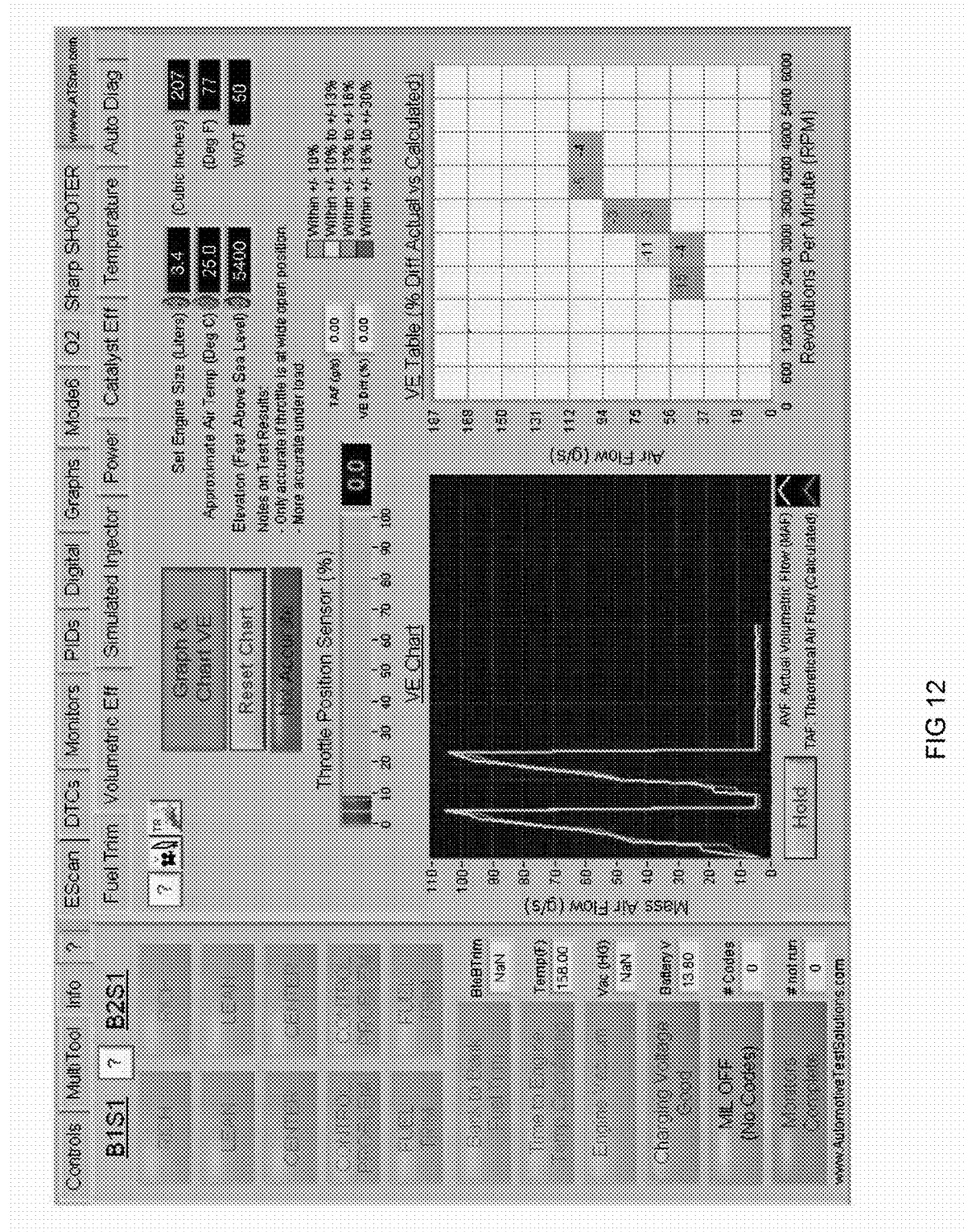
FIG. 12 is a second color screen display showing the volumetric efficiency test data for the 2000 Toyota 4Runner after the mass air flow sensor (MAF) has been removed and cleaned.
Figure 13:
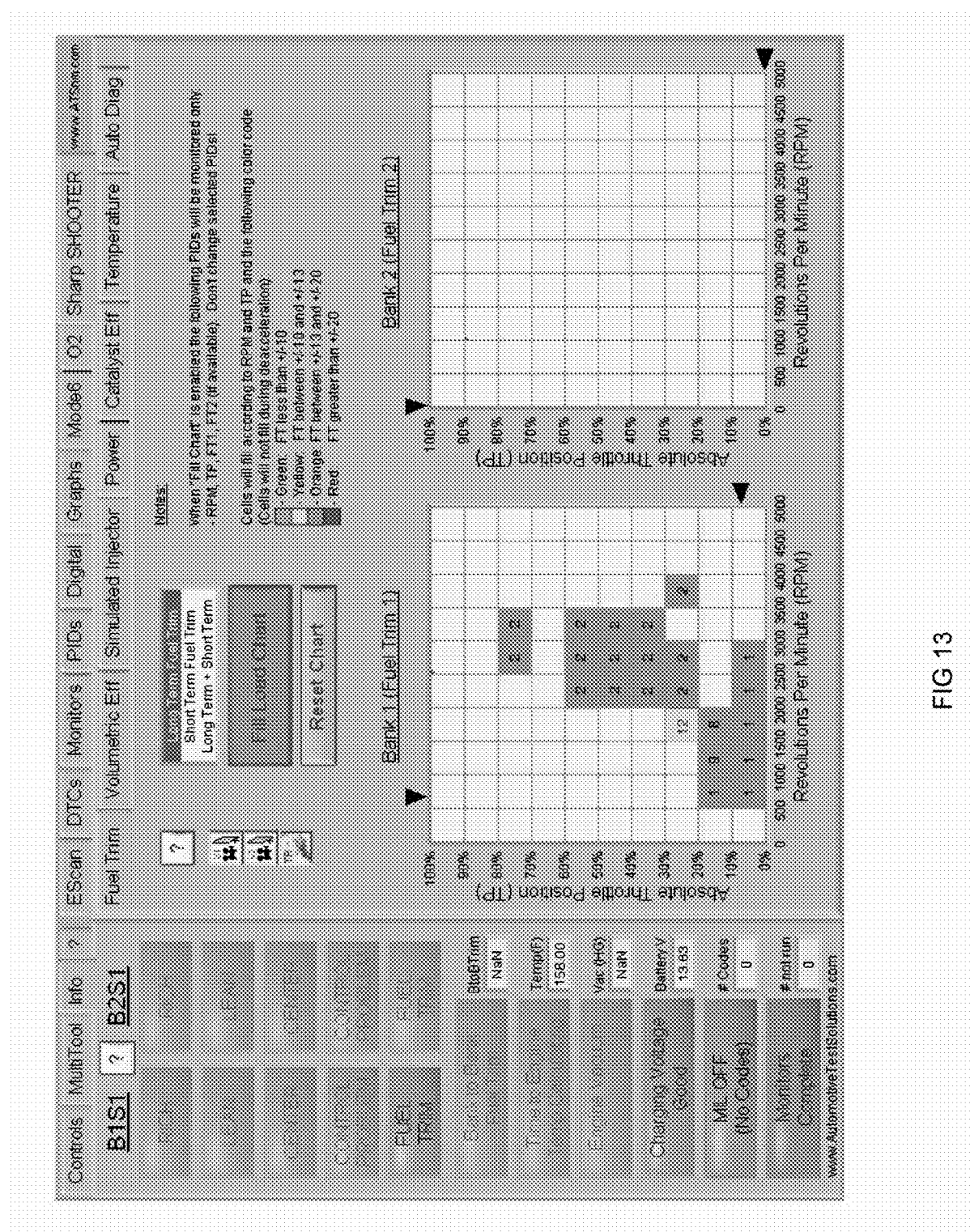
FIG. 13 is a second color screen display showing the load charts (Bank 1 (Fuel Trim 1)) for the 2000 Toyota 4Runner after the MAF has been removed and cleaned.
Figure 16:
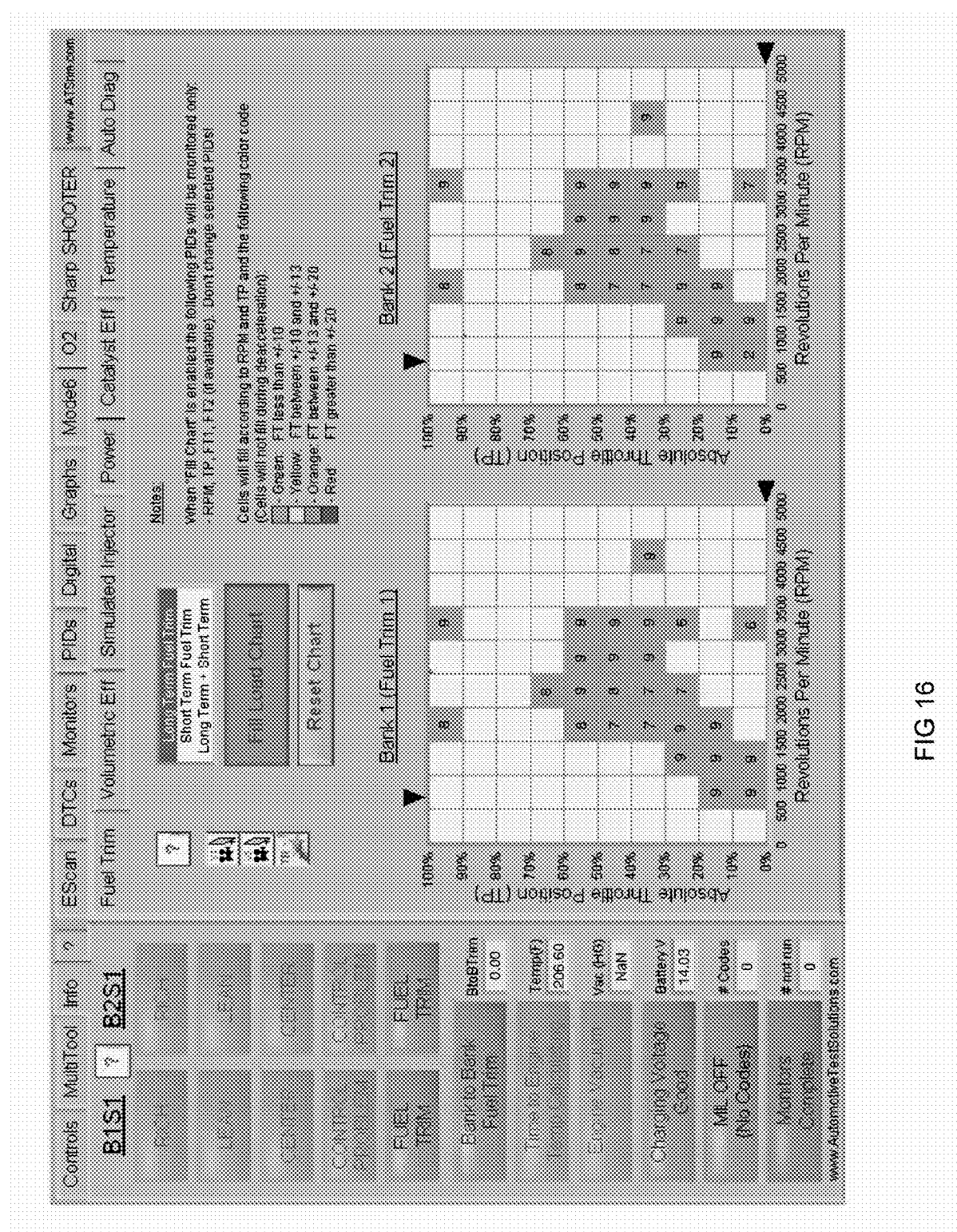
FIG. 16 is a color screen display with the Sharp SHOOTER and Fuel Trim tabs open for the 1999 GMC Sierra to show the load charts (both Bank 1 and Bank 2 because this vehicle has 2 front O2 sensors) before any repair.
Figure 17:
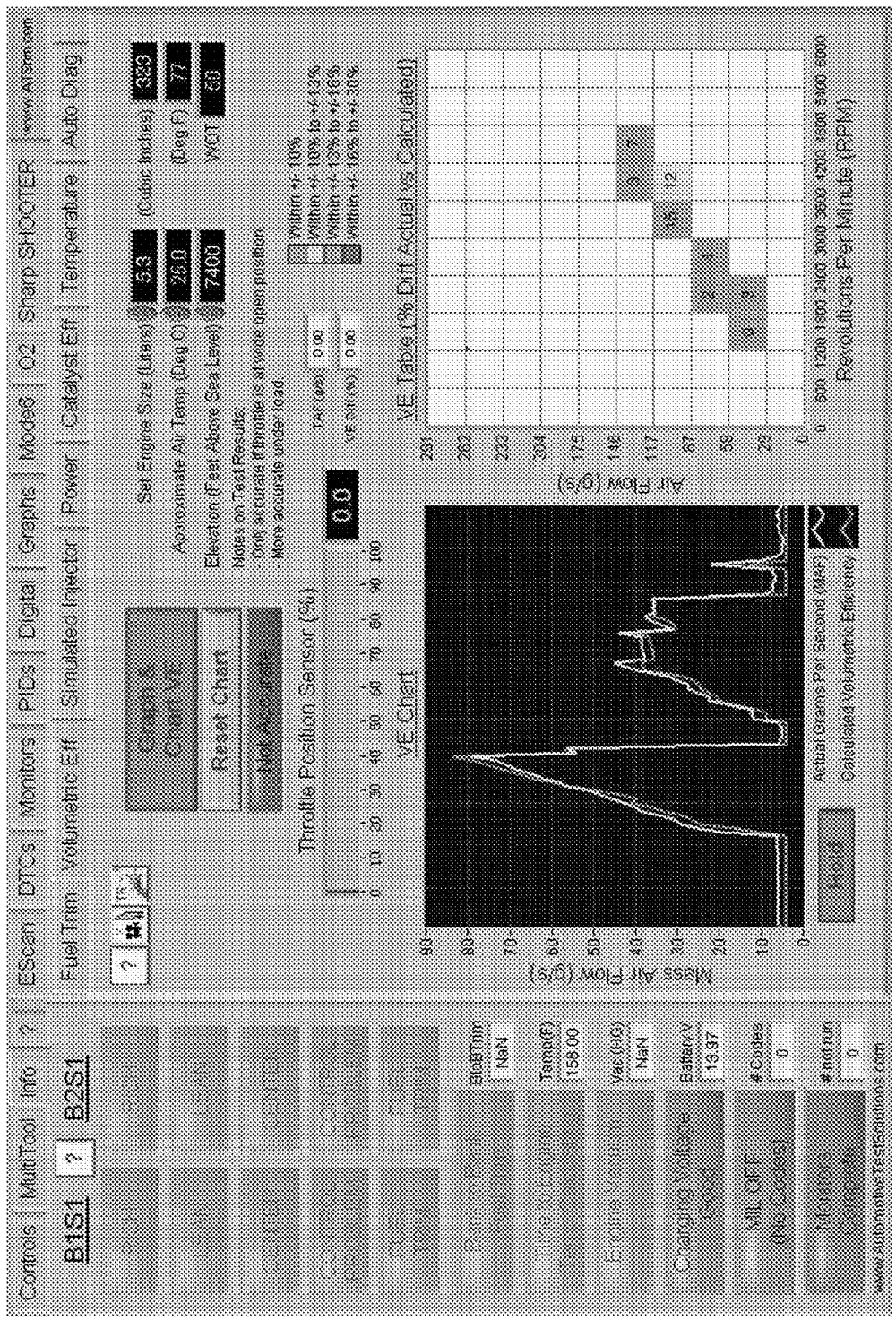
FIG. 17 is a second color screen display for the 1999 GMC Sierra showing the volumetric efficiency data after the catalytic converter was replaced.

The Fuel Trim Charts of the present invention, such as illustrated in FIGS. 11, 13, and 16, are the technician's window into the PCM's fuel delivery program. To make sense of the raw fuel trim data from the PCM (e.g., put it in perspective), the Fuel Trim Chart is broken up into cells which represent Absolute Throttle Position (ATP; sometimes referred to as just TP) against RPM. The ATP represents the load on the engine. As the engine speed increases (both RPM and ATP increase) the PID data (e.g., LTFTB1) from the PCM is assigned to different cells. At the same time the amount of fuel trim (as described below) is assigned a particular color. In operation the vehicle should be, but does not have to be, taken on a test drive and the cells are filled between idle and wide open throttle (WOT).

PIDS monitored to fill the Fuel Trim Chart: RPM, ATP, LTFTB1, STFTB1 and LTFTB2 (if available). The LTFTB2 PID does not have to be monitored but is needed to fill the second chart labeled "Bank 2 (Fuel Trim 2)". The STFTB1 or B2 is needed when checking fast changes to the fuel control, or where total trim or LTFT has been cleared. Cells on the chart will fill according to RPM and ATP and the following color code. (Cells will not fill during deceleration.)

Green: FT (fuel trim) between −10 and +10
Yellow: FT between −13 and −10 OR between +10 and +13
Orange: FT between −20 and −13 OR between +13 and +20
Red: FT less than −20 OR greater than +20

As is evident from the figures, the Charts not only indicate the appropriate color, but also the positive (+) or negative (−) character. The application of this Chart to specific power plant problems is discussed below. See, for instance, FIG. 11 and the associated discussion.

Volumetric Efficiency (VE)

An engine is an air pump that pumps air into the intake and out the exhaust. Measuring the engine's actual volumetric efficiency (or VE), or the engine's actual ability to pump air, and comparing this actual efficiency with such engine's calculated VE can be used to indicate if there are problems with the mechanical condition of the engine (or the exhaust system) or the sensors used to read the air flow from the engine.

There are two air-fuel delivery systems used in modern vehicles. One is the speed density system and the other is the mass air flow system. These two systems can be used to produce the same result, namely: measuring the actual weight of the air flowing into the engine (in grams/sec.); and calculating a theoretical value (Calculated Volumetric Efficiency). These two systems use different sensors (the first is based on the MAP sensor; the latter, on the MAS (a/k/a MAF sensor). Because of this different calculations are necessary, as discussed below in reference to FIG. 10. While the results from these tests will be interpreted differently, the same information will be displayed on the screens.

The speed density system calculates the air flow to the engine by measuring the vacuum and multiplying this by the RPM, liter size of the engine, intake air temperature, and volumetric efficiency percent (the percentage TAF (theoretical air flow), as indicated by the red traces on the VE Charts, is multiplied by to get Calculated Volumetric Efficiency). The vacuum is measured by the manifold absolute pressure sensor (MAP). This sensor measures the difference in pressure between the barometric pressure and the intake manifold pressure. Thus, the PID that is read by tool 11 gives the absolute pressure within the manifold, not the intake manifold vacuum. As the throttle plate is opened the pressure differential between the barometric pressure and intake manifold pressure decreases. Thus, the MAP reading becomes closer to the barometric pressure reading. Since this MAP reading is what sets the fuel delivery of the engine (via injector on time), this reading can be put into a chart that will display the actual (assuming the sensor is not malfunctioning or misreading) grams per second of air flowing into the engine or the actual volumetric efficiency of the engine. This is the yellow trace on the VE Chart (e.g., FIG. 10). Further, if the actual VE reading is compared against a calculated VE reading (as described below) for the same engine, it can be determined if the engine (or the exhaust system) has a mechanical problem or if the MAP sensor itself has a failure.

This Calculated VE will be looked up from a VE Lookup Table (not shown) stored in tool 11 that uses the PID for the Absolute Throttle Position against the RPM to determine what the MAP sensor should read. The PIDS monitored to fill the Lookup Table, the VE Chart and the VE Table (% Diff Actual v. Calculated) are: RPM and MAP. The information needed to be entered is: liters (engine size), ambient air temperature, and Elevation (Feet Above Sea Level). Vacuum is barometric pressure (BARO) minus absolute pressure at sea level. The vacuum at idle is about 20" HG at sea level; about 15" HG at 5,500 ft. above sea level. However, the absolute pressure is the same at both elevations, namely, about 26-30 kpa at hot unloaded idle.

The Calculated VE from the MAP sensor is determined as follows (IAT=intake air temperature; TAF=theoretical air flow):

If Lookup Value based on Throttle Position>=0, use Lookup Val

If Lookup Value based on Throttle Position<=0, use BARO+Lookup Val

AirDens=353.155635/(AirDegC+273.15) (This shows how air temp modifies the equation.)

IAT$mx$=AirDens/1.184

AirFlow=RPM/60*Liters/
2*MAP*0.01*IAT$mx$*VE$mx$

TAFNoCorr: Same as above only does not use VE multipler (VEmx) (Used for the Calc PIDS.)

RPMEff (RPM Efficiency): 0.7 for 0-1000 RPM; 0.8 for 1000-1500 RPM; 0.9 1500-2000 RPM; 0.95 for 2000-3000 RPM; 0.95 for 3000-4000 RPM; and 0.95 for >4000 RPM.

The MAS sensor reads the air mass entering the engine directly. To calculate the VE with this sensor the liter size of the engine, barometric pressure, and intake air temperature must be known. If these variables are set correctly then both the actual and the calculated VE can be determined.

When using the MAS sensor the calculated VE is based on the following. The PIDS monitored to fill the VE Chart and VE Table are: RPM, MAS (a/k/a MAF) and ATP. The information needed to be entered is: liters (engine size), ambient air temperature and Elevation (Feet Above Sea Level). The VE Calc (VE Calculation) is as follows:

AltCorr(Altitude Correction): 1−(Alt/29900).

RPMEff (RPM Efficiency): 0.7 for 0-1000 RPM, 0.8 for 1000-1500 RPM, 0.8 1500-2000 RPM, 0.8 for 2000-3000 RPM, 0.85 for 3000-4000 RPM, 0.8 for >4000 RPM.

TP/VE Corrections at >50% TPS: 0% TPS=21.0%, 10% TPS=24.0%, 20% TPS=34.0%, 30% TPS=61.0%, 40% TPS=75.0%, 50% TPS=80.0%. Equation linear between set points.

Greater than 50% throttle: VE Calc=Liters*(RPM/120)*1.184*RPMEff*AltCorn.

Less than 50% throttle: vecALC=[Liters*(RPM/120)*1.184*RPMEff*AltCorn]*TP/VE Correction at<50% throttle.

Compare VECalc and MAP (Actual grams Per Second from PCM computer.

PercDiff (Percentage Difference between calculated and MAF)=(VECalc−MAF)/(MAF)*100.

Simulated Injector

The fuel injection system is about air flow and fuel flow. The air flowing into the engine is unknown and, therefore, must be equated for. Sensors (MAP or MAF, IAT, RPM, BARO) positioned in the induction system of the engine report vital information to the PCM which then uses this information to equate the air flowing into the engine by weight in grams per second (g/s). Once the air is known the proper amount of fuel by weight will be metered into the air. In most conditions this targeted air/fuel mixture is 14.7 lbs. of air to 1 lb. of fuel or 14.7 to 1. (For maximum power this air/fuel ratio will be approximately 12.5 to 1.) Unlike the air entering the engine, the amount of fuel being delivered to each cylinder is known. If the injector is a 5 lb. per hour injector, 0.036 grams per millisecond of injector on time will be delivered. Since this fuel rate is a known value no equation will be necessary.

If the PCM receives the correct sensor inputs (MAF or MAP, IAT, RPM, BARO) it will equate the correct air by weight entering the engine. It will then deliver the correct weight of fuel to the air. The engine will then burn the air/fuel mixture in the combustion process. As the burned air/fuel mixture is exhausted from the engine the oxygen sensor (e.g., O2B1S1) will check for the correct air/fuel ratio. If the mixture is correct there will be no fuel correction. This means the base air equation programmed into the PCM by the manufacturer will be multiplied by 1. However, if the mixture is incorrect the PCM will make a correction to the base air equation. If the air/fuel ratio is lean the base air equation will be multiplied by a number greater than 1 (e.g., a multiplier of 1.2 would increase the injector on time by 20%). If the air/fuel ratio is rich the base air equation will be multiplied by a number less than 1 (e.g., a multiplier of 0.8 would decrease the injector on time by −20%). This multiplier is referred to as fuel trim. The fuel trim is part of the feedback system that is in place to keep the air/fuel ratio at a target value determined by the PCM.

When this multiplier is greater than +/−10% a problem is indicated that will require repair. It would be desirable for a test to be run that would indicate where the problem is located in the fuel injection system. This is accomplished by a test sequence, referred to as the Simulated Injector, by taking the actual air flow given in grams per second and the calculated air flow given in grams per second and putting these values into the simulated injector equation of the present invention. The simulated injector equation takes the known value of the injector flow rate in lbs per hour and divides it into the air flow in grams per second. (A 1 lb/hr injector flow rate would equal 0.007 grams of fuel per millisecond of injector on time. If an injector flow rate of 5 lbs/hr were used the fuel injector would flow 0.036 grams of fuel per ms of injector on time.) By comparing the difference between the actual injector on time and the calculated injector on time a problem can be located. The location of the problem can be determined due to the fuel delivery system (injectors and fuel pressure) being constant. If the injector or fuel pressure varies, the fuel trim will have to compensate for this variation. This additional fuel trim will alter the base air equation. In this condition the actual injector on time will be different than the calculated injector on time. When the calculated injector on time and actual injector on time vary this is an indication the fuel delivery system is at fault. If the engine sensors miss read, the fuel trim will alter the base air equation so the air to fuel weight are corrected. Comparing the actual injection on time with the calculated injection on time will show that the injector on times match very closely to one another. This is an indication that the problem is in the sensors.

Actual injector on time is determined as follows:

Revolutions per minute/60 seconds=Revolutions per second(RPS)

Revolutions per second/4=Strokes per second(SPS)

Actual air flow in grams/second divided by air/fuel ratio=Fuel rate(FR)

Fuel rate divided by injector flow rate=Milliseconds of injector on time

Milliseconds of injector on time+1 millisecond injector turn on time=Injector on time Injector on time×fuel trim=Actual injector on time Calculated injector on time is determined as follows:

Revolutions per minute/60 seconds=Revolutions per second(RPS)

Revolutions per second/4=Strokes per second(SPS)

Calculated air flow in grams/second divided by air/fuel ratio=Fuel rate (FR)

Fuel rate divided by injector flow rate=Milliseconds of injector on time

Milliseconds of injector on time+1 millisecond injector turn on time=Calculated Injector on time By comparing the difference between the actual injector on time (which equates fuel trim) and calculated injector on time (which has no fuel trim equation), the vehicles fuel injection problem(s) can clearly be seen. If the problem is located in the vehicle's sensors (MAF or MAP, BARO, RPM, IAT, ECT, O2) the fuel trim will adjust the actual injector on time so that it is equal to the calculated injector on time. If the problem is in the fuel delivery system the fuel trim will adjust the actual injector on time so that it is different than the calculated injector on time.

Example 1

1999 GMC 5.3 liter engine with the air boot leaking bypassing the mass air sensor, which allows the mass air sensor to misread the air entering the engine.
VI Injector=5 lb per hour.
Actual Injector on Time:

3480RPM÷60 sec=58 RPS

58 RPS÷4=14.5 SPS

Actual air rate 105 GPS÷1405 SPS=7.24 GPS 7.24 GPS÷14.7 AF=0.492 FR 0.492 FR÷0.036 injector flow rate=13.68 ms 13.68 ms+1 ms injector turn on time=14.68 ms 14.68 ms×1.186FT=17.41 ms actual injector on time Calculated Injector on Time:

3480 RPM÷60 sec=58 RPS

58 RPS÷4=14.5 SPS

Calculated air rate 127.5 GPS÷1405 SPS=8.79 GPS 8.79 GPS÷14.7 AF=0.598 FR 0.598 FR÷0.036 injector flow rate=16.61 ms 16.61 ms+1 ms injector turn on time=17.61 ms 17.61 ms×1 FT=17.61 ms calculated injector on time Injector on time difference=0.2 ms. The percentage difference is 1.12. This indicates that the problem is a MAF sensor misreading.

Example 2

2001 Malibu 3.1 liter engine; purge control making fuel system rich; fuel problem; VI Injector=5 lb per hour
Actual Injector on Time:

3500 RPM÷60 sec=58.33 RPS 58.33 RPS÷4=14.58 SPS

Actual air rate 34.87 GPS÷14.58 SPS=2.39 GPS 2.39 GPS÷14.7 AF=0.162 FR 0.162 FR÷0.036 injector flow rate=4.51 ms 4.51 ms+1 ms injector turn on time=5.5 1 ms 5.51 ms×0.8FT=4.40 ms actual injector on time Calculated Injector on Time:

3500 RPM÷60 sec=58.33 RPS 58.33 RPS÷4=14.58 SPS

Calculated air rate 33.88GPS÷14.58SPS=2.32 GPS 2.32 GPS 14.7AF=0.158 FR 0.158 FR÷0.036 injector flow rate=4.39 ms 4.39 ms+1 ms injector turn on time=5.39 ms 5.39 ms×1FT=5.39 ms calculated injector on time Injector on time difference=0.99 ms. The percentage difference is 18. This would indicate that the problem is in the fuel delivery system.

If enhanced data is available (e.g., OBDII enhanced) the Simulated Injector value would correspond to the actual injector on time given by the PCM as a PID If the engine injector size is known, the calculation would give the actual injector on time of the engine. This actual PID value could be compared to a calculated injector on time and the difference would indicate where the problem is located in the injection system.

Power

It is desirable to know how much power an engine can produce. This can be used to detect if the engine can make its rated horsepower or the engine has low power. If the difference between actual horsepower and calculated horsepower can be determined, whether the engine's power is compromised or not can also be determined. In order to calculate the horsepower output of an engine the air flow rate in grams per second is used. An air flow rate of about 6 lbs/hour produces 1 horsepower of usable mechanical power at the flywheel of the engine. The air/fuel ratio will change this available power at the flywheel. (An air/fuel ratio of 12.5 to 1 produces more horsepower than an air/fuel of 14.7 to 1.) The power equation set forth below assumes that all the mechanical parts of the engine, including ignition timing, are functioning correctly in order for the calculated horsepower to correctly be equated to the actual horsepower.

Horsepower Equation:

$$HP = \text{air flow lb/hr} \div 2721.54 \text{ gram force.}$$

Since air flow problems can be corrected by fuel trim, the fuel trim (FT) will be multiplied by the horsepower.

Total Horsepower Equation: Total horsepower=FT×HP.

Catalyst Efficiency Test

Figure 19:
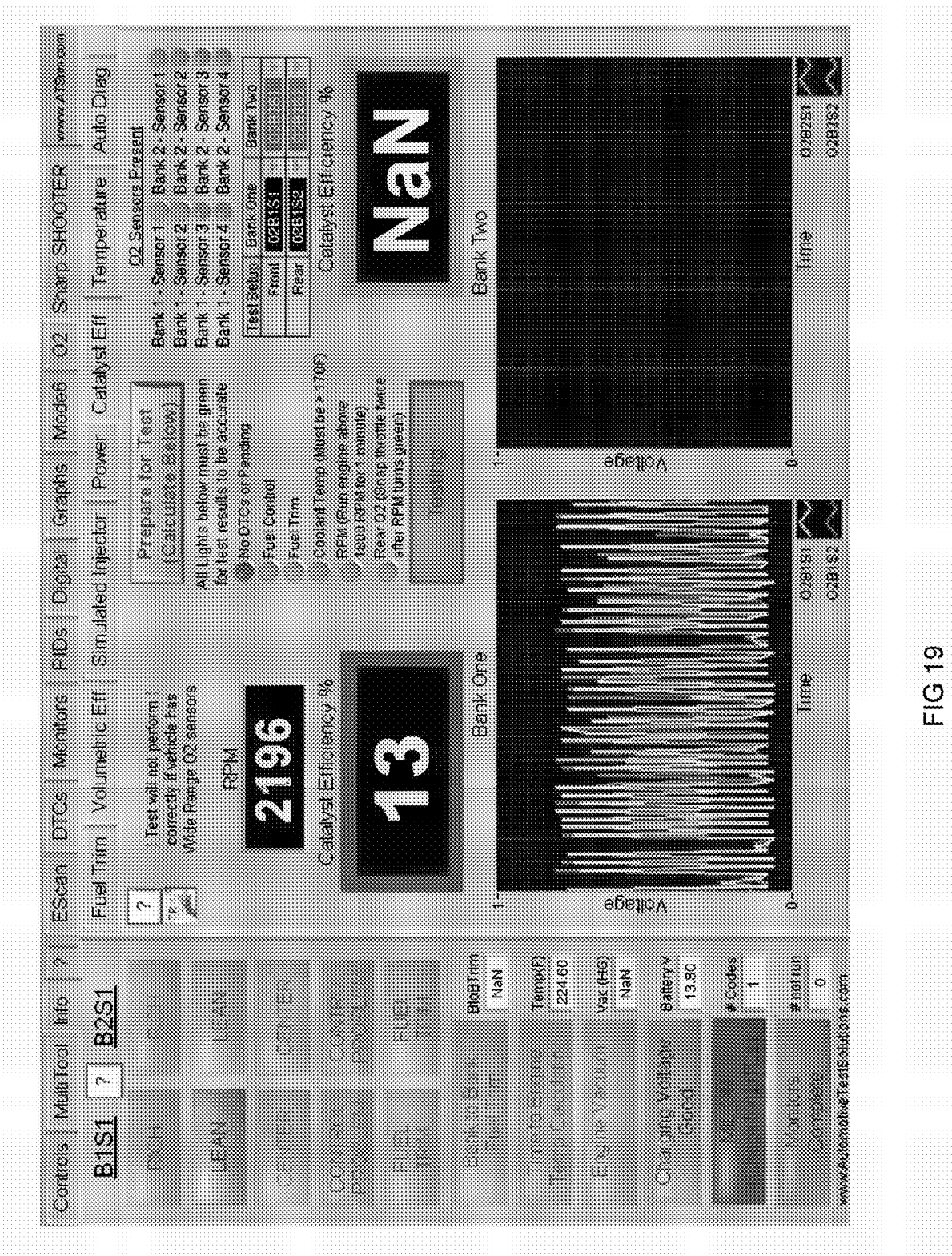
FIG. 19 is a color screen display showing the Catalyst Eff tab open to show the catalytic efficiency chart and data for the 1999 Dodge truck (a 1999 Dodge truck only has one front O2 sensor before the catalytic converter (O2B1S1), and one rear O2 sensor after the catalytic converter (O2B1S2))
Figure 20:
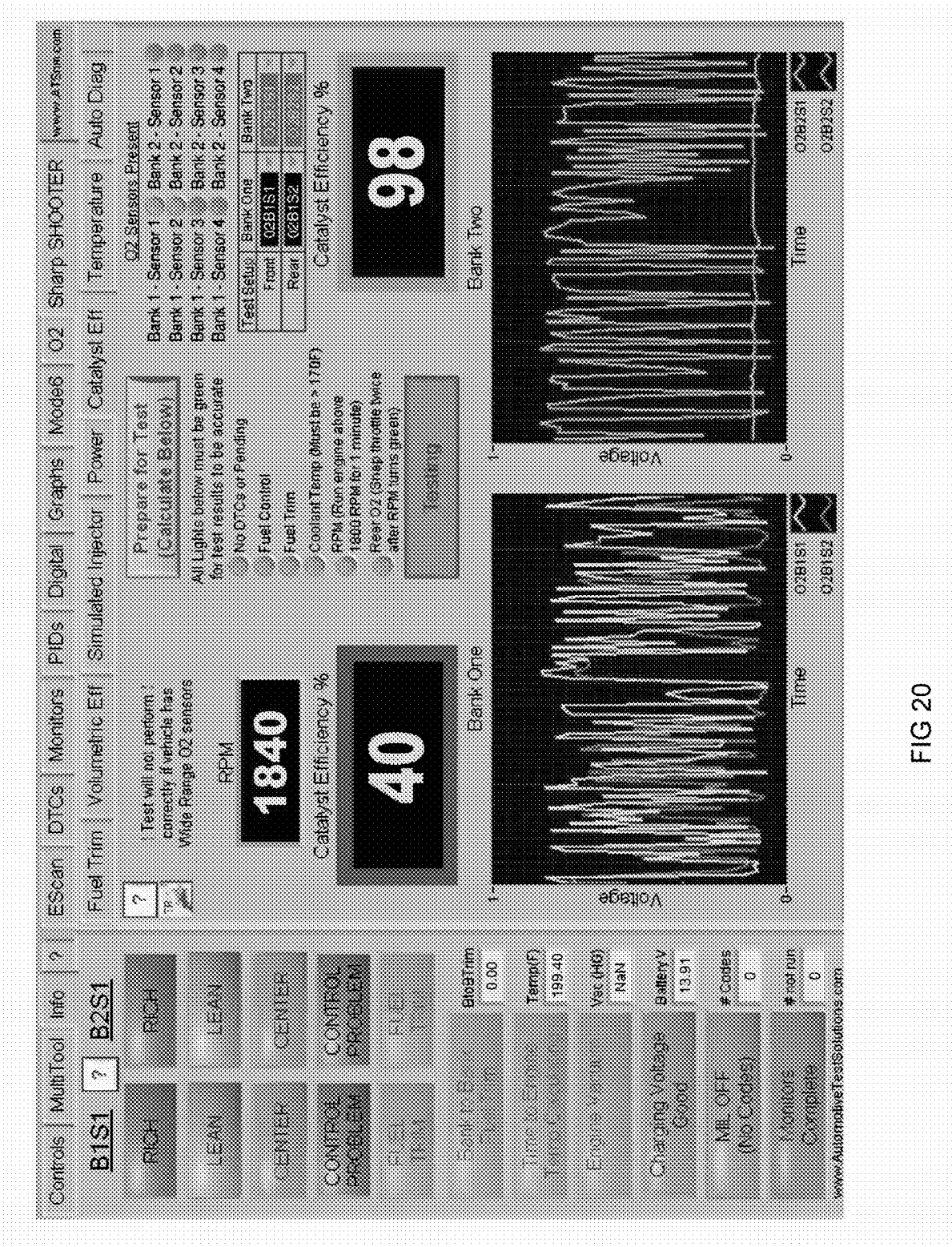
FIG. 20 is another color screen display in which the catalytic efficiency charts show one good and one bad catalytic converter.
Figure 21:
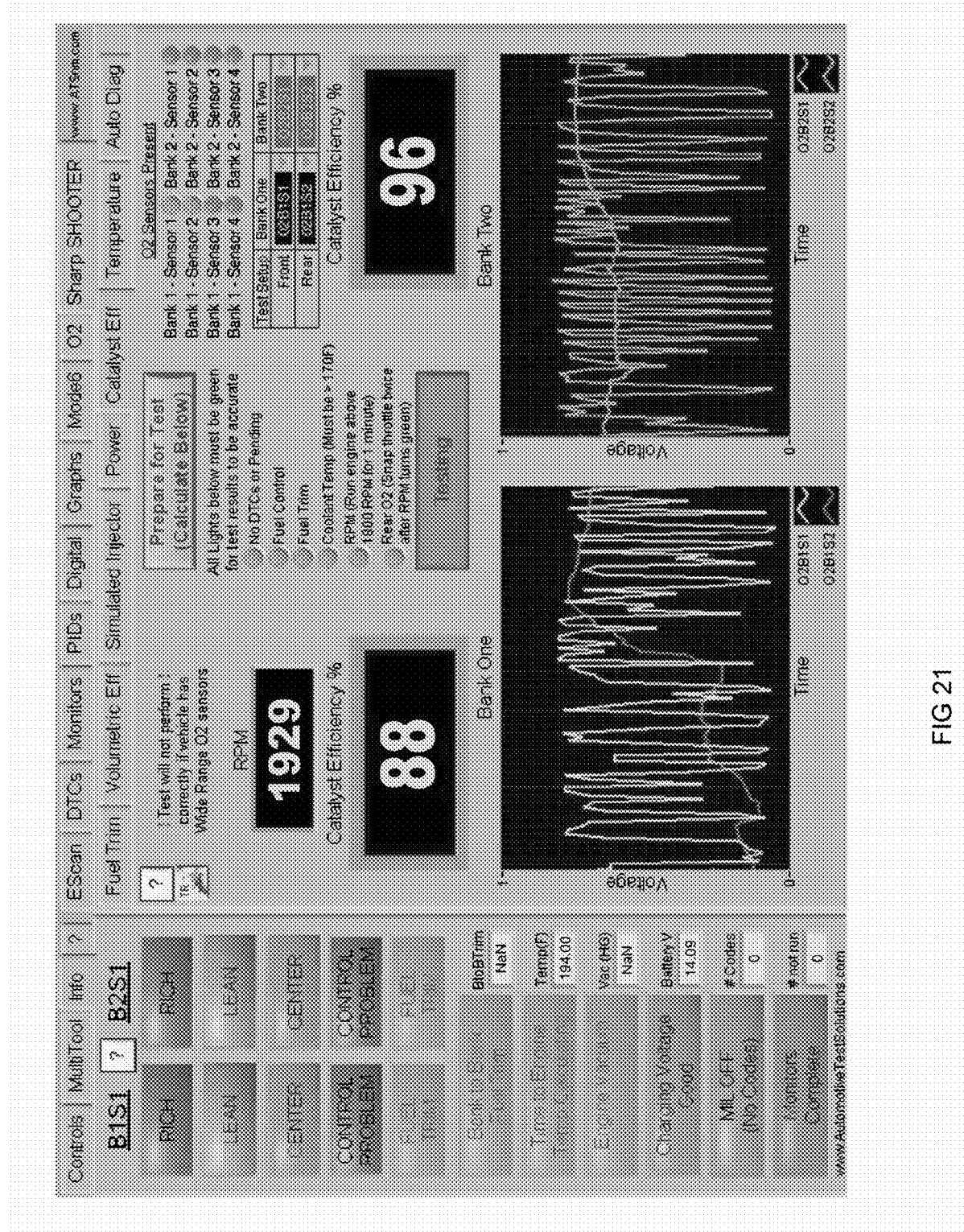
FIG. 21 is still another screen display showing two good catalytic converters.

The Catalyst Efficiency Test, illustrated in FIGS. 19-21, is a way the technician can confirm the present operation of a vehicle's catalytic converter. When testing the converter, it is important for the operating conditions to be correct before a judgment is passed on the condition of the catalytic converter. To test the operating conditions of the fuel control system, the "Prepare Test (Calculate Below)" button is pushed (top center of screen 17 in, for instance, FIG. 19). The button will turn green notifying the technician that the testing sequence has begun. All of the indication lights set forth below must turn from red to green for the results of this test to be accurate. However, the test can be run at any time by pushing the "Start Test" button in the middle of the screen (once pushed, the button reads "Testing" as illustrated).

The DTC Indication Light: The vehicle's PCM must not have any DTC's or pending codes available in order for this light to turn green.

The Fuel System Indication Light: The vehicle's PCM must be in control of the fuel system in order for this light to turn green.

The Fuel Trim Indication Light: The vehicle's PCM must have the long term fuel trim functioning between +/−10% in order for the light to turn green.

The Coolant Temperature Indication Light: The engine coolant temperature must be higher than 170° F. in order for the light to turn green.

The RPM Indication Light: The engine RPM must be held greater than 1800 for at least 1 minute in order for the light to turn green.

The Rear O2 Indication Light: The rear O2 sensor must be active and move rich to lean with the fuel system conditions in order for the light to turn green. As indicated on the screen, during the rear O2 test the technician is instructed to snap the throttle several times. This will allow the converter to become saturated and the rear O2 will follow the front O2 with a slight delay. Checking the rear O2 sensor is important not only for the catalyst efficiency, but also for the fuel control of the power plant. It accomplishes this by changing the fuel trim value. Note, however, if the vehicle has "Wide Range O2 sensors", the test will not perform correctly. Some vehicles misleadingly reference a WRAF (wide range air fuel) sensor as a B1S1 sensor. In such cases the data will not be correct and the test cannot be performed.

Once all indication lights turn green, the catalyst efficiency test can begin. It will take 20 seconds for the catalyst efficiency percent to be displayed in the window. Once the display has a digital reading the display boarder will turn color to indicate the condition of the catalytic converter. Green indicates a good converter. Yellow indicates that the converter is marginal. Orange indicates that the converter is going bad. Red indicates that the converter is compromised. To get the best results from this test, the vehicle should be run in three conditions: idle; high idle; and steady state curse. If the vehicle is being driven in stop and go traffic, the catalyst efficiency will drop to the 60% range with a good converter. Note: before the catalytic converter is to be replaced the technician should always check the DTCs for a catalyst efficiency code. If no code is present and the monitors have run, the Mode 6 data on the catalyst efficiency should be checked. If it shows good, replacement of the catalytic converter will not fix the vehicle unless it is restricted. If there is a code set and the catalyst efficiency shows good, check for a TSB (technical service bulletin from the manufacturer) on reprogramming the PCM.

The PIDS monitored to determine the Catalyst Efficiency and fill chart are: RPM, O2B1S1, O2B1S2, O2B2S1 and O2B2S2. Note that O2B2S1, O2B2S2 are only needed for the BANK TWO calculations.

Bx=B1 for BANK ONE calculation or B2 for BANK TWO calculation.

$$\text{AmpFront} = \text{O2Bx} \times \text{S1 Maximum} - \text{O2Bx} \times \text{S1 Minimum}$$

$$\text{AmpRear} = \text{O2Bx} \times \text{S2 Maximum} - \text{O2Bx} \times \text{S2 Minimum}$$

$$\text{Cat Eff \%} = (1 - \text{AmpRear}/\text{AmpFront}) \times 100$$

Catalytic Efficiency Color Codes are as follows:
Green: Cat Eff % greater than or equal to 80
Yellow: Cat Eff % between 70 and 79
Orange: Cat Eff % between 60 and 69
Red: Cat Eff % less than 60

Engine Coolant Range Chart

Figure 22:
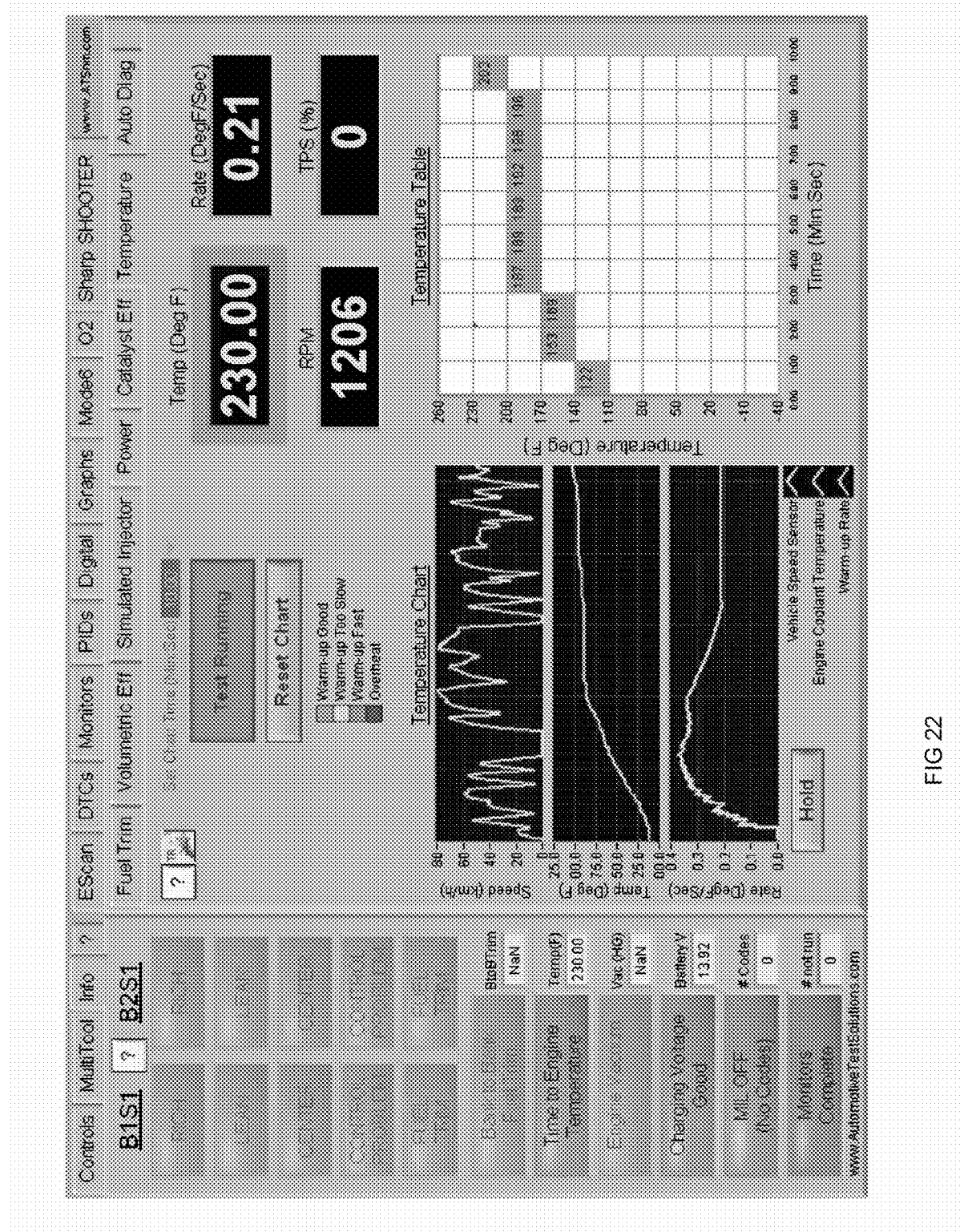
FIG. 22 is another color screen display with the Sharp SHOOTER and Temperature tabs open to illustrate the Temperature Charts and Temperature Table of the present invention.

The cooling system is a very important part of the operation and function of the fuel injection system. When the engine is first started the engine is at ambient temperature. In these conditions the fuel injection will need to add fuel or enrich the air/fuel mixture which could drop to about 10 to 1. In turn, this will increase the emissions at the tail pipe. Due to tighter governmental regulations this is undesirable. It is desirable to warm the engine rapidly to operating temperature, about 200° F. to 225° F. Once the engine is at operating temperature the fuel control system will target an air/fuel mixture of about 14.7 to 1. This will substantially decrease the tailpipe emission levels. During the chemical reaction between the oxygen and hydrocarbon chains heat energy is released from the burning fuel. About 35% of this heat energy is lost to the engine cooling system. The internal combustion engine's cooling system is designed to take on heat, created by this chemical reaction and the friction between the engine's moving parts, and exchange it into the ambient air. If the engine's cooling system cannot be maintained the emission levels rise at the vehicle's tailpipe. The mechanical parts of the engine can also be damaged in the event of the cooling system not maintaining the coolant temperature. Due to the importance of the cooling system upon the fuel injection and mechanical condition, it is desirable to have a test that checks the cooling system's function. The temperature chart in FIG. 22 is just such a test. By monitoring the coolant temperature increase, the rate that the coolant takes on heat can be calculated. If this rate is on target and obtains the correct operational temperature in a given time span, the coolant temperature sensor and cooling system are functioning properly. However, if these do not change at an expected target value the cooling systems operation is not functioning to its design. By monitoring the coolant temperature, the coolant temperature rate of change and the vehicle's speed, the coolant system can be diagnosed. This diagnostic can take place by the technician viewing the charts illustrated in FIG. 22 or an automated sequence of tool 11. Problems can be diagnosed such as: thermostats sticking open or closed, radiator air flow restrictions, radiator coolant passage restrictions, blown head gaskets, low coolant levels, and cooling fans not working properly.

With regard to the Temperature tab, the chart plot contains: speed; temperature (Deg F.); and rate (Deg F./Sec). These values, plus TPS (%) are also displayed digitally on the screen. The Temp (Deg F.) also has a border around it showing the most recent color code. The colors for Temp background and table cells (same as info light):

Green: Warm-up Good
Yellow: Warm-up Too Slow
Orange: Warm-up Too Fast
Red: Overheated With regard to the Temperature Table, the time for table fill can be selected as 2:30, 5:00, 10:00 or 15:00 (Min:Sec). This time is divided into 10 horizontal cells and ends up with 15, 30, 60, or 90 seconds per cell. The vertical cells go from −40 to 260 Deg F. and are divided between 10 sells (30 Deg F. per cell).

Figure 4:
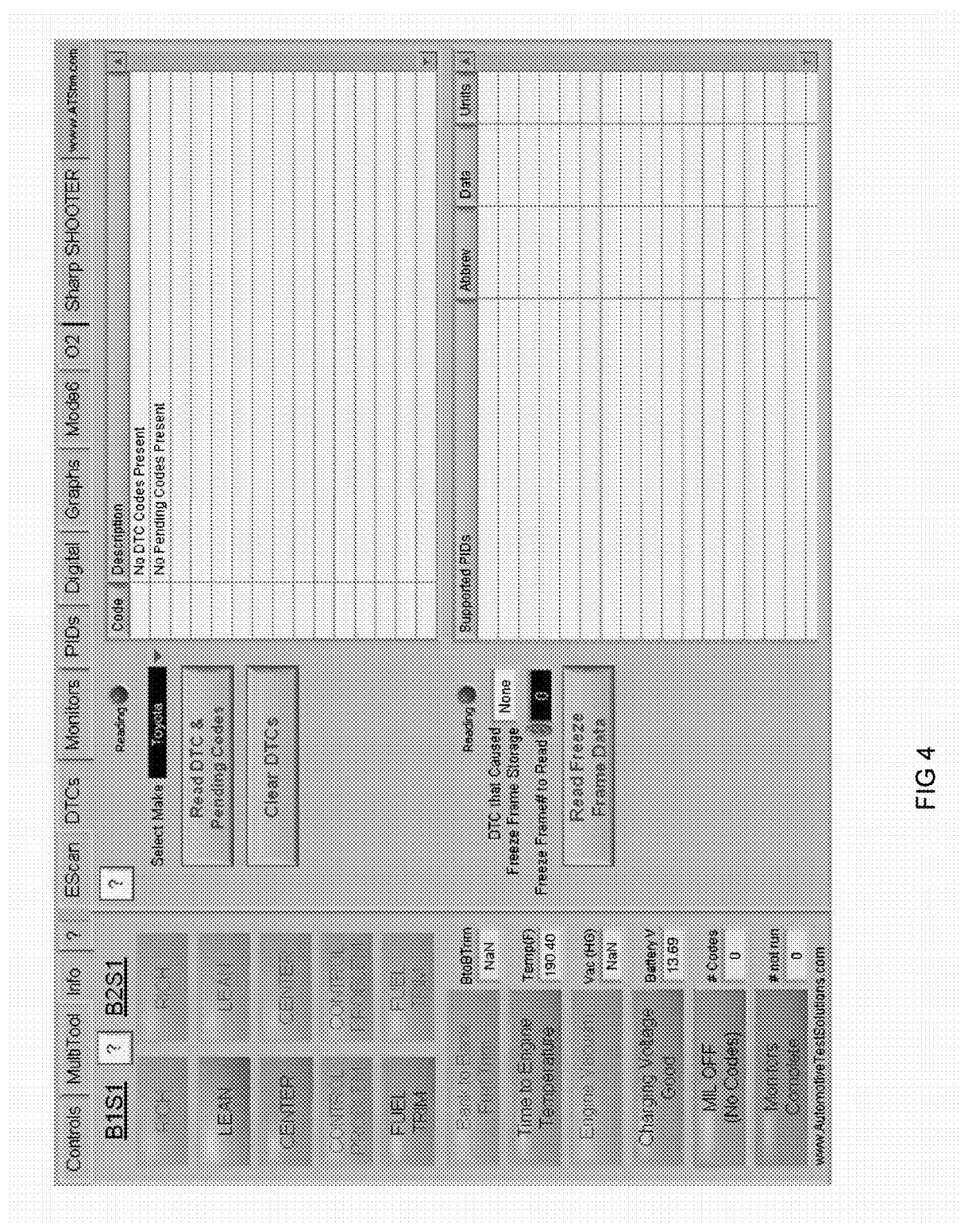
Figure 5:
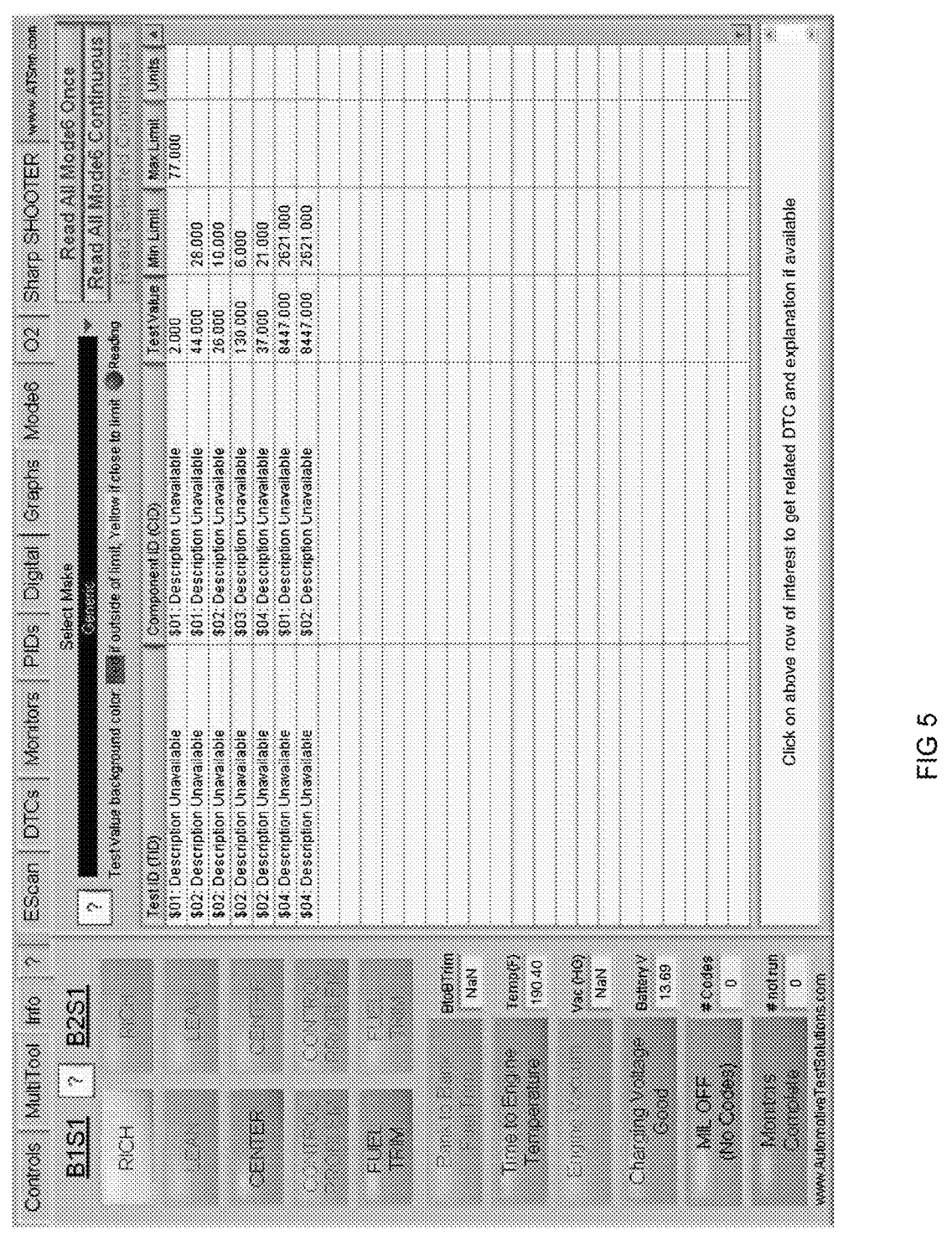
Figure 6:
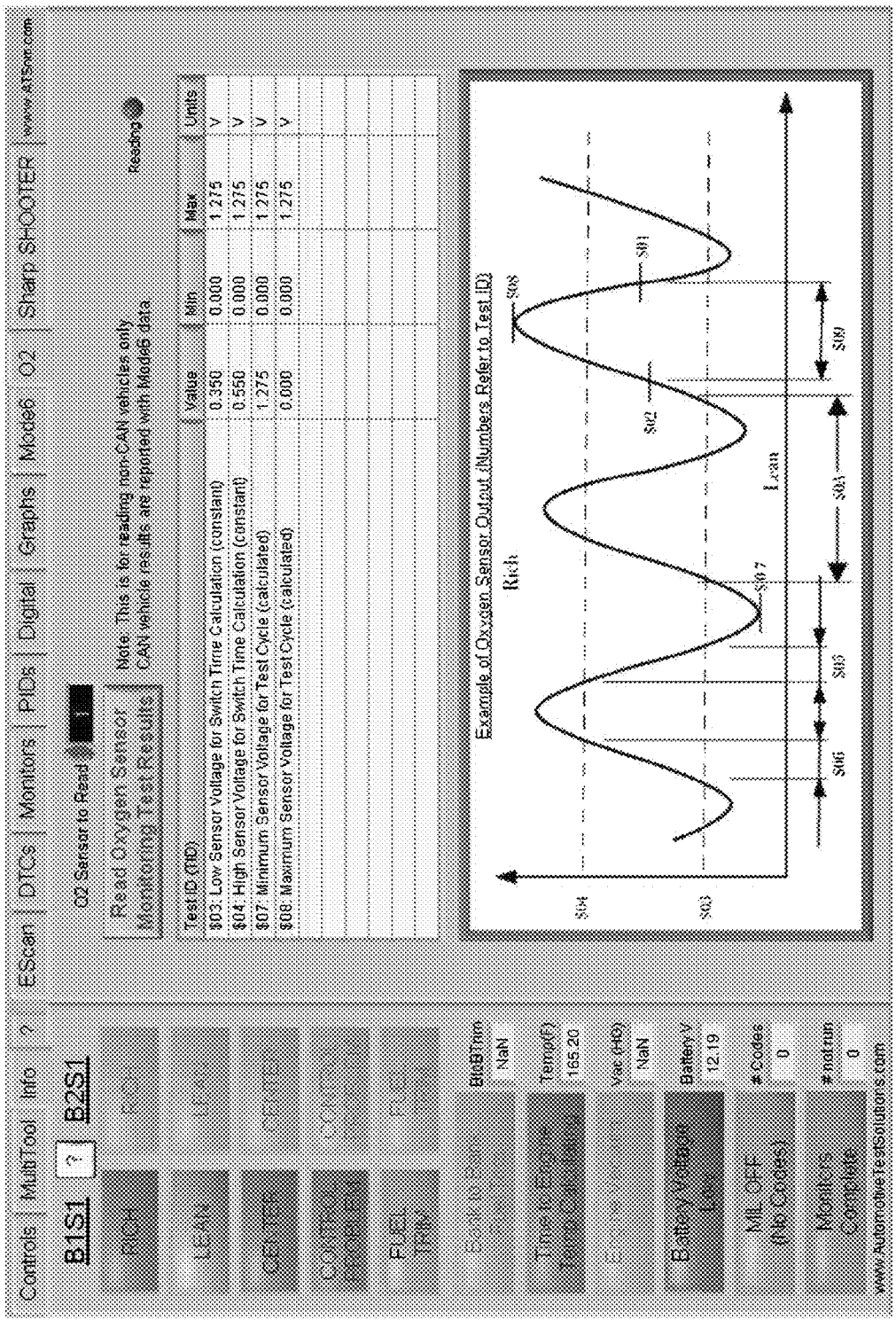
FIG. 6 is a color screen display showing the Mode 5 (the tab is marked "O2" as technicians generally understand O2 sensor testing but may not be familiar with the designation "Mode 5") data for the Toyota 4Runner.
Figure 7:
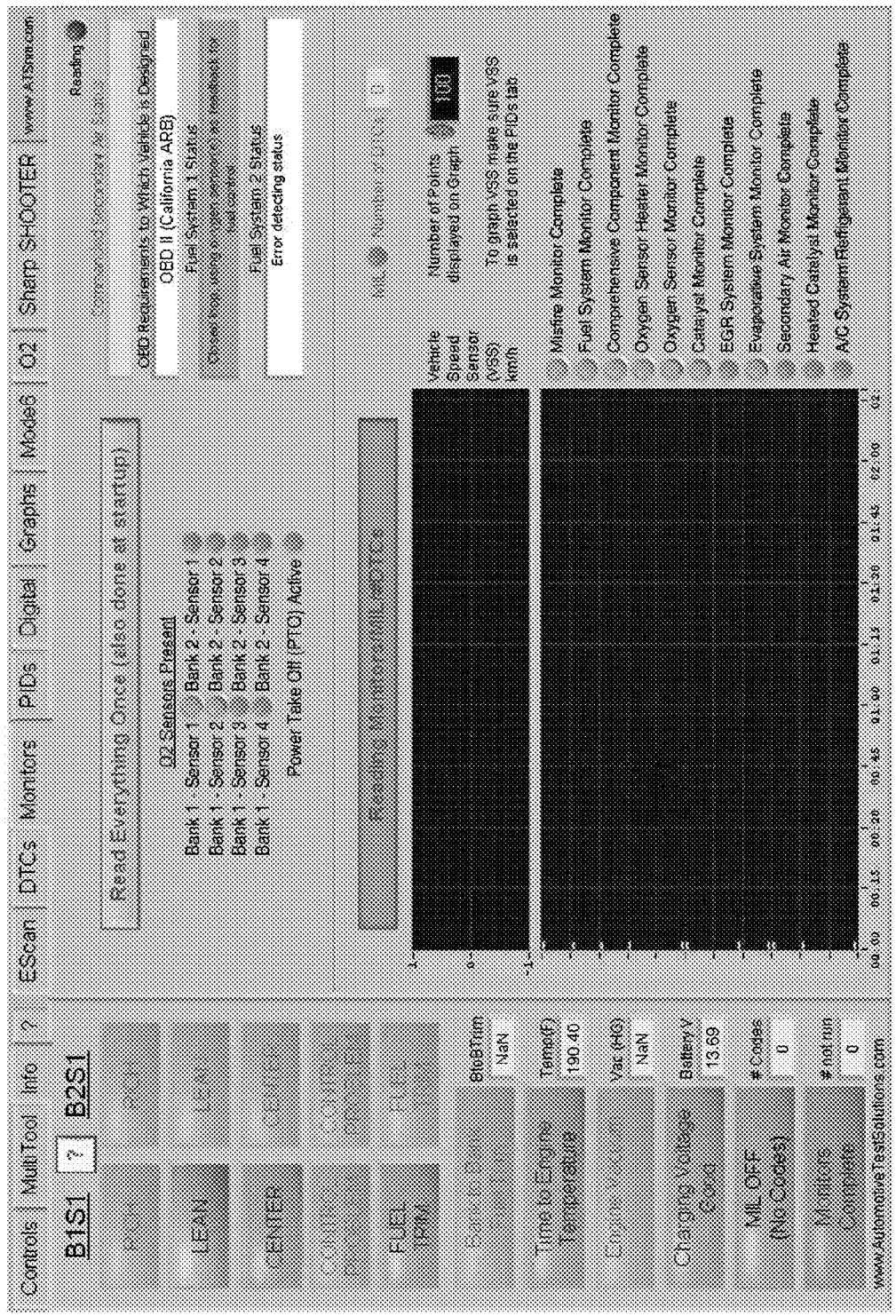
FIG. 7 is a color screen display showing the monitors for the Toyota 4Runner.
Figure 8:
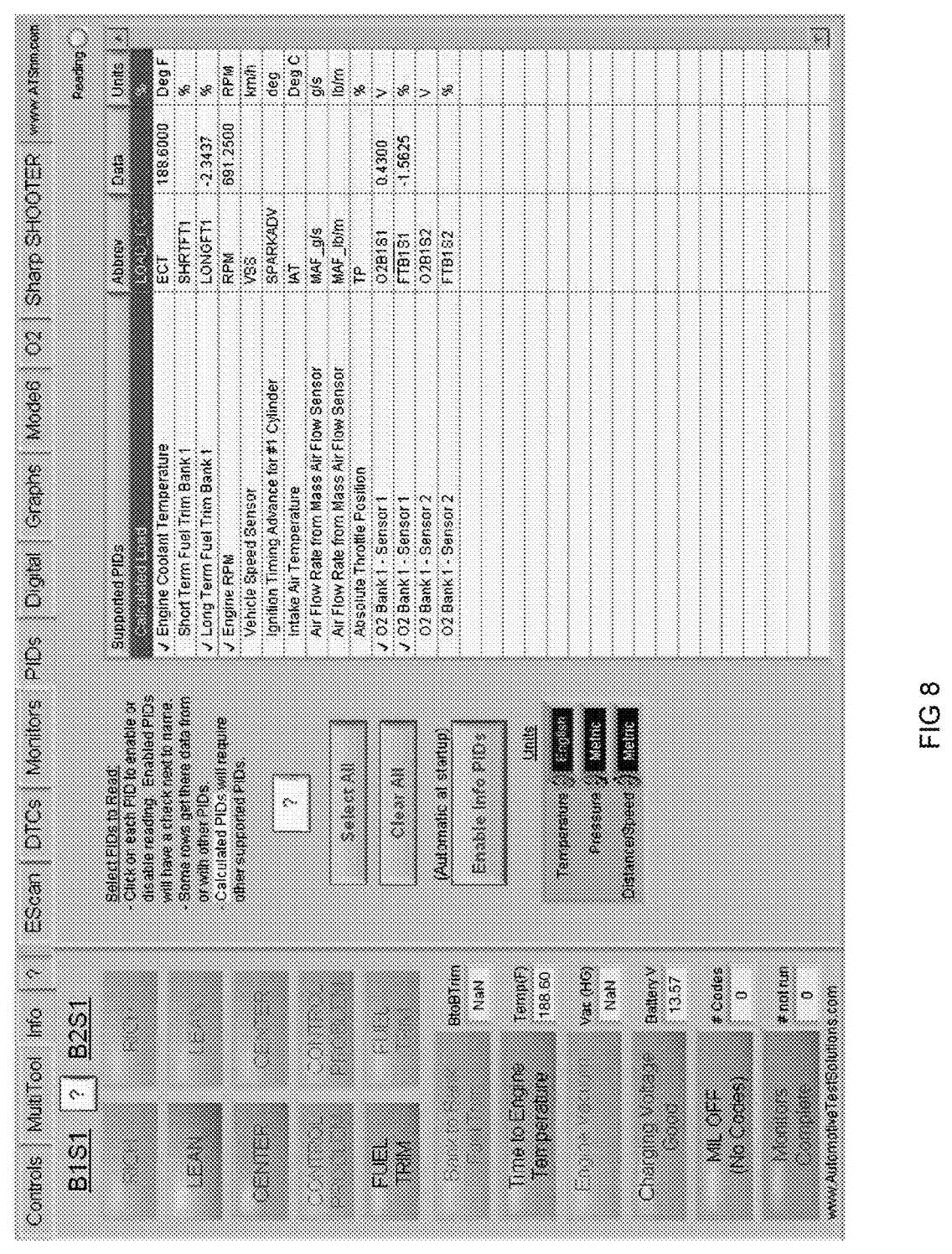

FIGS. 4-13 illustrate the use of the present invention in diagnosing a 2000 Toyota 4Runner that was brought in for service for low power. FIG. 4 illustrates the DTC codes that were pulled up, which indicate none present, which does not assist in diagnostic. The Mode 6 data was then read by tool 11 but, as is evident from the screen illustrated in FIG. 5, no failure is indicated. Mode 5 (O2) data was then pulled from the PCM. As illustrated in FIG. 6, no fault is shown. The Monitors were then checked. However, as is evident from FIG. 7, no problems were identified. The data from the PIDS was again reviewed and graphed but, again, the problem could not be identified. See FIGS. 8 and 9. From the graphs the fuel control of the vehicle looks good.

The volumetric efficiency test was then run. See FIG. 10. This test calculates how much air the engine should pump (red trace) and compares it to how much air the engine is actually pumping (yellow trace). The calculated and actual should be within +/−10% of each other. The difference between the actual VE and the calculated VE are also plotted on the VE table with colors and numbers to indicate the degree of difference. The VE Chart clearly shows that the engine's VE reading is lower than expected. The possible causes are as follows:

Engine worn out.
Camshaft out of time with the crankshaft.
Intake restriction.
Exhaust restriction.
MAF sensor out of calibration.

While it is clear that the engine has a lack of air flow, the cause of this problem is still unknown. In order to isolate the cause of this problem it is necessary to fill the Fuel Trim load chart (FIG. 11). The fuel trim is part of the fuel delivery feedback system. The PCM reads the input sensor's data (MAF, RPM, IAT) and applies the data to a mathematical equation, which will estimate the amount of air entering the engine. It will then adjust this amount by the enrichments (positive or negative) to determine the correct injector on time. The result is fuel mapping table discussed in Paragraph [0065]. Problems such as; engine wear, dirty air filter, dirty fuel filter, will be compensated for by the fuel trim. A fuel trim percentage less than 10 are normal compensations. At the point the fuel trim exceeds 10% there is a problem that will need to be repaired. If the fuel trims loaded on the fuel trim chart are green, the fuel delivery system is working properly. If the fuel trims loaded on the fuel trim chart are yellow, orange, or red, there is a problem with the base fuel equation that is being compensated for by altering the injector on time. By checking the VE chart it can be determined whether the problem is a mechanical flow problem or an electronic problem. If the actual VE reading is low and the fuel trim chart is green, this is an indication there is a mechanical flow problem such as; restricted exhaust, camshaft out of time, worn engine or components. If the chart is green this would indicate that the original fuel calculation was correct. This means all of the sensor inputs are correct and the injectors and fuel pressures are also good. To determine which problem is present tool 11 will instruct the technician to open the throttle to 2000 RPM. The conditions are as follows:

If the idle vacuum is low and the vacuum at 2000 RPM is low then the mechanical condition of the engine will be flagged.
If the idle vacuum is good and increases by 2 inches HG at 2000 RPM then the engine is assumed good.
If the idle vacuum is good and the vacuum stays the same or drops at 2000 RPM then the exhaust is restricted.
To verify the exhaust is restricted, a cat efficiency test is run. If the cat is melted or plugged the efficiency is very low.

If all tests pass, tool 11 will ask the technician to snap the throttle. Tool 11 now monitors the TPS and the vacuum by watching how quickly the engine gains vacuum as the throttle closes. It can be determined whether or not the exhaust has a slight restriction. If all previous tests pass the technician will be instructed to check the cam and crank sensor signals for proper timing correlations. If the VE is low and the fuel trim chart has large corrections indicated by yellow, orange or red, the MAF sensor is out of calibration. If the actual VE reading is normal and the fuel trim chart loads with yellow, orange and red then this is an indication of the following:

The sensors are misreading.
The fuel injectors have a problem.
The fuel pressure is wrong.

If all sensors test good then the fuel trim charts will be analyzed. The way in which the fuel trim loads in the chart will indicate the clues necessary to determine where the problem is located. An example of this would be if all of the trim cells filled at low RPM and low loads are green and as the engine load and RPM increases the trims turn to red. At low engine loads very little fuel delivery is needed. As the load increases the fuel demand will also increase. If the fuel supply system such as a plugged fuel filter has a problem, the fuel system can keep up with an engine under low load conditions but will fail with the engine under high load conditions. This is why the trim cells are green where the fuel supply demand is low. As the fuel demand increases the trim cells turn red when trying to compensate for the inadequate fuel delivery.

In the present example, FIG. 11, if there is a mechanical problem such as a restricted exhaust, camshaft out of time or engine worn out then the fuel trim table will be green. However, if the mass air flow sensor is misreading, the fuel trim table will be yellow, orange or red depending on the extent of the problem. If the fuel trim starts at a negative number and moves to a positive number it is an indication that the mass air flow sensor is dirty and needs to be cleaned. As a follow-up, the MAF sensor was removed and cleaned and the Vol Eff test run again. As is apparent from FIG. 12, this corrected the problem. Once the MAF sensor was cleaned, the Toyota was taken for a test drive. As is evident from FIG. 13, the loaded full trim chart verifies that the vehicle was correctly repaired.

Figure 14:
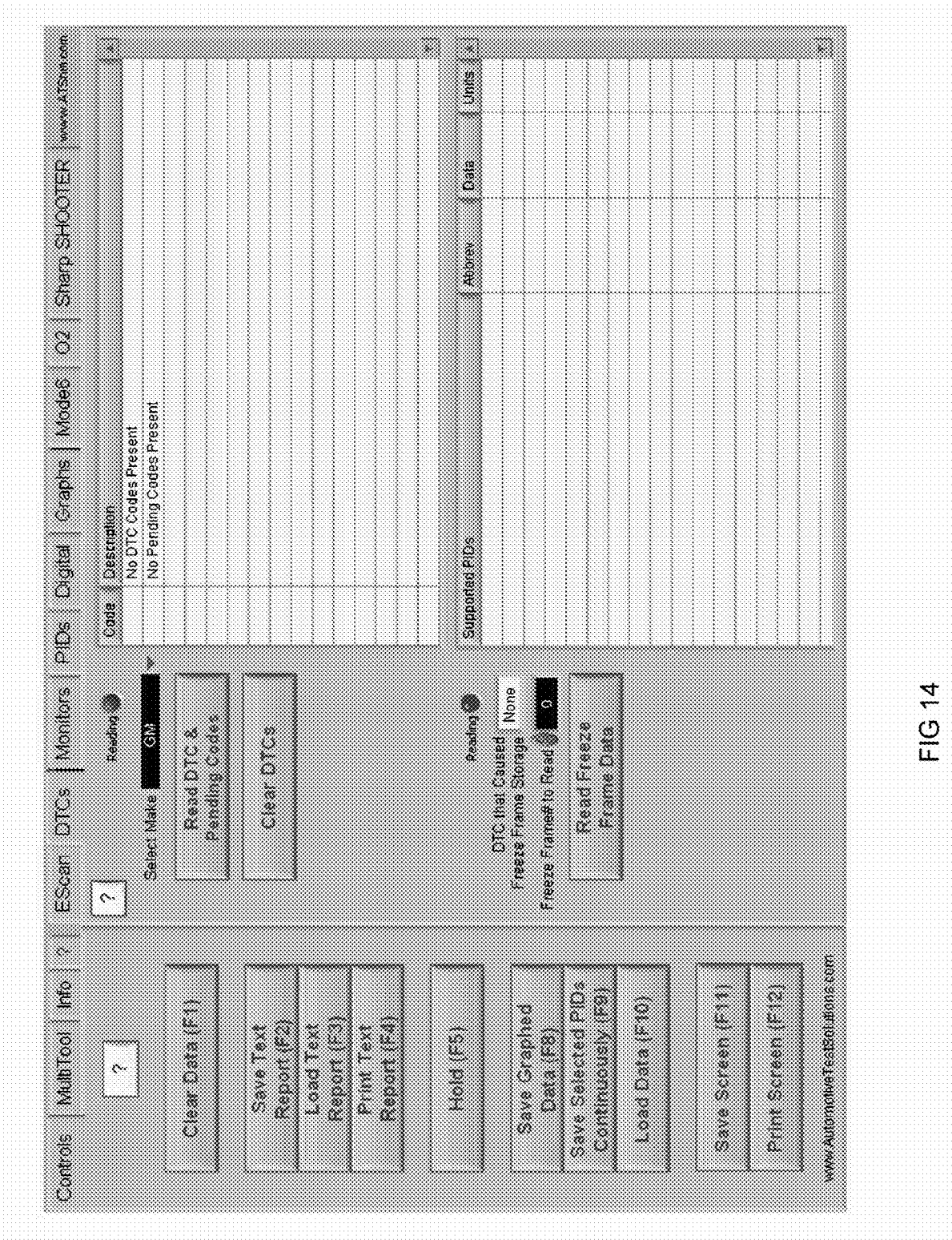
FIG. 14 is a color screen display with the Controls tab and the DTCs tab open showing no DTC (diagnostic trouble codes) codes pulled for a 1999 GMC Sierra.
Figure 15:
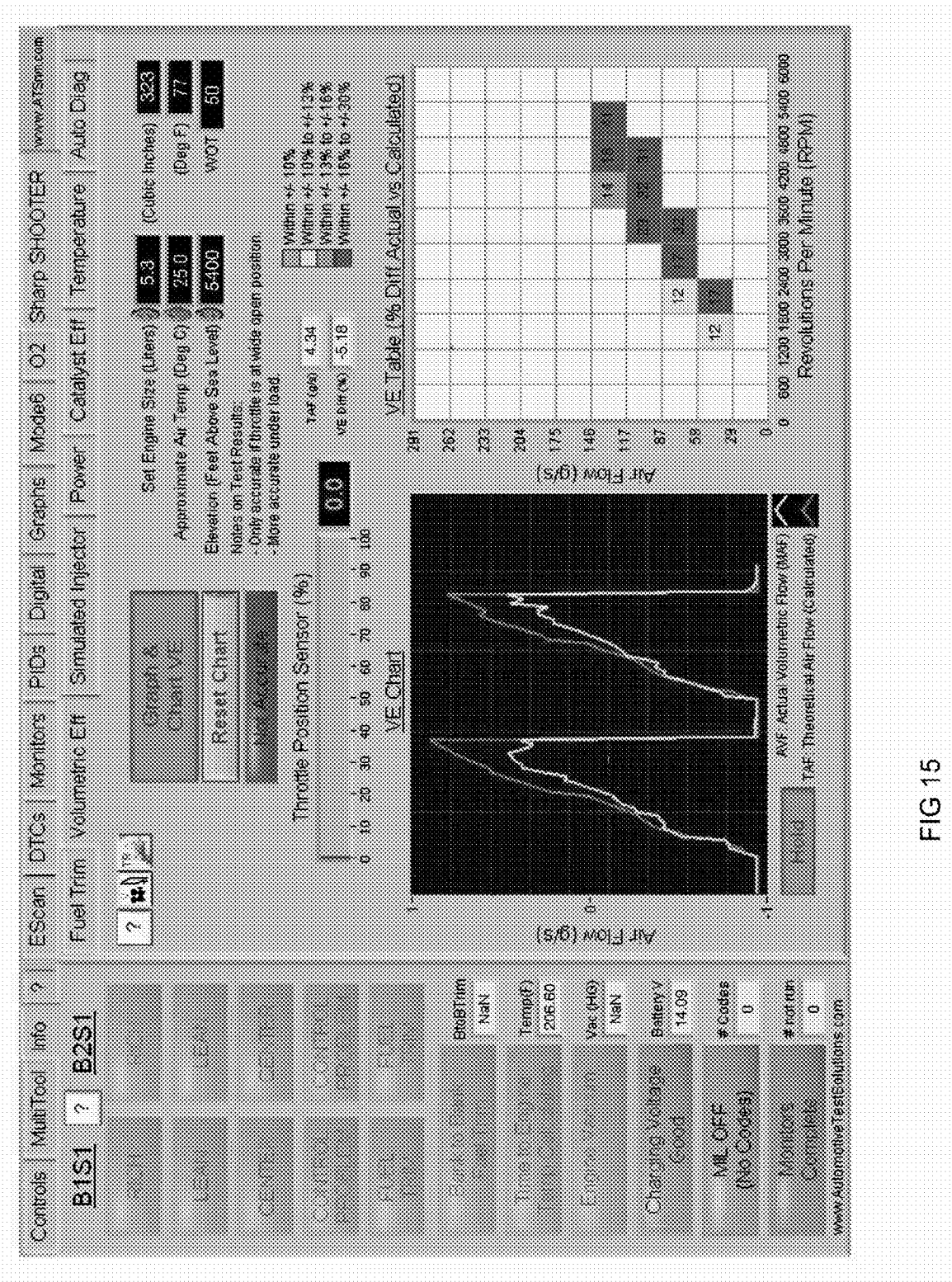
FIG. 15 is a color screen display with the Info, the Sharp SHOOTER and Volumetric Efficiency tabs open for the 1999 GMC Sierra showing the volumetric efficiency data.

FIGS. 14-17 relate to a 1999 GMC Sierra with a low power problem. From FIG. 14 is it apparent that no DTC codes are present. However, for the volumetric efficiency test, FIG. 15, it is clear that the VE is reading low. The vehicle was then driven to load the fuel trim chart. The green on the chart in FIG. 16 shows that the MAF is reading air flow correctly. This indicates that the engine has a restricted exhaust. The catalytic converter was replaced and the VE retested. The charts in FIG. 17 indicate that replacement was the correct repair.

Figure 18:
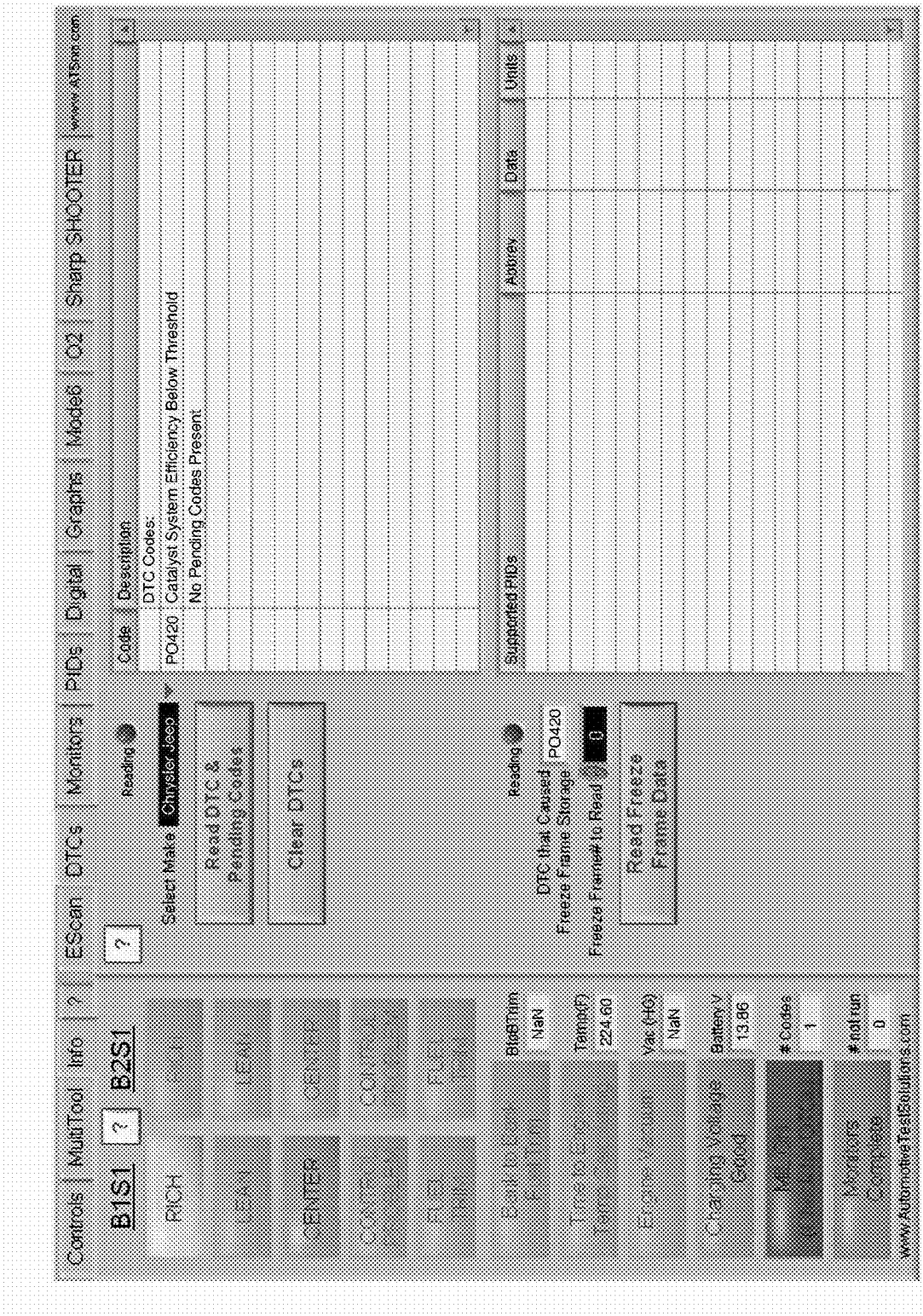

FIGS. 18 and 19 relate to a 1999 Dodge truck with a check engine light on. The codes were pulled and, as indicated in FIG. 18 the DTC code is "catalyst system efficiency below threshold". A catalyst efficiency test was run, FIG. 19, which clearly shows that the converter has failed.

FIG. 20 relates to a vehicle with 2 front sensors 2 rear sensors, and both a bad and a good catalytic converter.

FIG. 21 relates to a vehicle with a catalyst efficiency code. The catalyst efficiency test was run and the catalytic converters are good. The TSBs (technical service bulletins) were checked and this vehicle was reprogrammed to fix this problem.

Simulated Injector Examples

Figure 23:
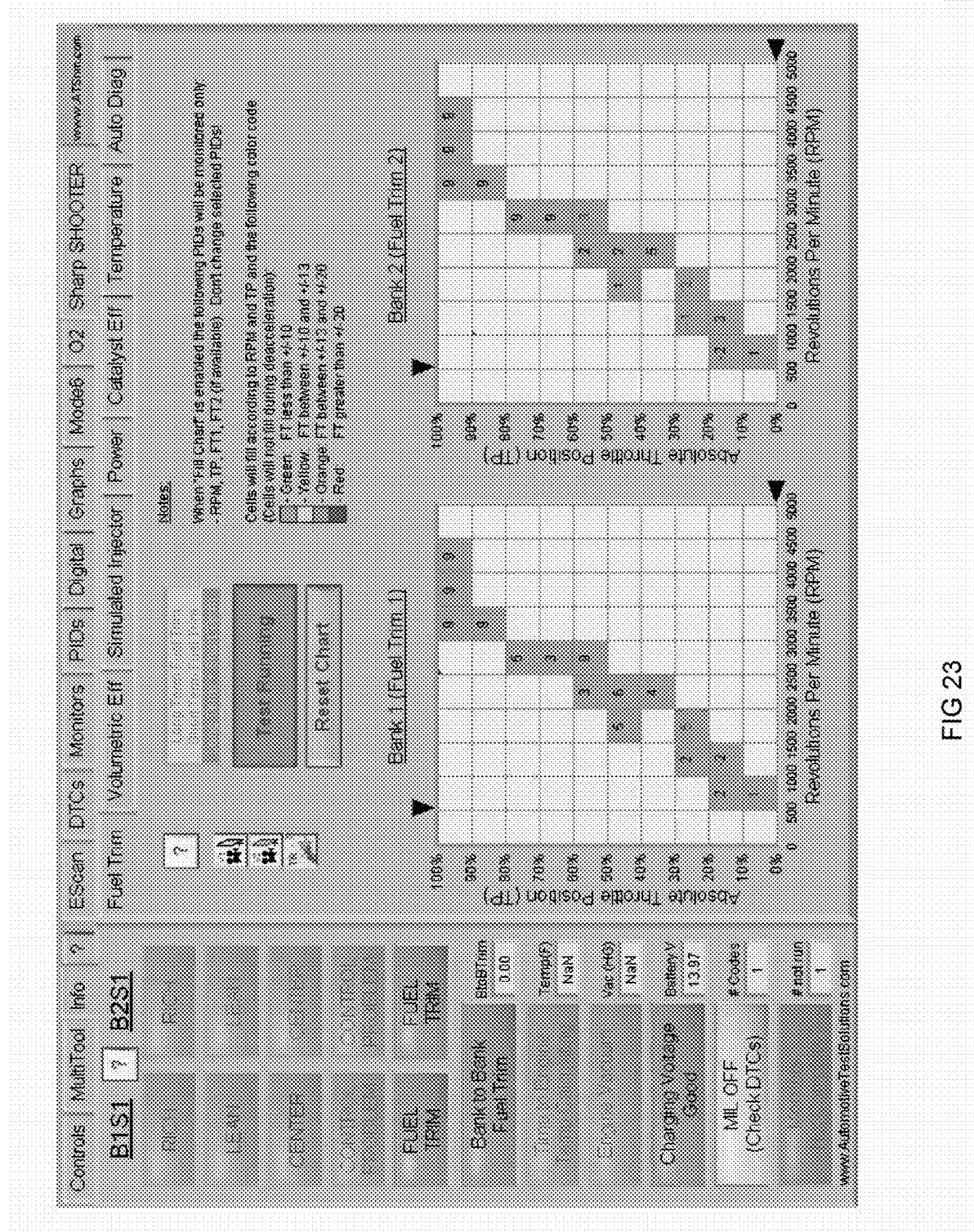
FIG. 23 is a color screen display with the Sharp SHOOTER and Fuel Trim tabs open showing the fuel trim test on a 1999 GM 5.3 liter engine.
Figure 24:
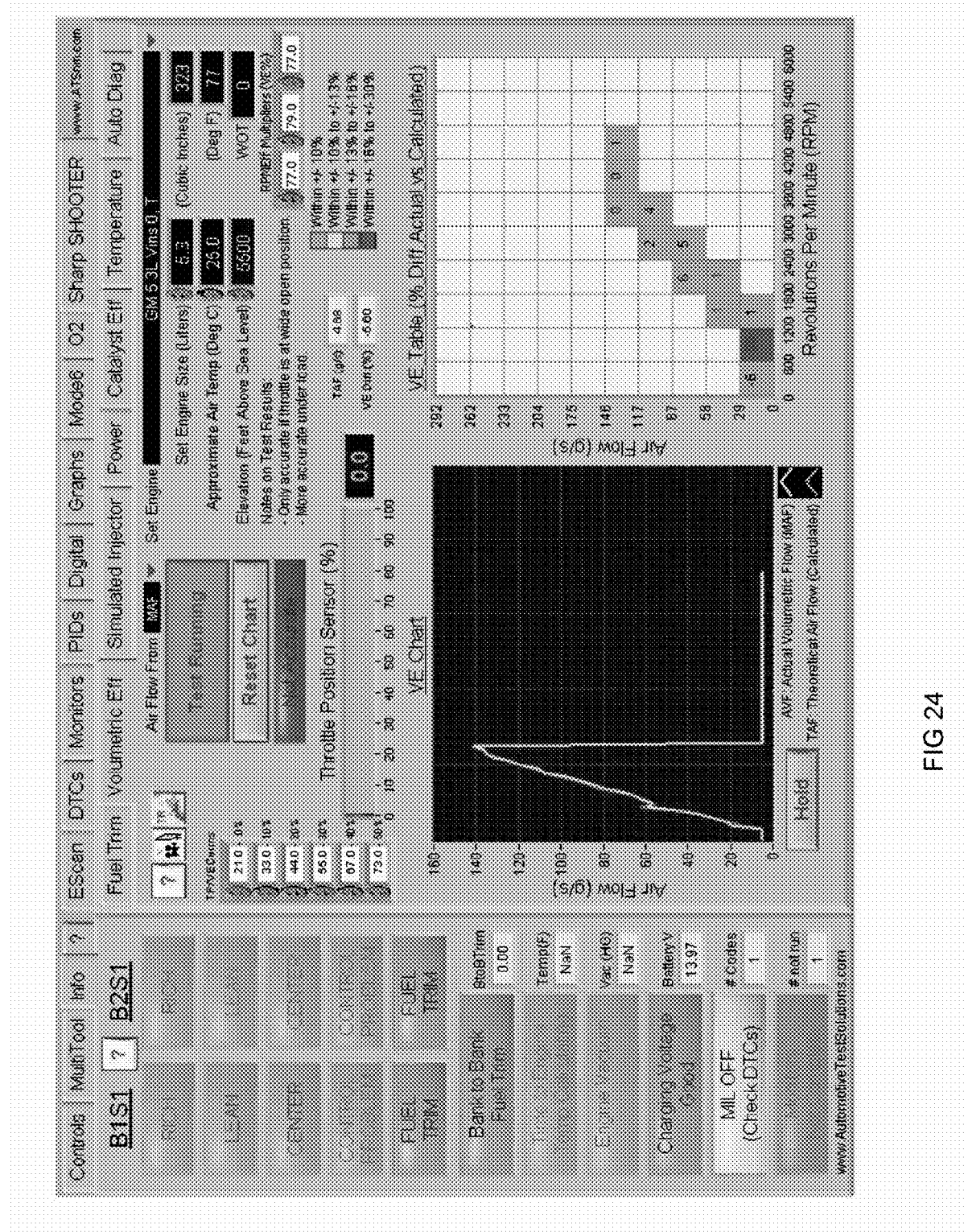
FIG. 24 is a color screen display with the Sharp SHOOTER and Volumetric Eff tabs open showing the VE tests on the engine of FIG. 23.
Figure 25:
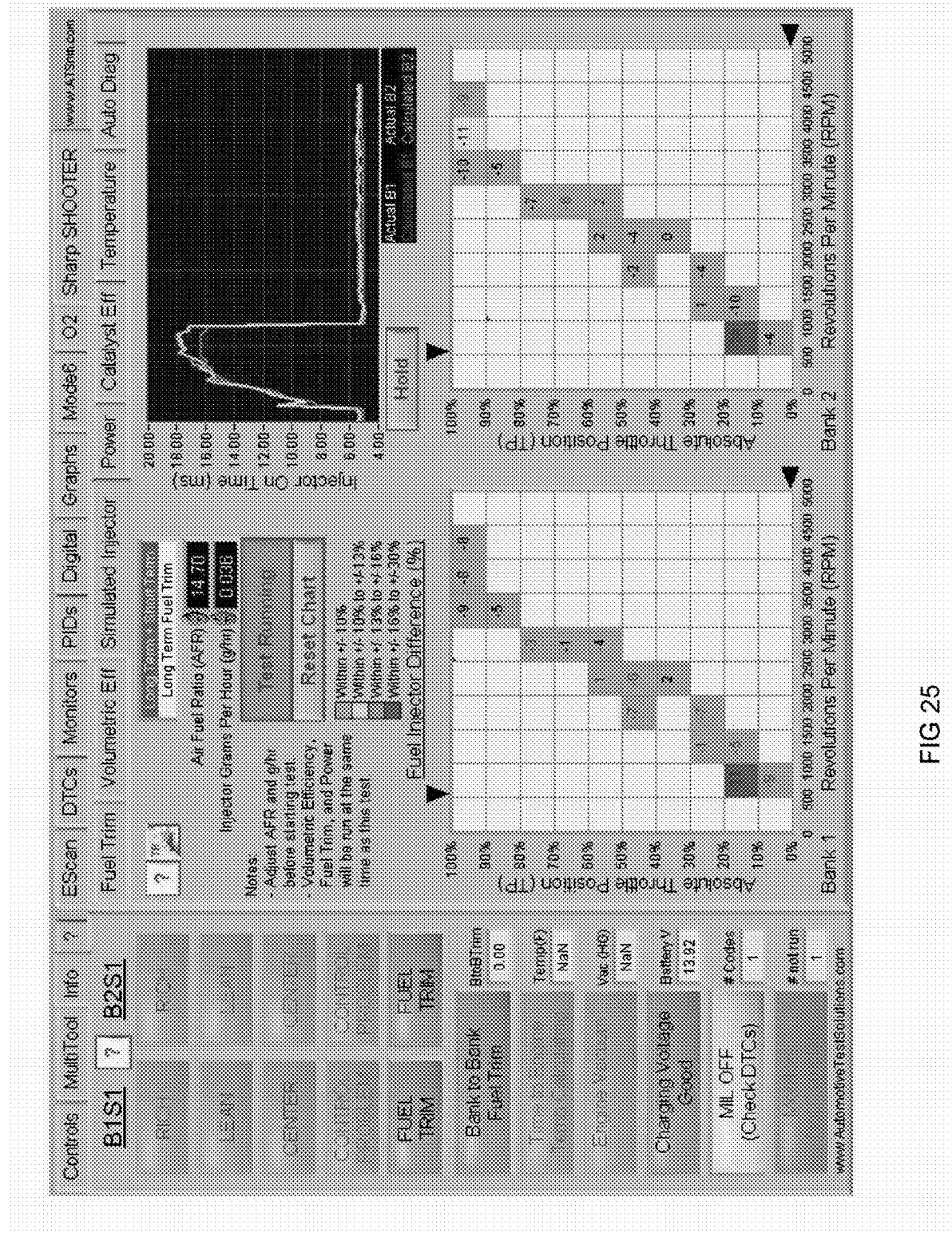
FIG. 25 is a color screen display with the Sharp SHOOTER and Simulated Injector tabs open showing the test results on the engine of FIG. 23.
Figure 26:
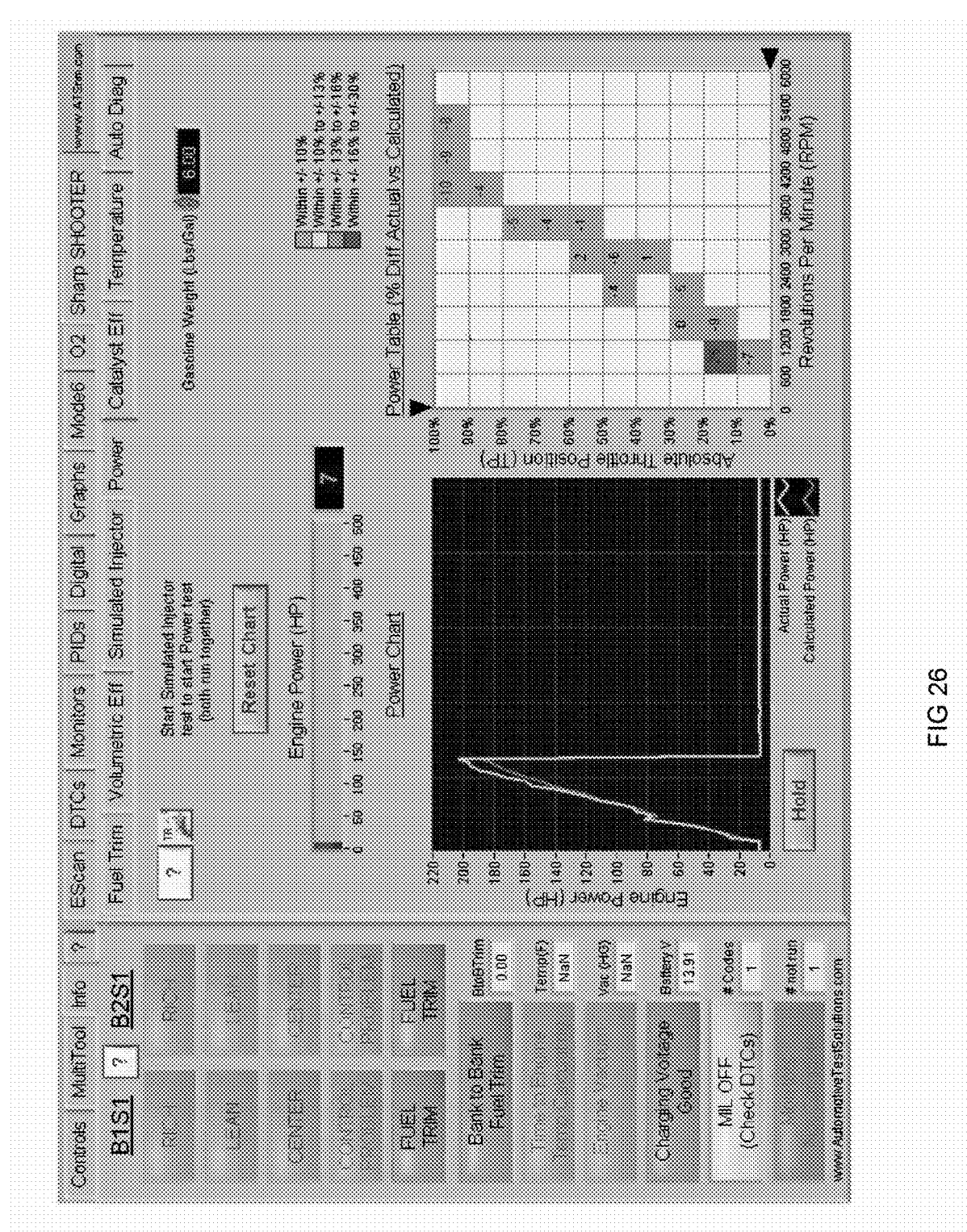
FIG. 26 is another color screen display related to the engine of FIG. 23, with the Sharp SHOOTER and Power tabs open.

To further the probability of finding where the problem is located a test sequence is run that is called the simulated injector. This test puts together the VE test and the fuel trim test. The power test is also run at this time. The results will give a better prediction on where the problem within the fuel injection system is located. In FIG. 23 a GM 5.3 liter VIN T is run. There is no problem with this engine. The fuel trim chart has been run and is loaded with all green indicating the base air equation is correct. In FIG. 24 the VE chart has been run and is loaded with green indicating the mass air flow sensor is reading correctly and the engine is functioning correctly. The red square is present due to the throttle being opened very quickly. This test is being run with the throttle set to zero. This allows the chart to load from idle to wide open. Usually this throttle setting is at 20%. In FIG. 25 the Simulated Injector chart is then loaded. The chart is loaded green indicating there is no problem present. In FIG. 26 the Power chart is then loaded. The engine produced 200 horse power indicating good power.

Figure 27:
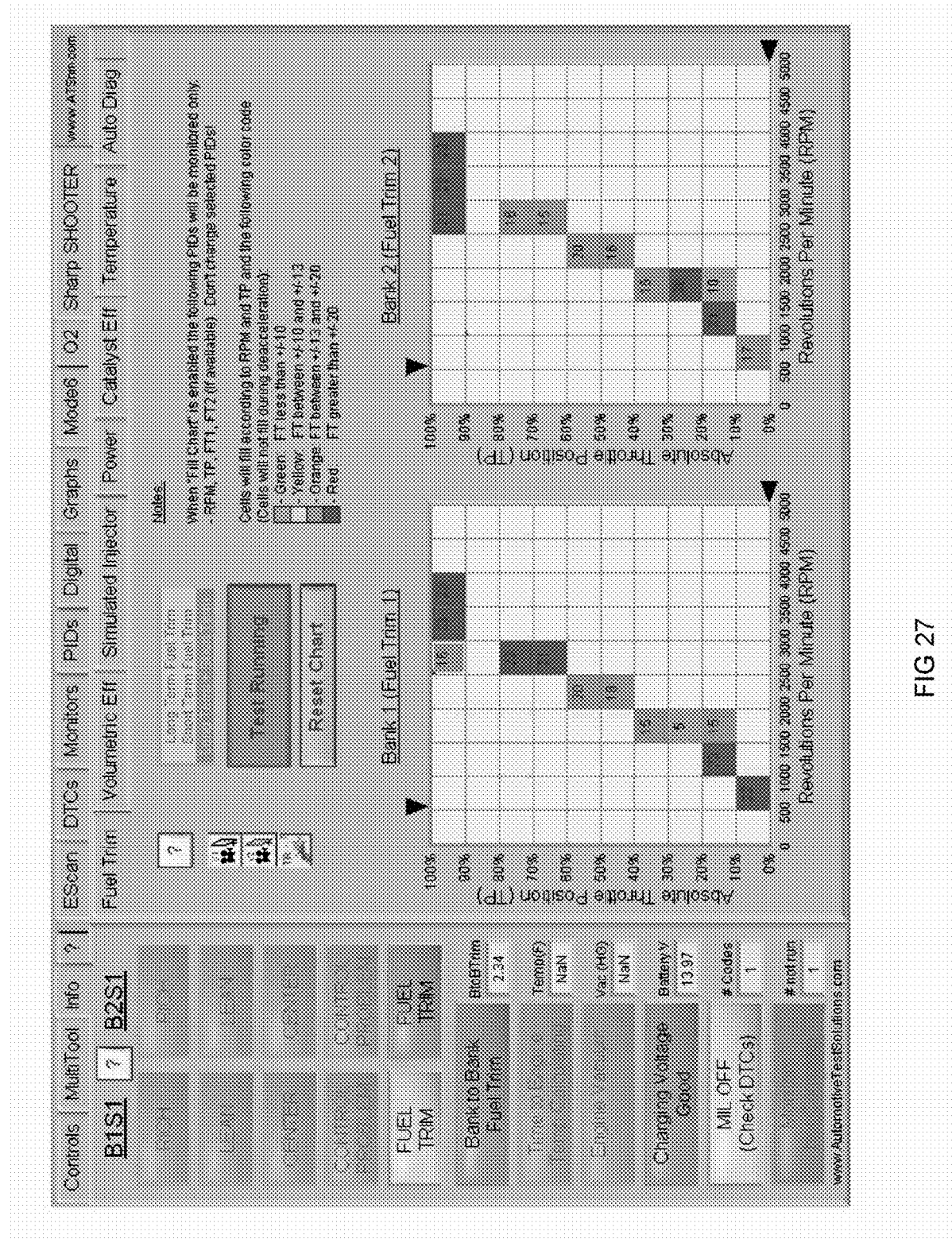
FIGS. 27-30 are a series of color screen displays (Fuel Trim, Volumetric Eff, Simulated Injector and Power) on a 1999 GM 5.3 liter engine with an air leak.
Figure 28:
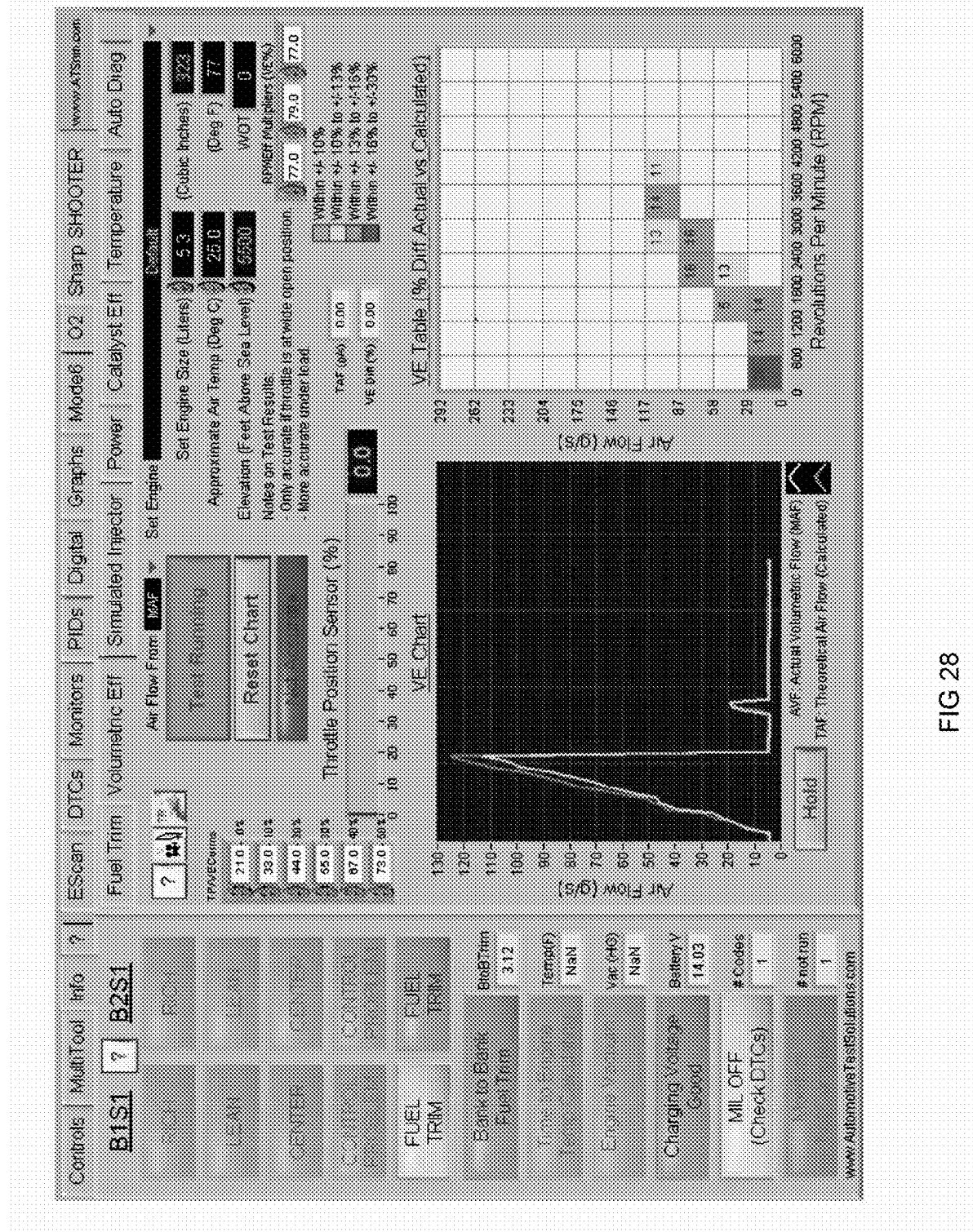
Figure 29:
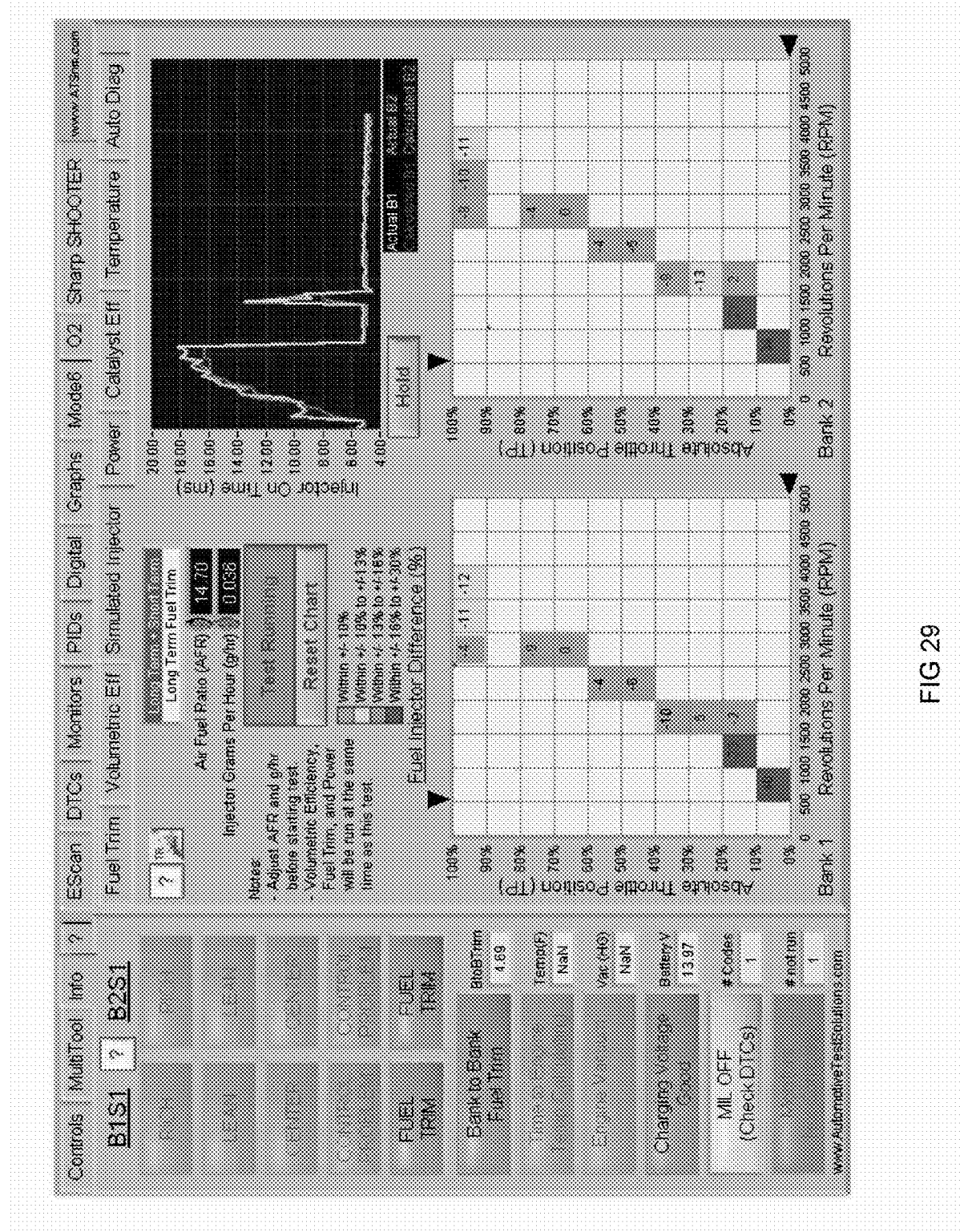
Figure 30:
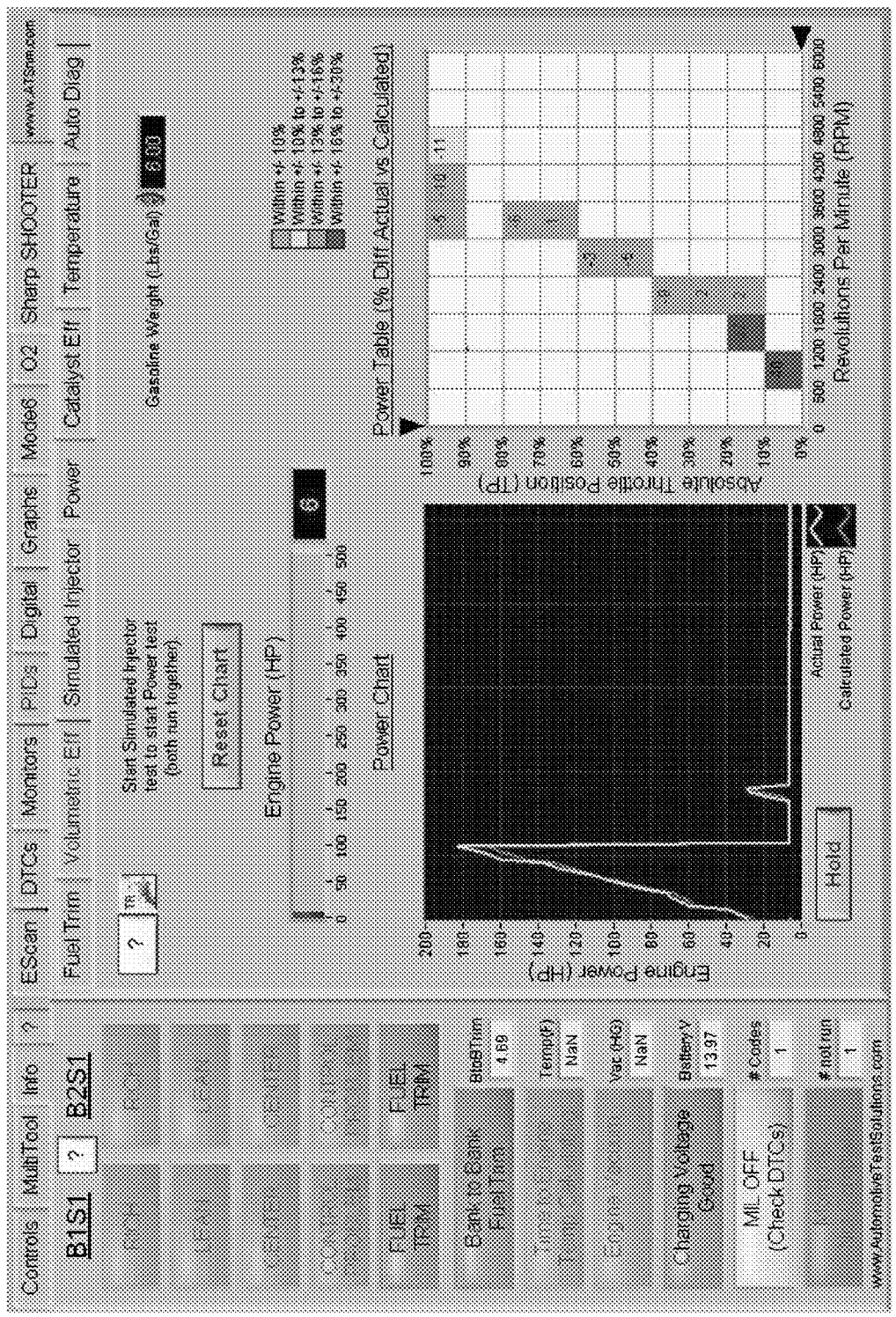

The next example was run on the same GM 5.3 liter VIN T. In this case, there is a leak at the intake boot between the MAF sensor and the throttle body. In FIG. 27 the Fuel Trim charts have been loaded. The chart shows that the vehicle's microprocessor is adding fuel from idle to wide open. In FIG. 28 the VE test has been run. The VE Table indicates that the air volume is off by 20% at idle and moves to 11% at wide open throttle. This decrease towards wide open throttle indicates that an air leak is present. In FIG. 29 the Simulated Injector chart is then loaded, which is mostly green. This indicates that the problem is a sensor misreading. In this case the air volume problem caused by the leak has been corrected by the vehicle's PCM. In FIG. 30 the Power chart has also been loaded showing that the power has not been lost.

Figure 31:
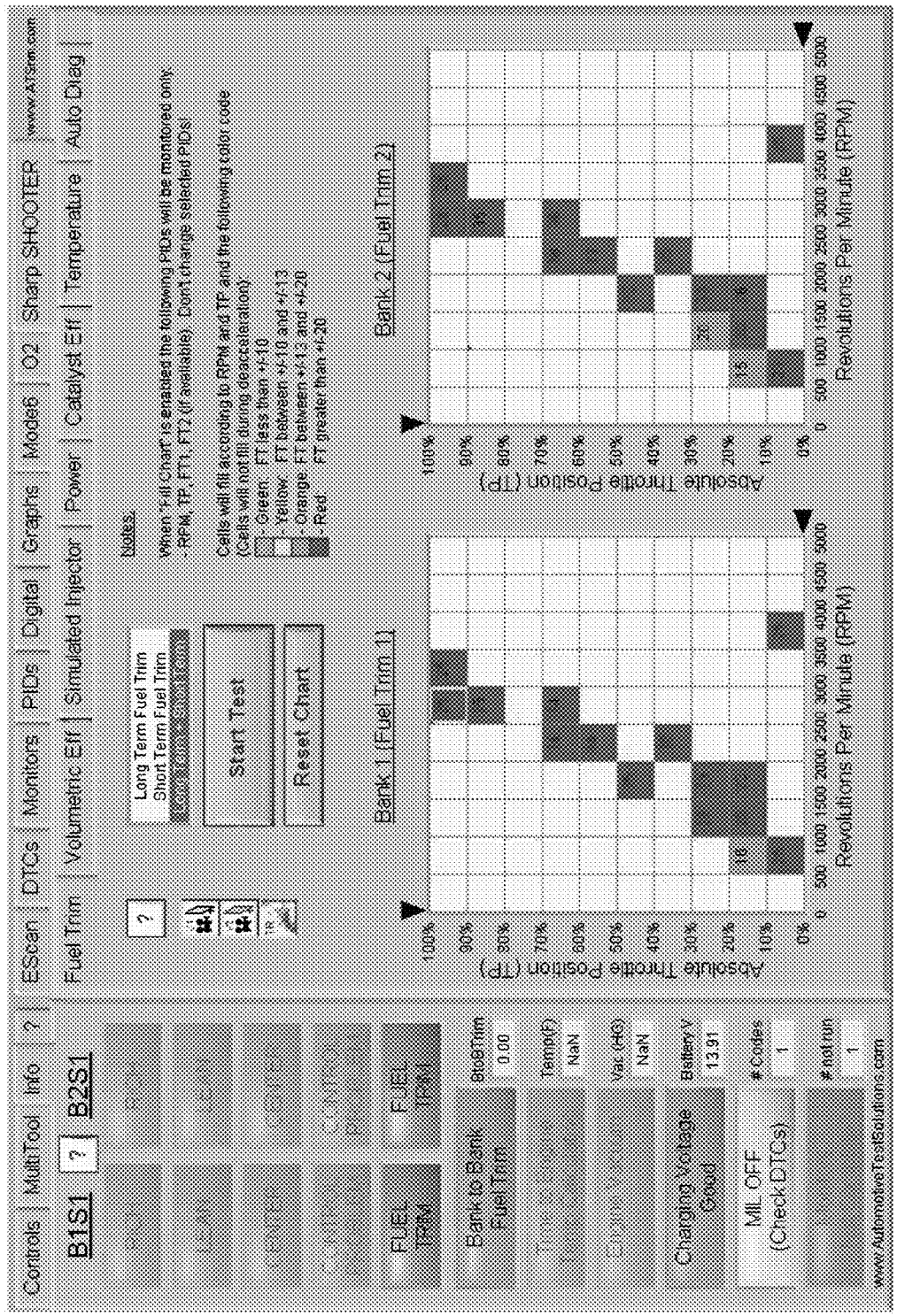
FIGS. 31-34 are another series of color screen displays (Fuel Trim, Volumetric Eff, Simulated Injector and Power) on a 1999 GM 5.3 liter engine with low fuel pressure.
Figure 32:
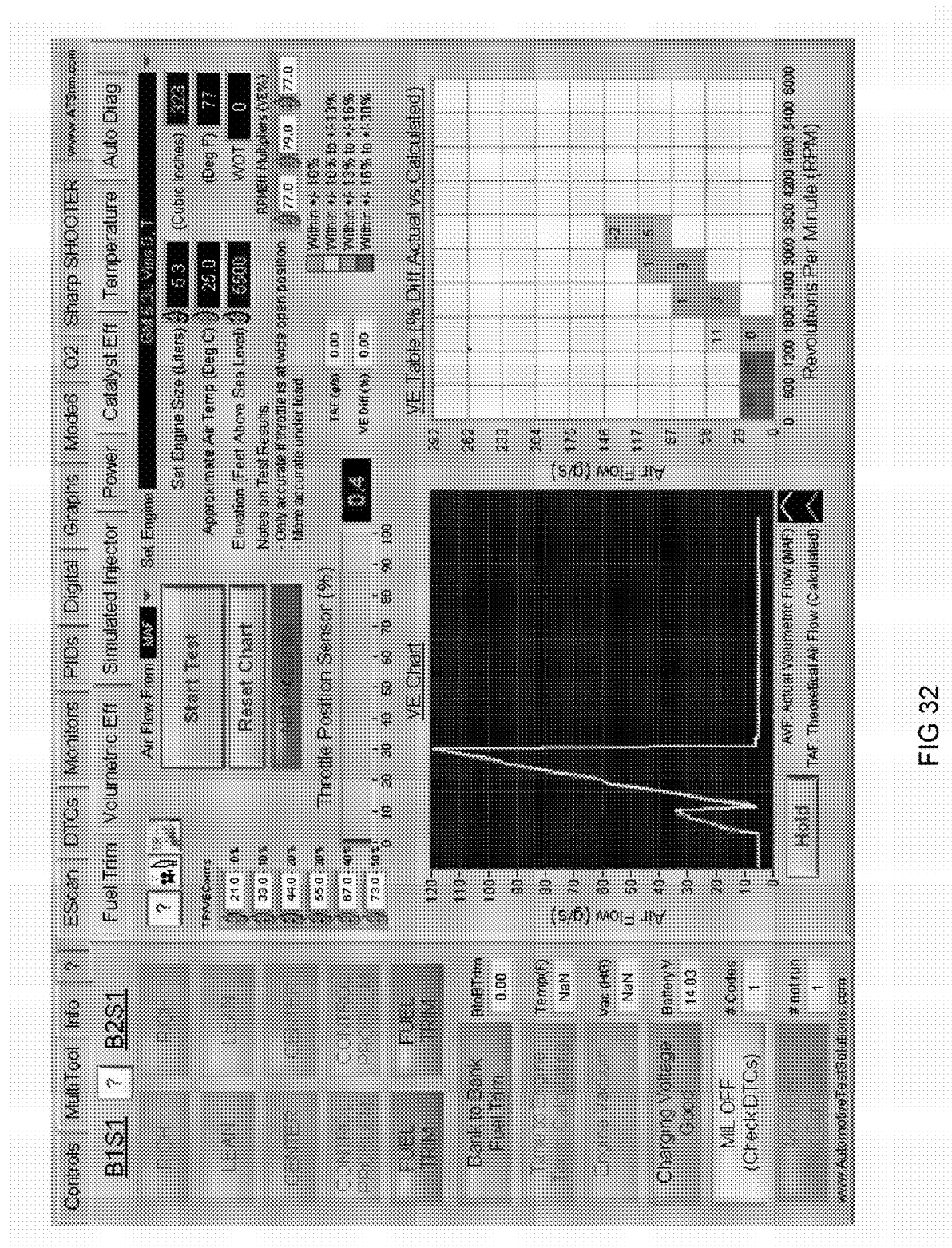
Figure 33:
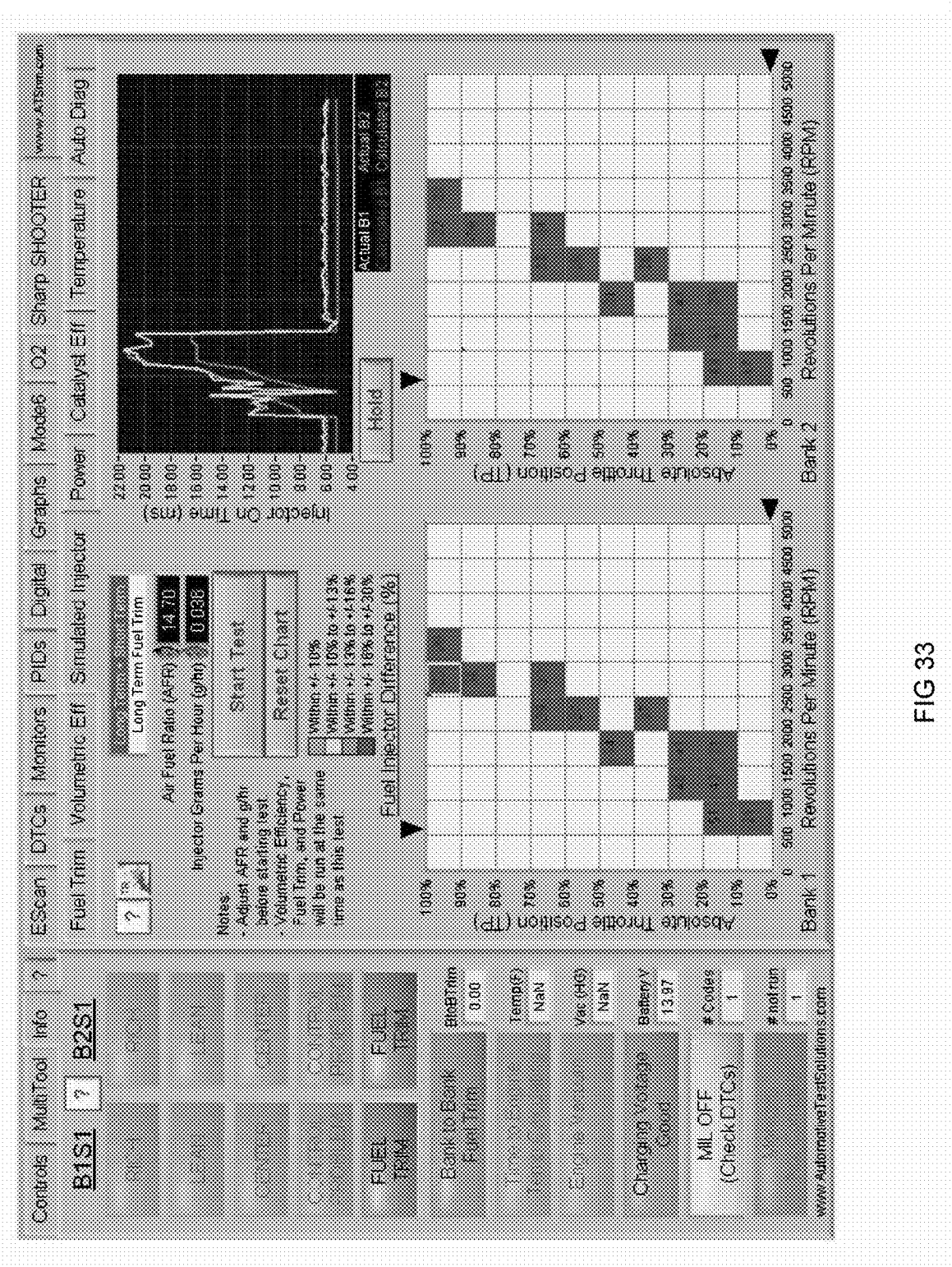
Figure 34:
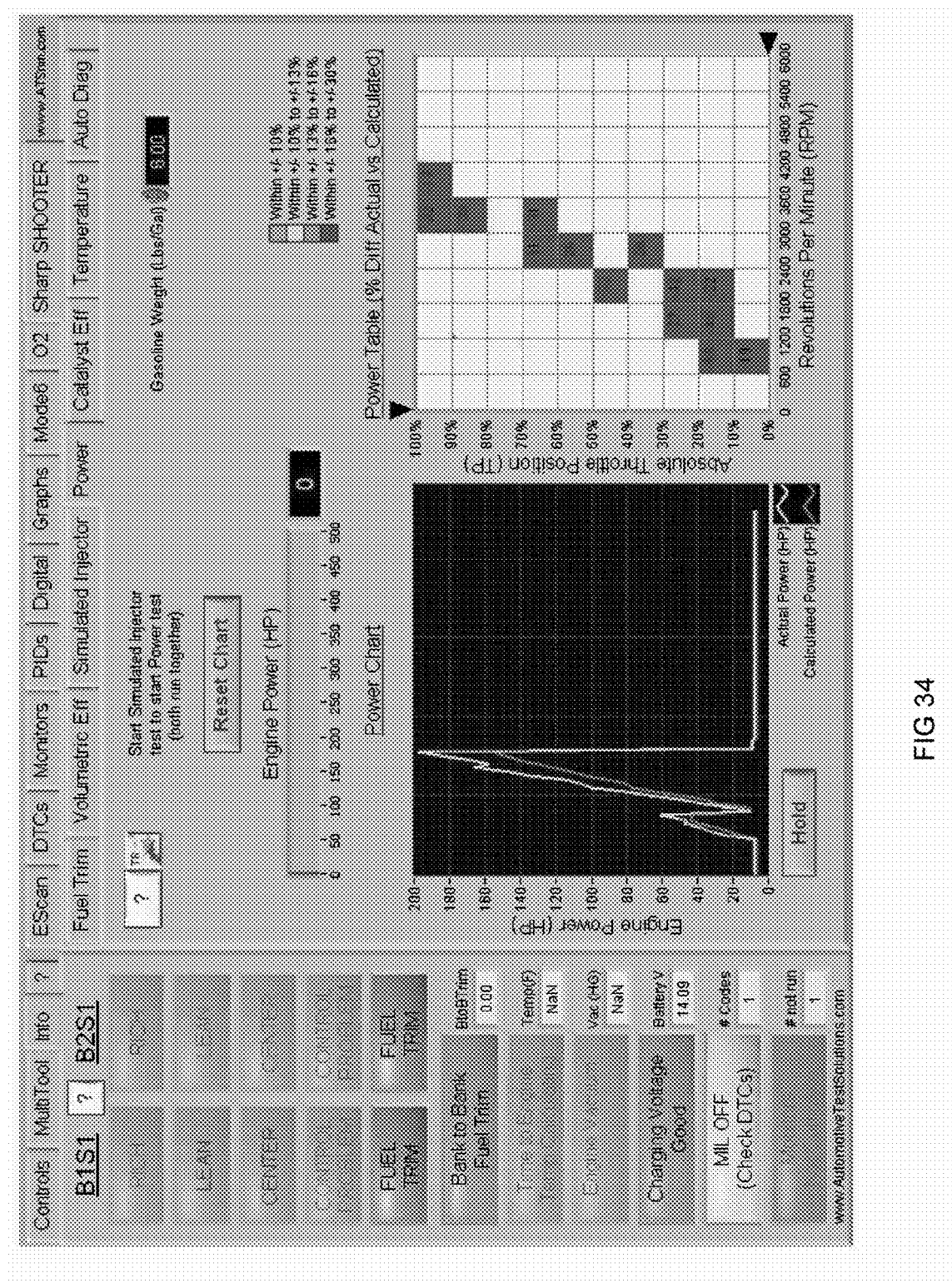

The third example is a test run on the same GM 5.3l iter VIN T. In this test the vehicle has low fuel pressure. In FIG. 31 the Fuel Trim chart is loaded and shows the vehicle's PCM is adding over 25% from idle to wide open throttle. In FIG. 32 the VE Chart and VE Table is then loaded. The VE Table shows mostly green indicating the MAF sensor and mechanical state of the engine are good. In FIG. 33 the Simulated Injector chart was then loaded. The Bank 1 Fuel Injector Difference (%) table indicates that the actual and calculated injectors are off by as much as −51%. The Bank 2 table shows a similar problem. This indicates that the problem is within the fuel delivery system. This is due to the fuel pressure being low. The fuel delivery problem is clearly shown by the Simulated Injector chart. In FIG. 34 the Power Chart was then loaded which indicates that the engine made 200 horse power indicating that the power of the vehicle was good.

Figure 35:
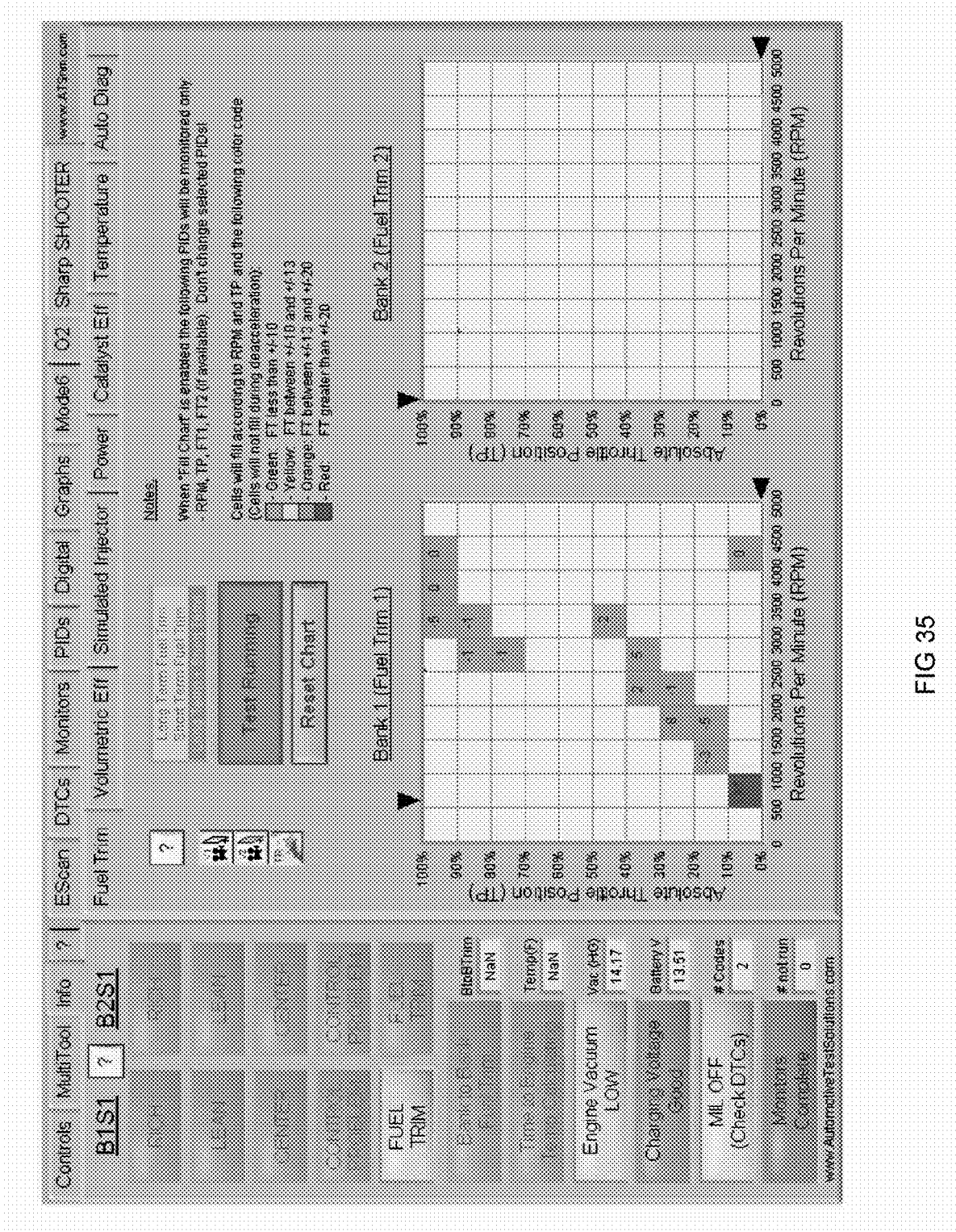
FIGS. 35-38 are yet another series of screen displays (Fuel Trim, Volumetric Eff, Simulated Injector and Power) for a GM 5.3 liter engine which is running properly.
Figure 36:
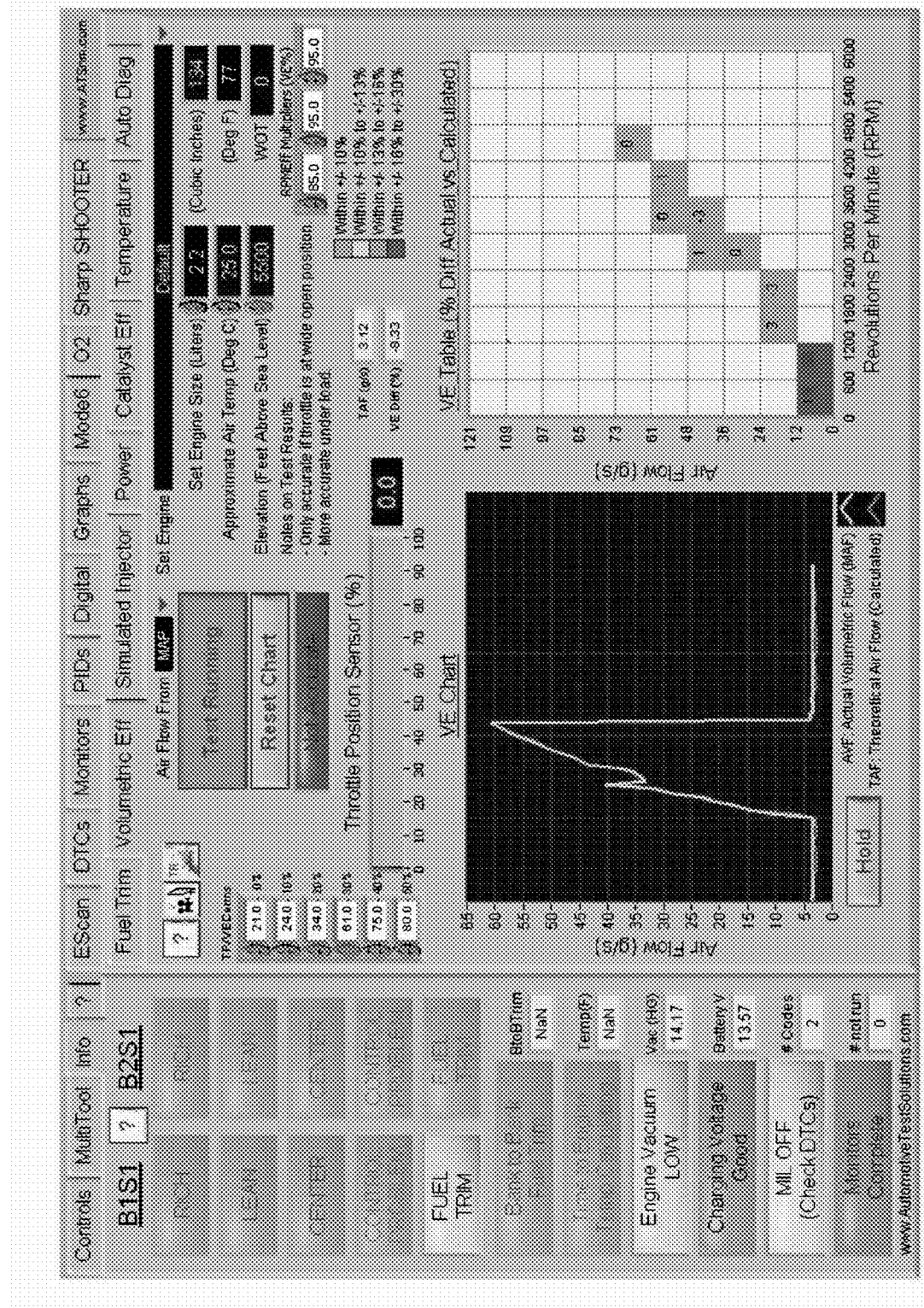
Figure 37:
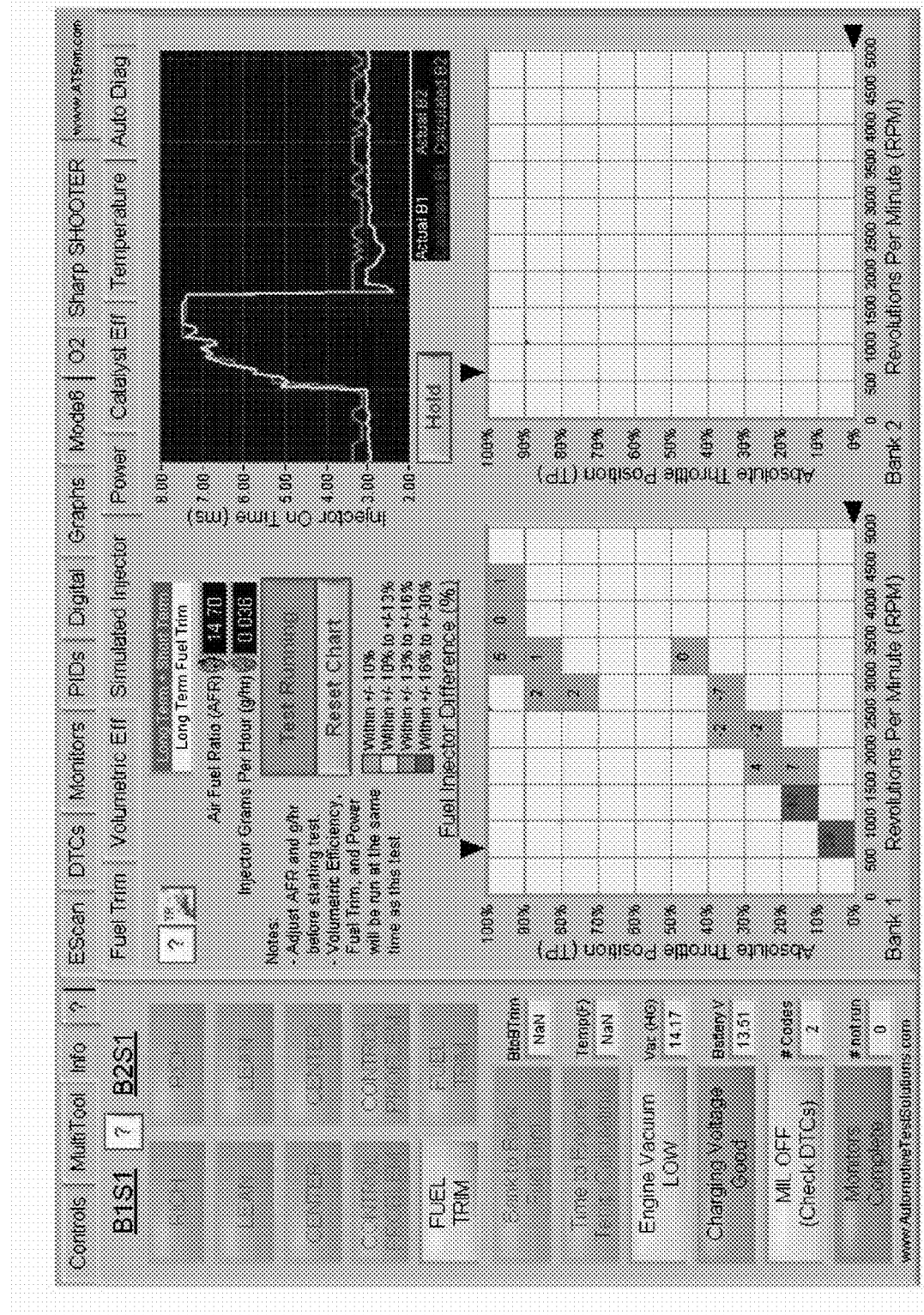
Figure 38:
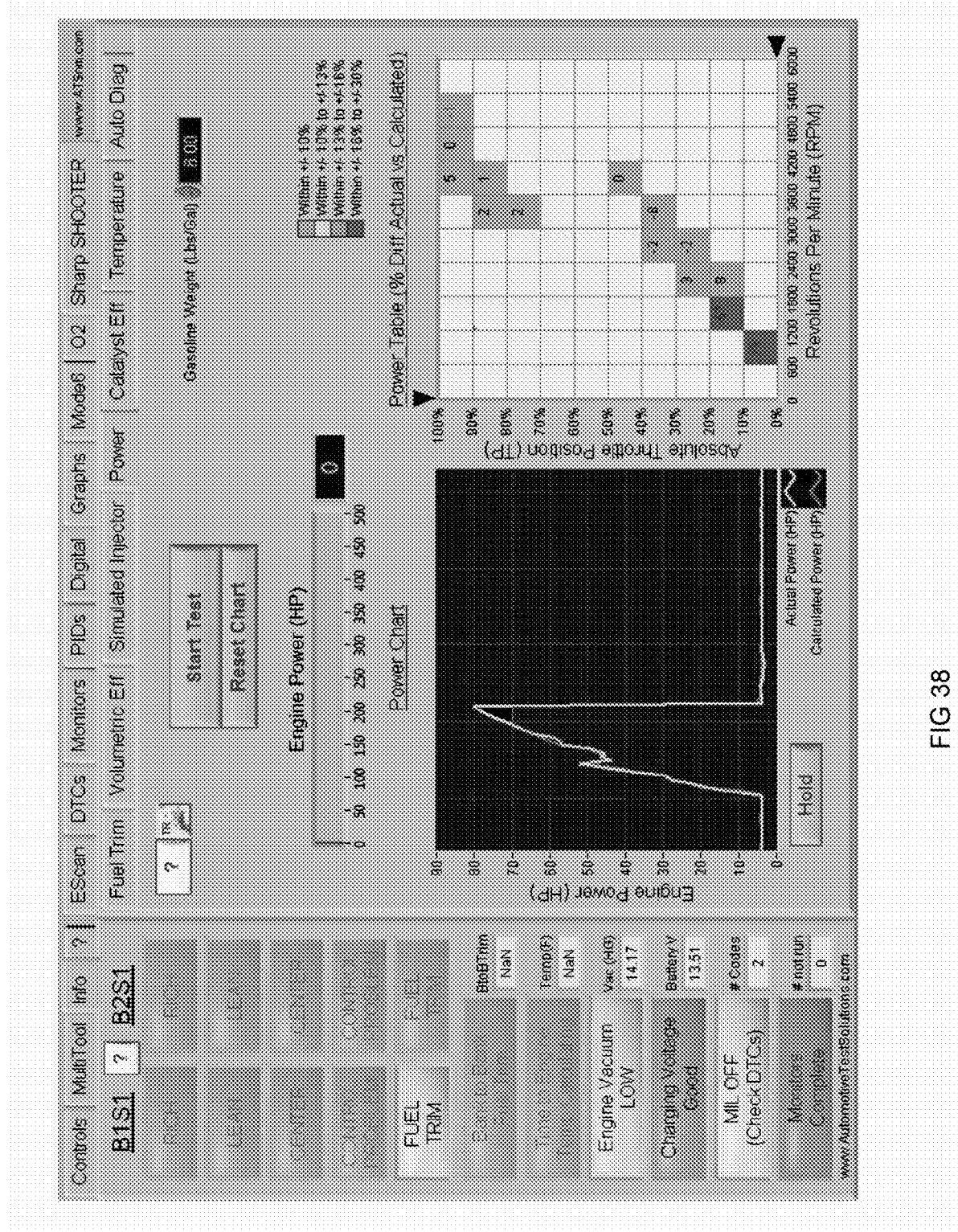

The next example is from a GM 2200 engine with no problems. In FIG. 35 the first chart loaded is the fuel trim, which is mostly green indicating there is no problem with the vehicle. In FIG. 36 the VE Chart and Table are loaded. This engine uses a manifold absolute pressure sensor instead of a MAF sensor. The VE Table shows mostly green indicating the air flow into the engine is good. In FIG. 37 the Simulated Injector chart was then filled. This chart fills with mostly green indicating there is no problem between the actual injection time and calculated injection time. In FIG. 38 the Power Chart was then loaded which indicates the engine made 80 horse power which shows there is no power loss with this engine.

Figure 39:
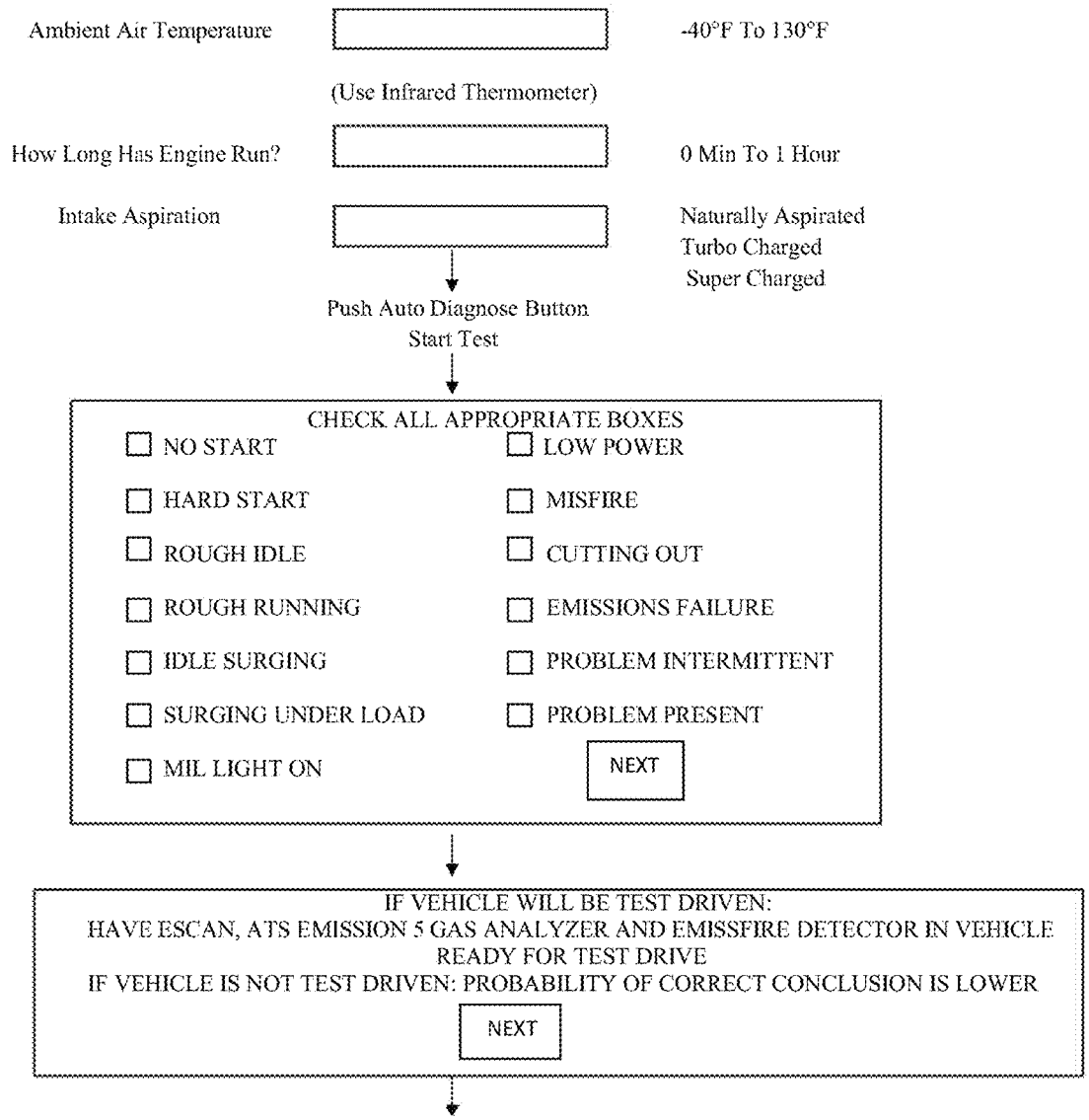
FIG. 39 A-I is a series of flow charts illustrating the operation of the analysis tool of the present invention in the automated test mode, namely, KOEO then KOEC and then KOER.
Figure 39:
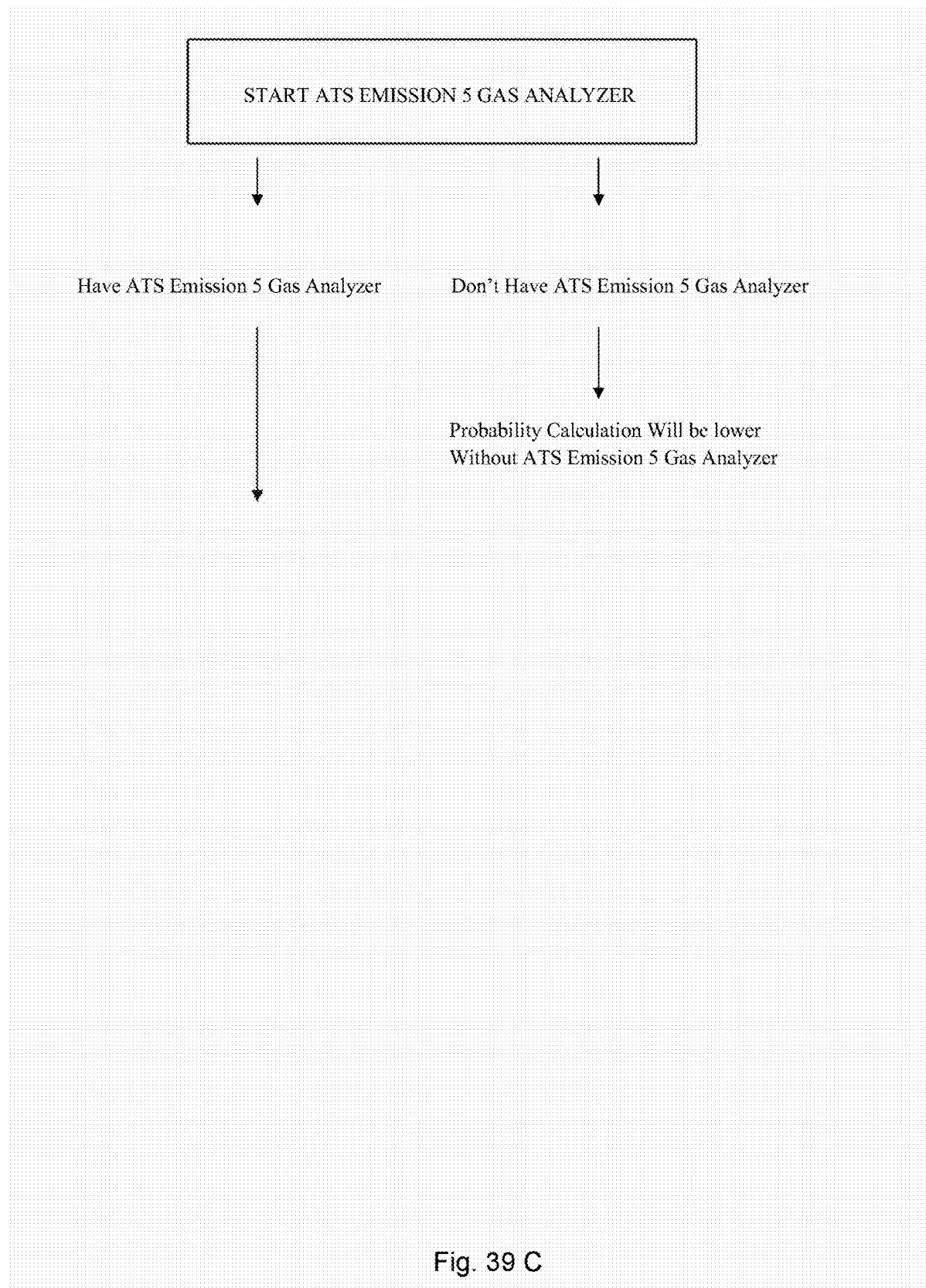
Figure 39:
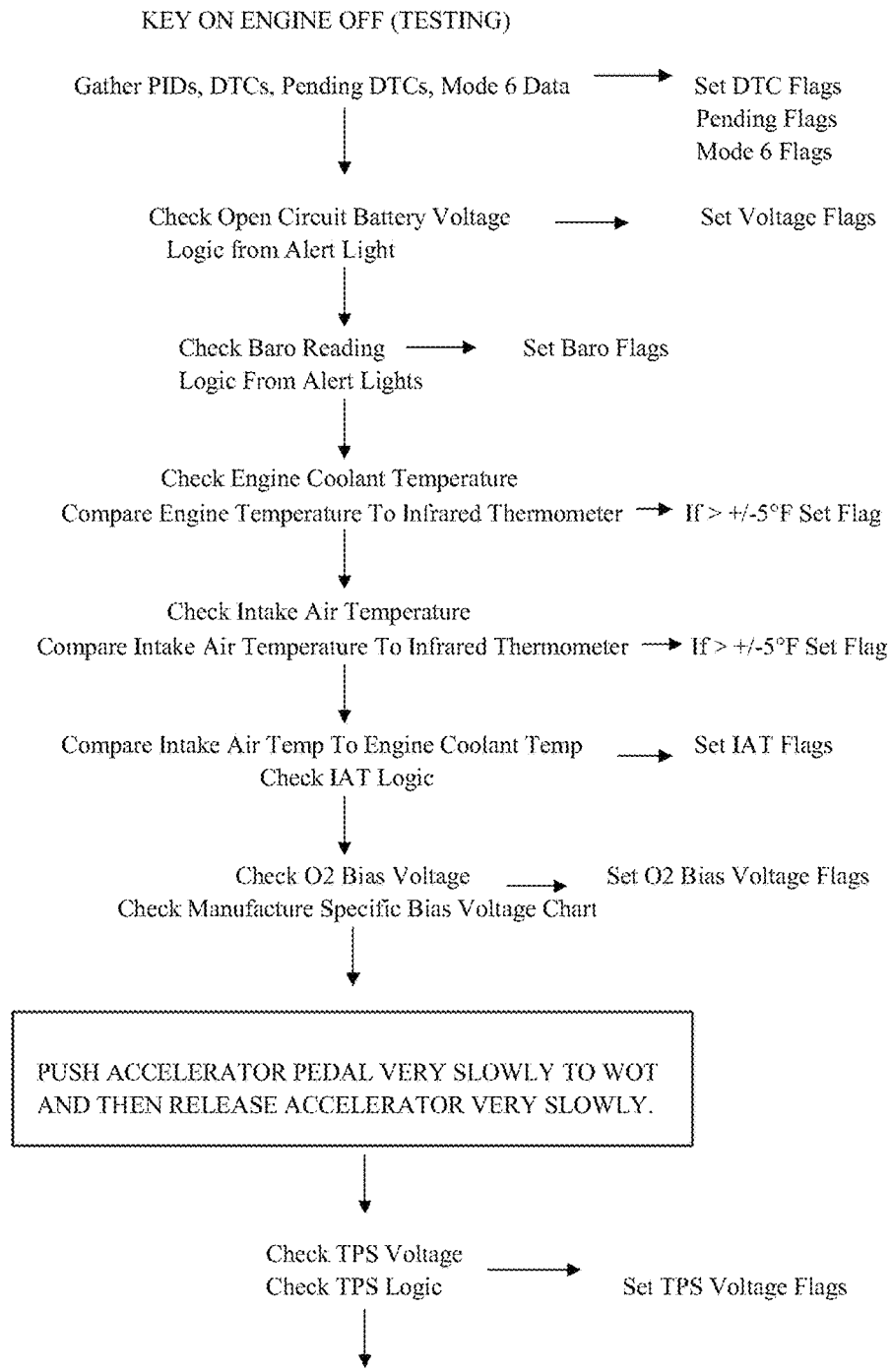
Figure 39:
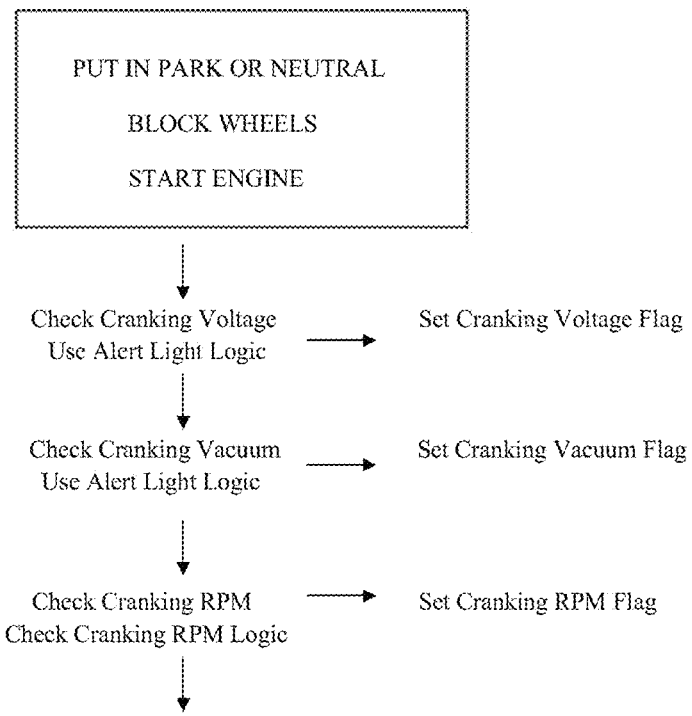
Figure 39:
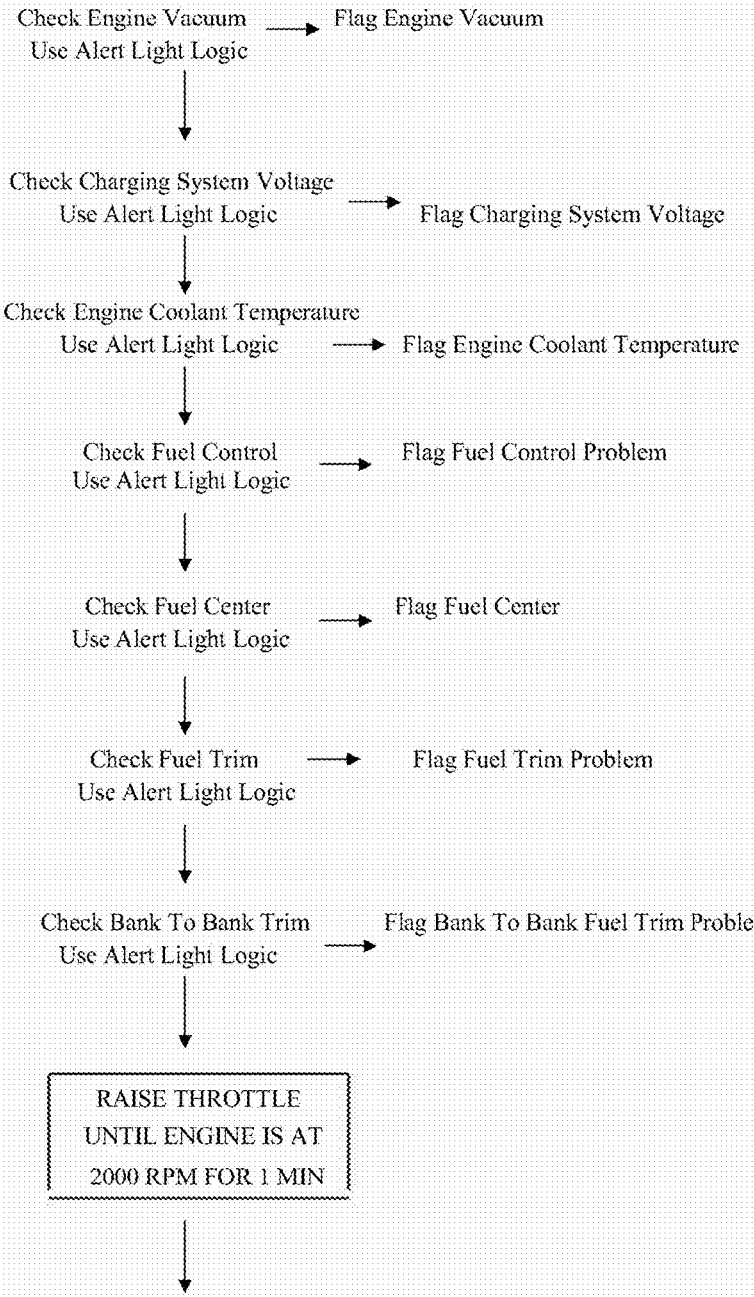
Figure 39:
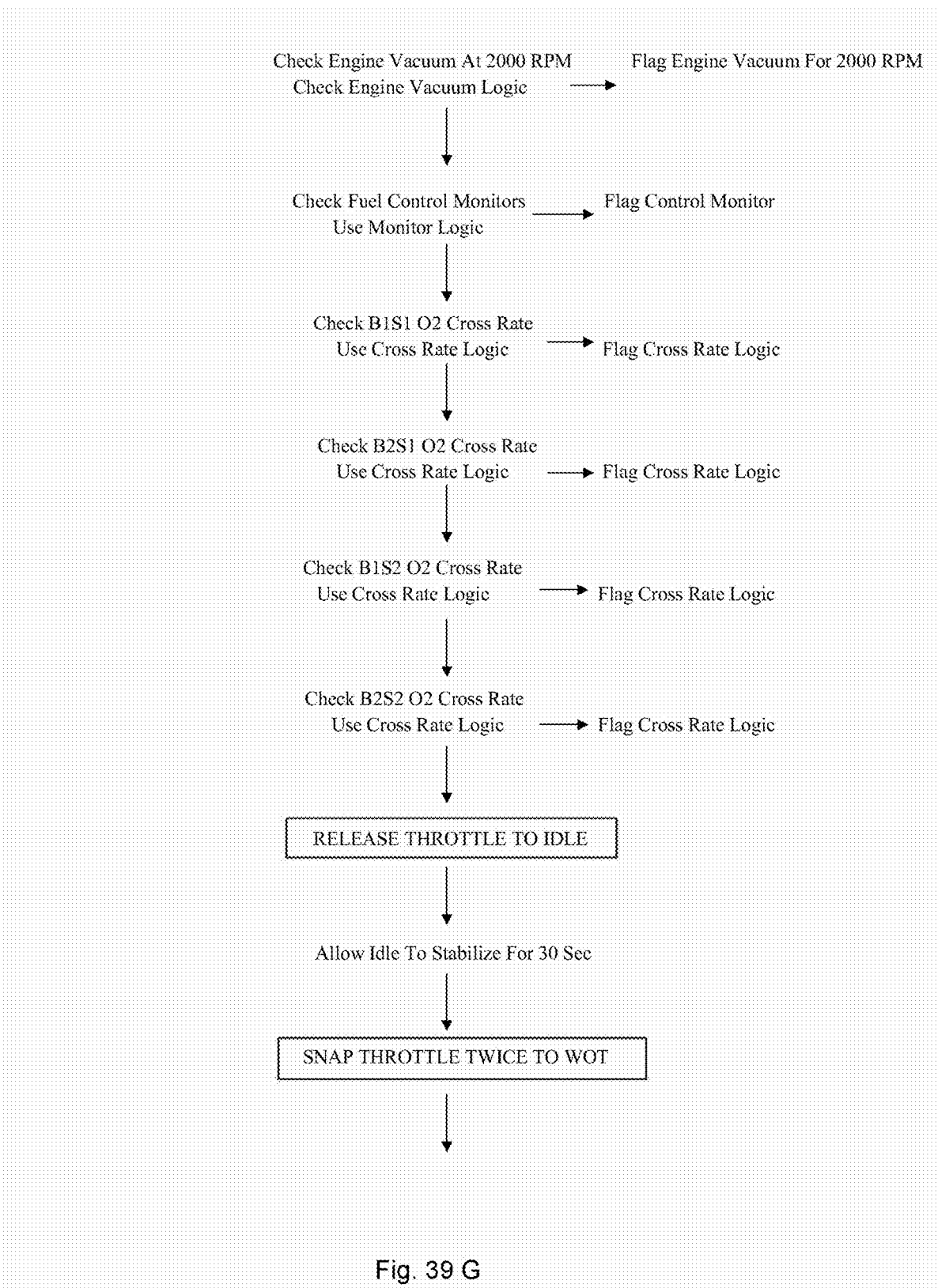
Figure 39:
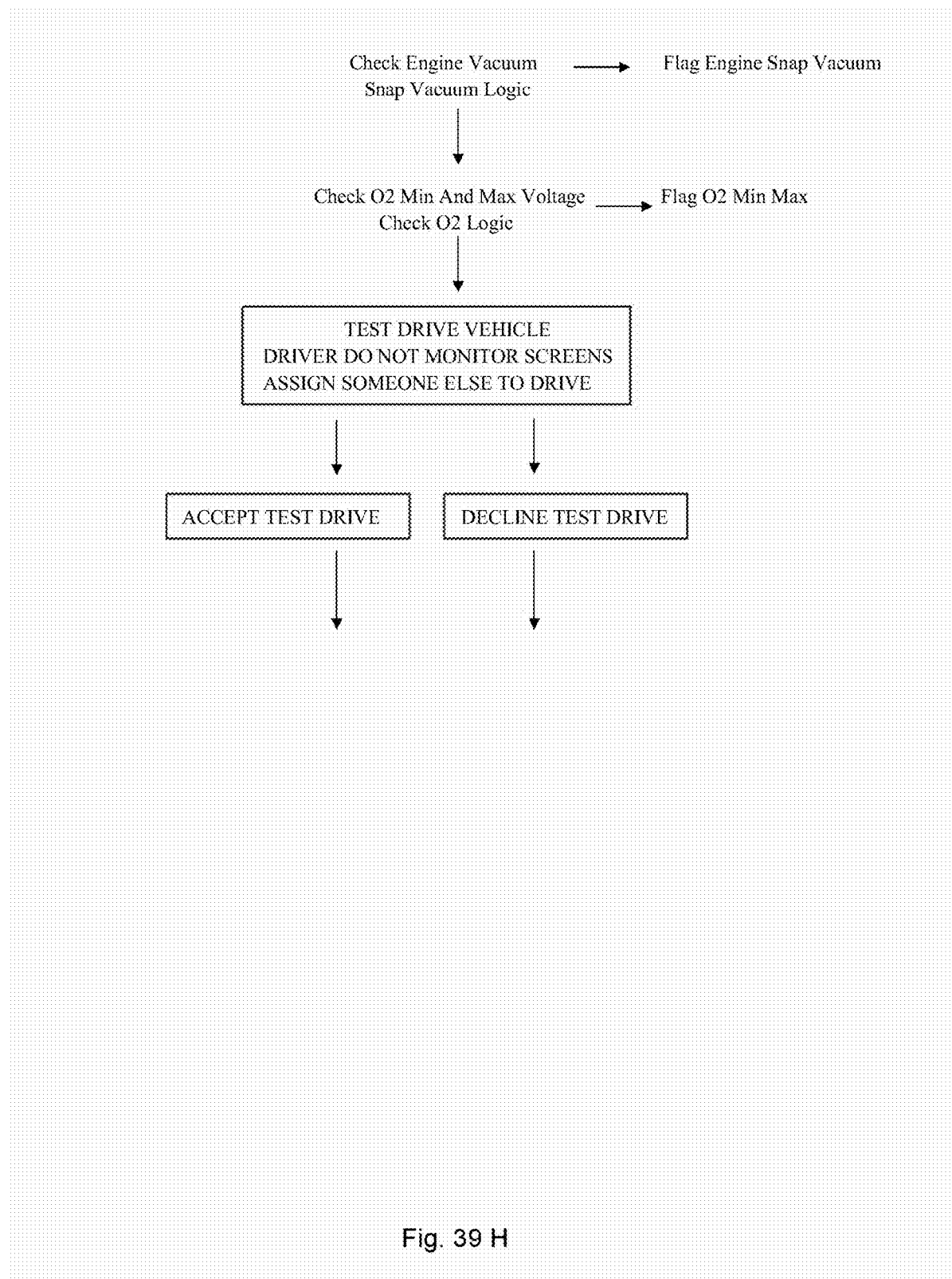
Figure 39:
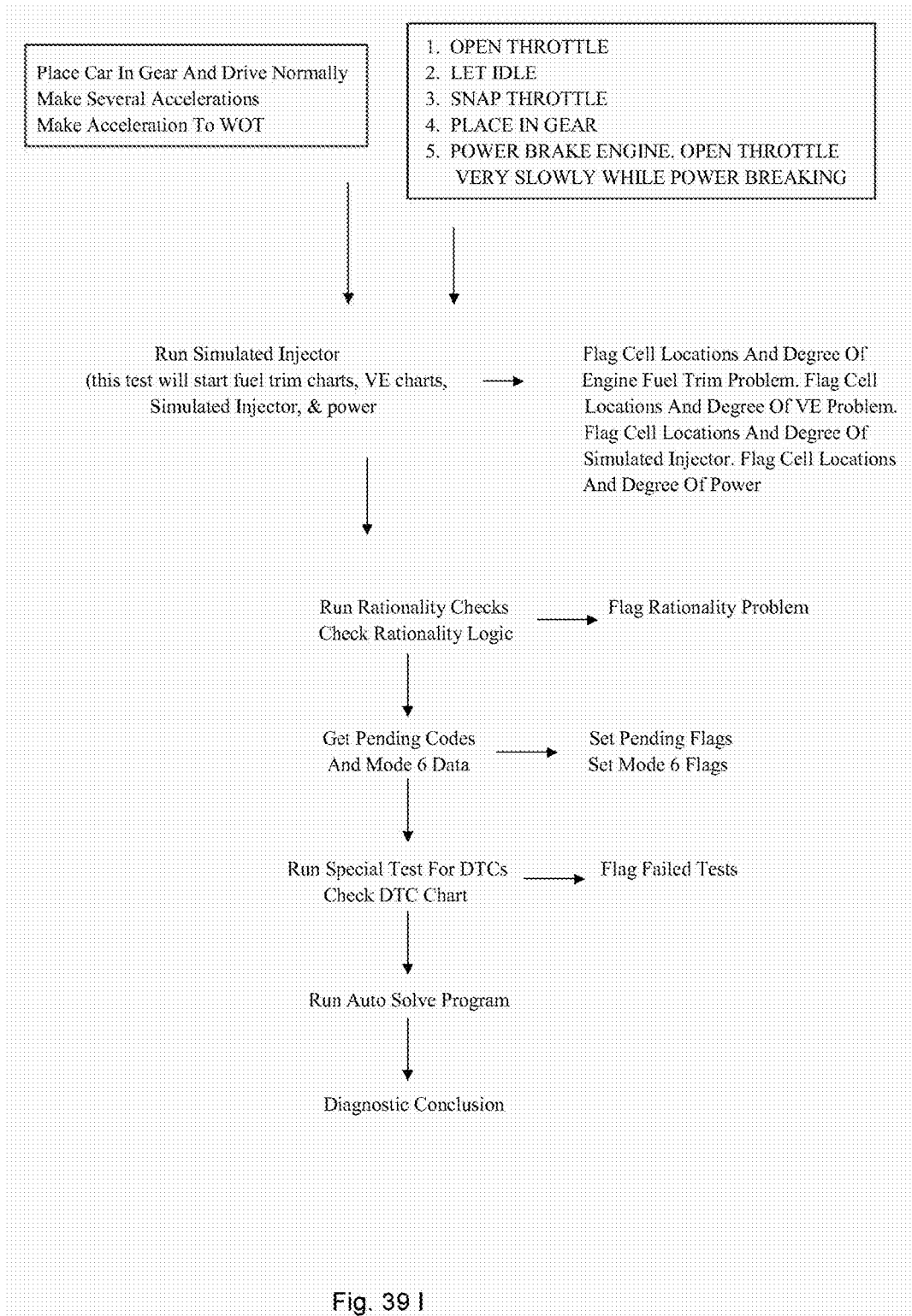

The sequencing of tests in the automated test routine is set forth in FIGS. 39 A-J. During the automated test a rationality check is also performed. In this testing sequence all of the PIDS are taken into account and compared against one another. One basic example of the rationality check is if the engine is cold the engine coolant temperature and the intake air temperature would need to be within 5° F. within one another. If the difference in temperature is greater than 5° F. then one of the sensors is not operating correctly.

A more complicated example is that the vehicle's engine is running rough at idle with no check engine light illuminated. The conditions are as follows:
 The engine vacuum is reading low.
 The throttle position sensor is reading closed.
 The mass air flow sensor, MAF, reading is low.
 The fuel trim readings are good, +/−10%.
 The RPM is at its target idle.
The rationality of this problem is the low vacuum at idle RPM would indicate the following:
 That the throttle plate is open.
 The engine has a mechanical problem.
 There is an intake vacuum leak.
 The EGR is stuck open.
By comparing the MAF to the engine vacuum it can be determined that the throttle position is reading correctly and is in the closed position. By comparing the low vacuum and the low MAF to the feedback circuit or fuel trim it can be determined that there is no vacuum leak present. If a vacuum leak were present the feedback circuit would be greater than +/−10% because the vacuum leak would be allowing air to bypass the MAF sensor. In this condition the air/fuel mixture would be lean and the feedback circuit fuel trim would have to add fuel to keep the air/fuel mixture at 14.7 to 1. This condition would indicate that the exhaust gas recirculation could be causing this problem. The program would then ask the technician to open the throttle to 2000 RPM. If the engine vacuum increased to a good reading this would be an indication that the mechanical condition of the engine is good. The highest probability for this problem would be that the exhaust gas EGR was stuck in the open position. By checking for DTCs, pending DTCs, and Mode 6 data; this information could be used to increase the probability of an accurate conclusion. If there were no DTCs, no pending DTCs, but Mode 6 had a failure listed for the EGR system; this would increase the probability of the EGR being stuck and leaking exhaust gases into the intake manifold.

Once the testing sequence is completed and all data have been collected, the program will evaluate the flagged data and the rationality data, and would then project a probable solution so that the technician could then correct the power train control system problem(s).

Figure 40:
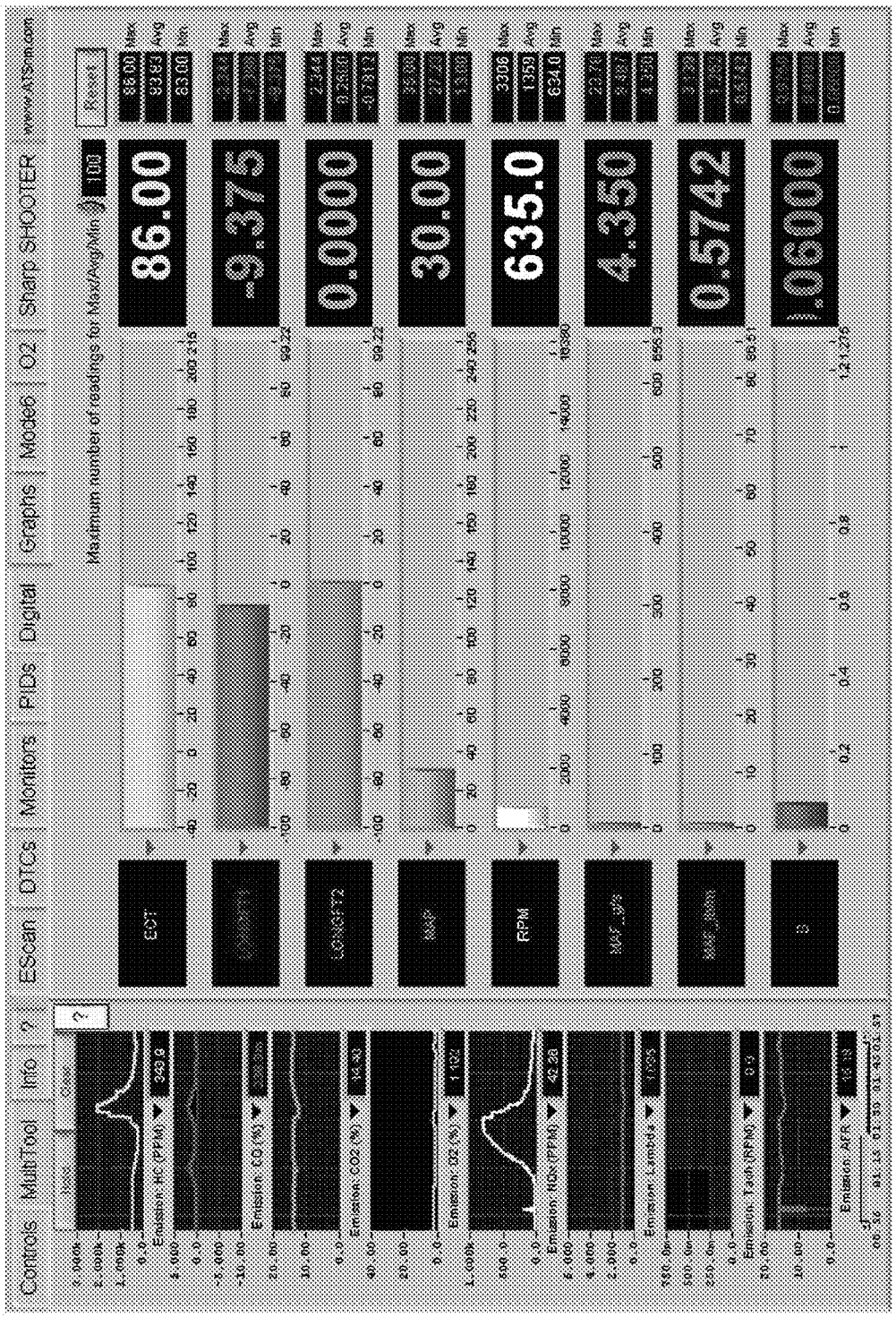
FIG. 40 is a screen display with the Digital and MultiTool tabs open.

To make a more accurate diagnostic conclusion an exhaust gas analyzer would be interfaced with tool 11. The internal combustion engine breaks the air, O2, and fuel, HC, down so they can combine with one another to form new chemical compounds. This chemical reaction powers the internal combustion engine. In order for this chemical reaction to take place, many things must occur in the correct order. When any of these events fail, this reaction will change. These changes will be evident in the exhaust gas traces; CO, CO2, HC, O2, Lamda, AFR and NOX, as illustrated in FIG. 40.

The exhaust gas analyzer is a device that can sense the concentration of certain gas molecules that are emitted out of the internal combustion engine. The internal combustion engine draws air into the cylinder where a hydrocarbon fuel is added. The hydrocarbon fuel is then broken down in the cylinder and, under the right conditions, can combine with oxygen. This chemical reaction provides an expanding gas that forces the piston down producing power at the engine's fly wheel. At the end of the burning cycle of the hydrocarbon fuel the gases are forced out of the cylinder into the exhaust system. The exhaust gas analyzer takes a small sample of this gas as it leaves the tail pipe of the vehicle. This sample is then pumped by the gas analyzer from the tail pipe through a filtering system into the exhaust gas analyzer's sample tube. Located at one end of the sample tube, a wide band infrared emitter is mounted. This emitter is positioned where it can send infrared light down the sample tube of the exhaust gas analyzer. At the opposite end of the sample tube an infrared quad collector is located. This collector can read the infrared light that was sent down the sample tube. Each gas that is emitted out of the vehicle's tail pipe absorbs certain infrared light wavelengths. If the collectors are tuned by applying light frequency filters only the light wavelength associated with the gas to be sampled will pass through the filter to be read by the collector. The amount of infrared light that passes through the sample tube and the light filters will show the concentration of a particular gas. The internal combustion engine produces exhaust gas concentrations of carbon monoxide (CO), carbon dioxide (CO2), hydrocarbons (HC), oxygen (O2), and nitrogen oxides (NOx). These different gasses absorb different infrared light wavelengths. The infrared light wavelength that CO absorbs is 4.65 nanometers. CO2 absorbs 4.2 nanometers. HC absorbs 3.4 nanometers. NOx absorbs 6 nanometers; however water vapors also absorb 6 nanometers of light so NOx must be read by a chemical cell. Oxygen does not absorb any infrared light so it too must be read by a chemical cell. A 4th collector is added as a gas reference and is read at 4 nanometers of infrared light. This reference adds stability to the reading of the other gases. If no gases are in the sample tube the collectors will read the highest concentration of infrared light. This high concentration of infrared light shows that no gases are present in the sample tube and the gas analyzer will display zero.

If gas traces are in the sample tube they will absorb a portion of the infrared light. The more gas concentration, the less infrared light makes it to the infrared collectors. The less infrared light that is picked up and read by the collectors, the higher the concentration of gas content is indicated by the gas analyzer. By filling the sample tube with a known concentration of gas content, the gas analyzer can be calibrated to a very accurate level. The exhaust gas analyzer can now give data that can be used by the technician or a microprocessor to help diagnose the internal combustion engine.

Tool 11 reads these changes and compares this data with the PIDS which will significantly increase the probability of a correct conclusion. Furthermore, when checking an oxygen sensor or wide range air fuel sensor, WRAF, the PIDS will provide the electrical data necessary to see if the O2 sensor is functional but will not determine whether or not the O2 sensor or WRAF sensor is out of calibration. In order to check the oxygen sensor or WRAF sensors accuracy a gas analyzer will be used. By comparing the data from the PIDS and the data from the exhaust gas analyzer, tool 11 can arrive at a conclusion on the calibration or accuracy of the oxygen sensor or WRAF sensor.

Whereas the drawings and accompanying description have shown and described the preferred embodiment of the present invention, it should be apparent to those skilled in the art that various changes may be made in the form of the invention without affecting the scope thereof.

The invention claimed is:

1. A diagnostic method for an automotive power plant implemented with the aid of instrumentation including a microprocessor; the power plant including an engine of known displacement, a powertrain control module, an air induction system and one or more sensors; the microprocessor being programmed to acquire parameter identification (hereinafter "PID") data from the powertrain control module; the microprocessor also being programmed with one or more algorithms which permit the analysis of extracted PID data, the transformation of PID data, or both, for the purpose of enabling a plurality of tests for diagnosing one or more problems associated with the power plant; the diagnostic method including the steps of:
   a. acquiring PID data from the powertrain control module with the microprocessor;
   b. utilizing data acquired from at least one PID to run a first test for the purpose of diagnosing at least one problem associated with the power plant; and
   c. utilizing data acquired from at least a second PID to run a second test for the purpose of diagnosing at least one problem associated with the power plant.

2. The method as set forth in claim 1, wherein the algorithms permit the running of tests selected from the group including (i) determining fuel trim from PID data acquired from the powertrain control module (hereinafter "Test A") and (ii) determining a volumetric efficiency of the engine from PID data acquired from the powertrain control module (hereinafter "Test B"); wherein the first test includes running at least one test from the group including Tests A and B; and wherein the second test includes running a different test also selected from the group including Tests A and B.

3. The method as set forth in claim 2, wherein the second test includes the steps of: (1) determining the actual air flow through the engine with at least some of the acquired PID data; (2) determining the calculated air flow through the engine (hereinafter "Calculated VE") with at least one of the one or more algorithms; and (3) using the actual air flow and Calculated VE in determining if there is a problem with one or more components of the Power Plant.

4. The method as set forth in claim 2, wherein the data used for running Test A includes data acquired from at least one PID selected from the group including Long Term Fuel Trim Bank 1 ("LTFTB1"), Short Term Fuel Trim Bank 1 ("STFTB1"), Long Term Fuel Trim Bank 2 ("LTFTB2"), Short Term Fuel Trim Bank 2 ("STFTB2"), Total Fuel Trim Bank 1 ("TFT61") and Total Fuel Trim Bank 2 ("TFTB2").

5. The method as set forth in claim 4, wherein the group including LTFTB1, also includes Oxygen Sensor Bank 1 Sensor 1 (hereinafter "O26151"), Oxygen Sensor Bank 1 Sensor 2 (hereinafter "O26152"), Oxygen Sensor Bank 1 Sensor 3 (hereinafter "O26153"), Oxygen Sensor Bank 2 Sensor 1 (hereinafter "O26251"), Oxygen Sensor Bank 2 Sensor 2 (hereinafter "O26252"), Oxygen Sensor Bank 2 Sensor 3 (hereinafter "O26253"), Wide Range Air Fuel (hereinafter "WRAF") sensor B1S1, and WRAF sensor B2S1.

6. The method as set forth in claim 2, wherein the data used for running Test B includes data acquired from at least one PID selected from the group including engine load, engine speed, manifold absolute pressure (hereinafter "MAP"), and mass air flow (hereinafter "MAS").

7. The method as set forth in claim 6, wherein the data used for running Test A includes data selected from at least one PID selected from the group including LTFTB1, STFTB1, LTFTB2, STFTB2, TFTB1 and TFTB2.

8. The method as set forth in claim 2, wherein the algorithms permit the running of tests selected from the group including (i) Test A, (ii) Test B and (iii) determining the difference between actual fuel injector on time and a calculated injector on time at various engine speeds and engine throttle positions from PID data acquired from the powertrain control module (hereinafter "Test C"); wherein the first test includes running at least one test from the group including Tests A, B and C; and wherein the second test includes running a different test also selected from the group including Tests A, B and C.

9. The method as set forth in claim 8, wherein the data used for running Test C includes data acquired from at least one PID selected from the group including engine load, actual injector on time, fuel trim, and engine speed.

10. The method as set forth in claim 2, wherein the algorithms permit the running of tests selected from the group including (i) Test A, (ii) Test B and (iii) calculating the engine's horsepower from PID data acquired from the powertrain control module (hereinafter "Test D"); wherein the first test includes running at least one test from the group including Tests A, B and D; and wherein the second test includes running a different test also selected from the group including Tests A, B and D.

11. The method as set forth in claim 2, wherein the power plant includes a catalytic converter; wherein the algorithms permit the running of tests selected from the group including (i) Test A, (ii) Test B and (iii) determining the efficiency of the catalytic converter from PID data acquired from the powertrain control module (hereinafter "Test E"); wherein the first test includes running at least one test from the group including Tests A, B and E; and wherein the second test includes running a different test also selected from the group including Tests A, B and E.

12. The method as set forth in claim 11, wherein the power plant also includes an exhaust system including a catalytic converter and wherein the data used for running Test E is selected from at least one included in the group PID data from the O2 sensor before the catalytic converter, PID data from the WRAF sensor, and PID data from the O2 sensor after the catalytic converter.

13. The method as set forth in claim 2, wherein the power plant includes a cooling system; wherein the algorithms permit the running of tests selected from the group including (i) Test A, (ii) Test B and (iii) diagnosing the cooling system of the power plant with PID data acquired from the powertrain control module (hereinafter "Test F"); wherein the first test includes running at least one test from the group including Tests A, B and F; and wherein the second test includes running a different test also selected from the group including Tests A, B and F.

14. The method as set forth in claim 13, wherein the data used for running Test F includes data acquired from at least one PID selected from the group including engine coolant temperature (hereinafter "ECT"), vehicle speed, revolutions per minute (hereinafter "RPM"), and throttle position sensor (hereinafter "TPS").

15. The method as set forth in claim 2, wherein the power plant includes a catalytic converter; wherein the algorithms permit the running of tests selected from the group including (i) Test A, (ii) Test B, (iii) Test C, (iv) Test D, (v) Test E, and (vi) Test F; wherein the first test includes running at least one test from the group consisting of Tests A, B, C, D, E and F; and wherein the second test includes running at least one different test also selected from the group including Tests A, B, C, D, E and F.

16. The method as set forth in claim 15, wherein the data used for running Test A includes data acquired from at least one PID selected from the group including LTFTB1, STFTB1, LTFTB2, STFTB2, TFTB1 and TFTB2; wherein the data used for running Test B includes data acquired from at least one PID selected from the group including engine load, engine speed MAP, and MAS; wherein the data used for running Test C includes data acquired from at least one PID selected from the group including engine load, actual injector on time, fuel trim, and engine speed; wherein the data used for running Test D includes data acquired from at least one PID selected from the group including fuel trim, and a sensor used to determine air flow through the engine; wherein the PID data used for running Test E is selected from at least one included in the group PID data from the O2 sensor before the catalytic converter, WRAF PID data, and PID data from the O2 sensor after the catalytic converter; and wherein the data used for running Test F includes data acquired from at least one PID selected from the group including ECT, vehicle speed, RPM, and TPS.

* * * * *

UNITED STATES PATENT AND TRADEMARK OFFICE
CERTIFICATE OF CORRECTION

PATENT NO. : 9,863,848 B1
APPLICATION NO. : 14/105574
DATED : January 9, 2018
INVENTOR(S) : Bernie C. Thompson et al.

Page 1 of 1

It is certified that error appears in the above-identified patent and that said Letters Patent is hereby corrected as shown below:

In the Claims

Column 27, Lines 12-21, cancel Claim 5 as printed and insert the following correct claim language:
--5. The method as set forth in claim 4, wherein the group including LTFTB1, also includes Oxygen Sensor Bank 1 Sensor 1 (hereinafter "O2B1S1"), Oxygen Sensor Bank 1 Sensor 2 (hereinafter "O2B1S2"), Oxygen Sensor Bank 1 Sensor 3 (hereinafter "O2B1S3"), Oxygen Sensor Bank 2 Sensor 1 (hereinafter "O2B2S1"), Oxygen Sensor Bank 2 Sensor 2 (hereinafter "O2B2S2"), Oxygen Sensor Bank 2 Sensor 3 (hereinafter "O2B2S3"), Wide Range Air Fuel (hereinafter "WRAF") sensor B1S1, and WRAF sensor B2S1.--

Signed and Sealed this
Twentieth Day of November, 2018

Andrei Iancu
*Director of the United States Patent and Trademark Office*